(12) United States Patent
Hanayama et al.

(10) Patent No.: US 10,985,566 B2
(45) Date of Patent: Apr. 20, 2021

(54) ENERGY SYSTEM, ENERGY MANAGEMENT SERVER, ENERGY MANAGEMENT METHOD, AND NON-TRANSITORY COMPUTER READABLE MEDIUM

(71) Applicant: HONDA MOTOR CO., LTD., Tokyo (JP)

(72) Inventors: Ken Hanayama, Saitama (JP); Kanako Ikeda, Tokyo (JP); Hidekazu Saito, Saitama (JP); Daijiro Takizawa, Saitama (JP); Keiichi Iguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/980,849

(22) PCT Filed: Mar. 20, 2019

(86) PCT No.: PCT/JP2019/011803
§ 371 (c)(1),
(2) Date: Sep. 15, 2020

(87) PCT Pub. No.: WO2019/182038
PCT Pub. Date: Sep. 26, 2019

(65) Prior Publication Data
US 2021/0021131 A1 Jan. 21, 2021

(30) Foreign Application Priority Data
Mar. 20, 2018 (JP) .............................. JP2018-052847

(51) Int. Cl.
*H02J 3/32* (2006.01)
*H02J 3/14* (2006.01)
(Continued)

(52) U.S. Cl.
CPC ................. *H02J 3/32* (2013.01); *H02J 3/14* (2013.01); *H02J 3/38* (2013.01); *G06Q 50/06* (2013.01)

(58) Field of Classification Search
CPC ...... H02J 3/32; H02J 3/14; H02J 3/38; G06Q 50/06
(Continued)

(56) References Cited

U.S. PATENT DOCUMENTS

| | | | |
|---|---|---|---|
| 9,559,520 B2 * | 1/2017 | Shelton | H02M 7/44 |
| 2009/0069950 A1 * | 3/2009 | Kurokami | H02J 3/32 |
| | | | 700/291 |
| 2014/0236375 A1 * | 8/2014 | Ikeda | H02J 4/00 |
| | | | 700/295 |

FOREIGN PATENT DOCUMENTS

| | | | | |
|---|---|---|---|---|
| CN | 102668301 B | * | 7/2015 | ............... H02J 7/35 |
| JP | 2006011614 A | | 1/2006 | |

(Continued)

OTHER PUBLICATIONS (ISA/237) Written Opinion of the International Search Authority for International Patent Application No. PCT/JP2019/011803, mailed by the Japan Patent Office dated Jun. 4, 2019.
(Continued)

*Primary Examiner* — M Baye Diao

(57) ABSTRACT

An electric power controlling section which controls transmission and reception of electric power between power grid and an electric power storage device, an energy source producing section which utilizes electric power supplied from power grid to produce an energy source, an energy information obtaining section which obtains information indicating a first electric amount which is the electric power amount supplied by the electric power storage device to the power grid during a first period, and a corresponding amount determining section which determines a first corresponding
(Continued)

amount which is the amount of the energy source produced by the energy source producing section utilizing the amount of electric power corresponding to the first electric amount are included.

19 Claims, 19 Drawing Sheets

(51) Int. Cl.
  *H02J 3/38* (2006.01)
  *G06Q 50/06* (2012.01)
(58) Field of Classification Search
  USPC .......................................................... 320/101
  See application file for complete search history.

(56) References Cited

FOREIGN PATENT DOCUMENTS

| | | | |
|---|---|---|---|
| JP | 2006235846 A | | 9/2006 |
| JP | 2006236741 A | | 9/2006 |
| JP | 2014122399 A | | 7/2014 |
| JP | 2016136433 A | | 7/2016 |
| KR | 20070010742 A | * | 1/2007 |

OTHER PUBLICATIONS

Decision to Grant a Patent issued for counterpart Japanese Application No. 2020-507885, issued by the Japanese Patent Office dated Jun. 23, 2020 (drafted on Jun. 17, 2020).

* cited by examiner

| 800 | | | | | | | | | |
|---|---|---|---|---|---|---|---|---|---|
| 812 | 814 | 822 | 824 | 826 | 832 | 834 | 840 | 850 | |
| COMMUNITY ID | SUPPLIER/ DEMANDER ID | ELECTRIC POWER TRANS- MISSION AND RECEPTION TIMING | PERIOD ID | ELECTRIC POWER TRANS- MISSION AND RECEPTION LOCATION | TRANSMITTED ELECTRIC POWER AMOUNT [kWh] | RECEIVED ELECTRIC POWER AMOUNT [kWh] | POINT [pt] | SURPLUS SUPPLY CAPABILITY [kW] | |
| · · | · · | · · | · · | · · | · · | · · | · · | · · | |
| C_001 | U_001 | *** | P_101 | *** | *** | — | *** | *** | |
| C_001 | U_001 | *** | P_101 | *** | — | *** | *** | *** | |
| · · | · · | · · | · · | · · | · · | · · | · · | · · | |

| 900 | | | | | | | |
|---|---|---|---|---|---|---|---|
| | | | TRANSMITTED ELECTRIC POWER AMOUNT [kWh] | | | INCOME | |
| COMMUNITY ID | SUPPLIER/ DEMANDER ID | ELECTRIC POWER TRANS- MISSION TIMING | TOTAL | BREAKDOWN | | PRICE | GIVEN AMOUNT OF POINTS |
| | | | | SOLD ELECTRIC POWER AMOUNT | POINT EXCHANGE | | |
| ⋮ | ⋮ | ⋮ | ⋮ | ⋮ | ⋮ | ⋮ | ⋮ |
| C_001 | U_001 | *** | *** | *** | *** | *** | *** |
| ⋮ | ⋮ | ⋮ | ⋮ | ⋮ | ⋮ | ⋮ | ⋮ |

922 / 924 / 930 / 940 / 942 / 944 {946, 948} / 950 / 952 / 954

| 1000 | | | | | | | |
|---|---|---|---|---|---|---|---|
| COMMUNITY ID | SUPPLIER/ DEMANDER ID | ELECTRIC POWER RECEPTION TIMING | RECEIVED ELECTRIC POWER AMOUNT [kWh] | | | EXPENDITURE | |
| | | | TOTAL | BREAKDOWN | | PRICE | POINT CONSUMPTION |
| | | | | PURCHASED ELECTRIC POWER AMOUNT | POINT EXCHANGE | | |
| ‥ | ‥ | ‥ | ‥ | ‥ | ‥ | ‥ | ‥ |
| C_001 | U_001 | *** | *** | *** | *** | *** | *** |
| ‥ | ‥ | ‥ | ‥ | ‥ | ‥ | ‥ | ‥ |
| 1022 | 1024 | 1030 | 1042 | 1046 | 1048 | 1052 | 1054 |

| COMMUNITY ID 1222 | SUPPLIER/ DEMANDER ID 1224 | ELECTRIC POWER TRANSMISSION AND RECEPTION TIMING 1232 | ELECTRIC POWER TRANSMISSION AND RECEPTION LOCATION 1234 | TRANSACTION CONTENT | | |
|---|---|---|---|---|---|---|
| | | | | TRANSMITTED ELECTRIC POWER AMOUNT [kWh] | DESIGNATION OF ELECTRIC POWER RECEIVING SIDE | TYPE OF INCOME 1240 |
| COMMUNITY 102 | USER A | 2018/1/1 0:00-0:29 | SUPPLIER/DEMANDER FACILITY 114 OF COMMUNITY 102 | 1 | HYDROGEN PRODUCTION EQUIPMENT 160 OF COMMUNITY 102 | POINT |
| COMMUNITY 102 | USER A | 2018/1/1 0:00-0:29 | SUPPLIER/DEMANDER FACILITY 112 OF COMMUNITY 102 | 1 | NOT DESIGNATED | POINT |
| COMMUNITY 102 | USER A | 2018/1/1 0:00-0:29 | SUPPLIER/DEMANDER FACILITY 112 OF COMMUNITY 102 | 1 | NOT DESIGNATED | MONEY |

| COMMUNITY ID | SUPPLIER/ DEMANDER ID | ELECTRIC POWER TRANSMISSION AND RECEPTION TIMING | ELECTRIC POWER TRANSMISSION AND RECEPTION LOCATION | TRANSACTION CONTENT | |
|---|---|---|---|---|---|
| | | | | RECEIVED ELECTRIC POWER AMOUNT [kWh] | TYPE OF EXPENDITURE |
| COMMUNITY 102 | USER A | 2018/2/1 10:00—10:29 | SUPPLIER/DEMANDER FACILITY 114 OF COMMUNITY 102 | 1 | POINT |
| COMMUNITY 102 | USER A | 2018/2/1 10:00—10:29 | SUPPLIER/DEMANDER FACILITY 112 OF COMMUNITY 102 | 1 | MONEY |

| COMMUNITY ID 1722 | SUPPLIER/ DEMANDER ID 1724 | HYDROGEN FILLING TIMING 1732 | HYDROGEN FILLING LOCATION 1734 | TRANSACTION CONTENT 1740 ||
|---|---|---|---|---|---|
| | | | | FILLING AMOUNT [m³] | TYPE OF EXPENDITURE |
| COMMUNITY 102 | USER A | 2018/2/1 10:00–10:29 | HYDROGEN PRODUCTION DEVICE 160 OF COMMUNITY 102 | 1 | POINT |
| COMMUNITY 102 | USER A | 2018/2/1 10:00–10:29 | HYDROGEN PRODUCTION DEVICE 160 OF COMMUNITY 102 | 1 | MONEY |

FIG. 17

ENERGY SYSTEM, ENERGY MANAGEMENT SERVER, ENERGY MANAGEMENT METHOD, AND NON-TRANSITORY COMPUTER READABLE MEDIUM

CROSS-REFERENCE TO RELATED APPLICATIONS

This application is a National Stage Entry of International Application No. PCT/JP2019/011803, filed on Mar. 20, 2019, which claims priority to Japanese Patent Application No. 2018-052847, filed on Mar. 20, 2018, the contents of each of which are hereby incorporated by reference in their entirety.

BACKGROUND

1. Technical Field

The present invention relates to an energy system, an energy management server, an energy management method, and a non-transitory computer readable medium.

2. Related Art

There is known a hydrogen production supply system in which one or more vehicles and supplying stations are configured to be connected via communication network (see, for example, Patent document 1). In addition, there is known a hydrogen production system which is configured to directly supply to a fuel battery vehicle the hydrogen generated by utilizing electric power from a solar battery (for example, see Patent document 2).

PRIOR ART DOCUMENT

Patent Document

[Patent document 1] Japanese Unexamined Patent Application, Publication No. 2006-235846
[Patent document 1] Japanese Unexamined Patent Application, Publication No. 2008-011614

There is a demand for facilitating the utilization of hydrogen as an energy source.

GENERAL DISCLOSURE

In a first aspect of the present invention, an energy system is provided. The above-described energy system includes, for example, an electric power controlling section which controls transmission and reception of electric power between power grid and an electric power storage device. The above-described energy system includes, for example, an energy source producing section which utilizes electric power supplied from the power grid to produce an energy source. The above-described energy system includes, for example, an energy information obtaining section which obtains the information indicating a first electric amount which is an electric power amount supplied by the electric power storage device to the power grid during a first period. The above-described energy system includes, for example, a corresponding amount determining section which determines a first corresponding amount which is the amount of energy source which the energy source producing section produces by utilizing the amount of electric power corresponding to the first electric amount.

The above-described energy system may include a storage section which stores the information indicating the first corresponding amount determined by the corresponding amount determining section. The above-described energy system may include a charge and discharge device which utilizes the electric power supplied from the power grid to charge the electric power storage device and supplies electric power output by the electric power storage device to the power grid. In the above-described energy system, the electric power storage device may be an electric power storage device disposed in a movable object or a building, or a transportable electric power storage device. In the above-described energy system, the electric power controlling section may control transmission and reception of electric power between the power grid and the electric power storage device electrically connected to the charge and discharge device.

The above-described energy system may include a first suppliable amount determining section which determines, based on the first corresponding amount determined by the corresponding amount determining section, the first suppliable amount indicating a maximum value of the electric power amount which can be supplied from the power grid to the electric power storage device under a first economical condition. In the above-described energy system, the energy information obtaining section may obtain information indicating a supplying location which is the location where the electric power storage device supplies electric power to the power grid during the first period and information indicating a receiving location which is a location where the electric power storage device receives electric power from the power grid during a second period which is temporally after the first period. In the above-described energy system, the first suppliable amount determining section may determine the first suppliable amount such that the first suppliable amount is higher in a case where the supplying location and the receiving location meet the first geographic condition than in a case where the supplying location and the receiving location does not meet the first geographic condition.

In the above-described energy system, the first suppliable amount determining section may add the first corresponding amount to the last first suppliable amount in a case where the electric power storage device supplies electric power to the power grid. In the above-described energy system, the first suppliable amount determining section may subtract from the last first suppliable amount a charge amount which is the amount corresponding to the electric power amount received by the electric power storage device within a range of the last first suppliable amount in a case where the electric power storage device receives electric power from the power grid.

In the above-described energy system, the energy information obtaining section may obtain information indicating a supplying location which is the location where the electric power storage device supplies electric power to the power grid during the first period and information indicating a receiving location which is a location where the electric power storage device receives electric power from the power grid during a second period which is temporally after the first period. In the above-described energy system, the first suppliable amount determining section may determine the charge amount such that the ratio of charge amount to the electric power amount received by the electric power storage device is lower in a case where the supplying location and the receiving location meet the first geographic condition than in a case where the supplying location and the receiving location does not meet the first geographic condition.

The above-described energy system may include a second suppliable amount determining section which determines, based on a first corresponding amount determined by the corresponding amount determining section, a second suppliable amount indicating a maximum value of the amount of energy source which can be transported in a second economic condition from (i) a first storage container which stores an energy source produced by the energy source producing section to (ii) a second storage container which is mounted to a movable object and stores the energy source supplied from the first storage container.

The above-described energy system may include a second suppliable amount determining section which determines, based on a first corresponding amount determined by the corresponding amount determining section, a second suppliable amount indicating a maximum value of the amount of energy source which can be transported in a second economic condition from (i) a first storage container which stores an energy source produced by the energy source producing section to (ii) a second storage container which is mounted to a movable object and stores the energy source supplied from the first storage container. In the above-described energy system, the energy information obtaining section may obtain information indicating a supplying location which is a location where the electric power storage device supplies electric power to the power grid during the first period and information indicating a transport location which is the location where the energy source is transported from the first storage container to the second storage container during a third time period which is temporally after the first period. In the above-described energy system, the second suppliable amount determining section may determine the second suppliable amount such that the second suppliable amount is higher in a case where the supplying location and the transport location meet the second geographic condition than in a case where the supplying location and the transport location does not meet the second geographic condition.

The above-described energy system may include a power generating section which utilizes the energy source produced by the energy source producing section to generate electricity, and supplies the generated electric power to at least one of the power grid and the electric power storage device. In the above-described energy system, the energy source may be hydrogen. In the above-described energy system, the first corresponding amount may be the amount of energy source which the energy source producing section produces by utilizing the amount of electric power corresponding to the first electric amount during the first period.

In the above-described energy system, the energy source producing section may be configured to utilize the electric power supplied from the power grid and the electric power storage device to produce the energy source. In the above-described energy system, the first corresponding amount may be the amount of energy source which the energy source producing section produces by utilizing the amount of electric power corresponding to the first electric amount during the first period. In the above-described energy system, the energy information obtaining section may obtain the information indicating a second electric power amount which is the electric power amount supplied by the electric power storage device to the energy source producing section during the first period. In the above-described energy system, the corresponding amount determining section may determine a second corresponding amount which is the amount of energy source which the energy source producing section produces during the first period by utilizing the amount of electric power corresponding to the second electric power amount. The corresponding amount determining section may output the information indicating the total of the first corresponding amount and the second corresponding amount as the amount of energy source which the energy source producing section produces during the first period by utilizing the electric power supplied from the electric power storage device.

In a second aspect of the present invention, an energy system is provided. The above-described energy system includes, for example, an energy source producing section which utilizes the electric power supplied from the electric power storage device to produce energy source. The above-described energy system includes, for example, an energy information obtaining section which obtains information indicating a second electric power amount which is the electric power amount supplied by the electric power storage device to the energy source producing section during a first period. The above-described energy system includes, for example, a corresponding amount determining section which determines a second corresponding amount which is the amount of energy source which the energy source producing section produces by utilizing the amount of electric power corresponding to the second electric power amount.

In a third aspect of the present invention, an energy management server is provided. The above-described energy management server includes, for example, an energy information obtaining section which obtains the information indicating a first electric amount which is an electric power amount supplied by the electric power storage device to the power grid during a first period. The above-described energy management server includes, for example, a corresponding amount determining section which determines a first corresponding amount which is the amount of energy source which the energy source production device produces by utilizing the amount of electric power corresponding to the first electric amount, wherein the energy source production device utilizes the electric power supplied from the power grid to produce the energy source.

In a fourth aspect of the present invention, an energy management server is provided. The above-described energy management server includes, for example, an energy information obtaining section which obtains information indicating a second electric power amount which is the electric power amount supplied by the electric power storage device to the energy source production device during a first period, wherein the energy source production device utilizes electric power supplied from the electric power storage device to produce an energy source, and a corresponding amount determining section which determines a second corresponding amount which is the amount of energy source which the energy source production device produces by utilizing the amount of electric power corresponding to the second electric power amount.

In a fifth aspect of the present invention, a production method of an energy source is provided. The above-described production method of an energy source has, for example, an electric power controlling step to control the transmission and reception of electric power between the power grid and the electric power storage device. The above-described production method of an energy source has, for example, an energy information obtaining step to obtain the information indicating the first electric amount which is the electric power amount supplied by the electric power storage device to the power grid during the first period. The above-described production method of an energy source has, for example, an energy source producing step to produce the energy source by controlling an energy source production device which produces the energy source by utilizing electric power supplied by the power grid. The above-described production method of an energy source has, for example, a corresponding amount determining step to determine a first corresponding amount which is the amount of an energy source produced by utilizing the amount of electric power corresponding to the first electric amount.

In a six aspect of the present invention, a production method of the energy source is provided. The above-described production method of an energy source has, for example, an energy source producing step to produce the energy source by controlling an energy source production device which produces the energy source by utilizing electric power supplied by the electric power storage device. The above-described production method of an energy source has, for example, an energy information obtaining step to obtain the information indicating the second electric power amount which is the electric power amount supplied from the electric power storage device during the first period of the energy source producing step. The above-described production method of an energy source has, for example, a corresponding amount determining step to determine a second corresponding amount which is the amount of an energy source produced by utilizing the amount of electric power corresponding to the second electric power amount.

In a seventh aspect of the present invention, a program is provided. A non-transitory computer readable medium which stores the above-described programmed may be provided. The above-described program is, for example, to cause a computer to execute an energy information obtaining step to obtain information indicating a first electric amount which is the electric power amount supplied by the electric power storage device to the power grid during the first period. The above-described programmed is, for example, to cause a computer to execute a corresponding amount determining step to determine a first corresponding amount which is the amount of energy source which the energy source production device produces by utilizing the amount of electric power corresponding to the first electric amount, wherein the energy source production device utilizes the electric power supplied from the power grid to produce the energy source.

In an eighth aspect of the present invention, a program is provided. A non-transitory computer readable medium which stores the above-described program may be provided. The above-described program is, for example, to cause a computer to execute an energy information obtaining step to obtain information indicating a second electric power amount which is the electric power amount supplied during a first period by the electric power storage device to the energy source production device which utilizes the electric power supplied from the electric power storage device to produce the energy source. The above-described program is, for example, to cause a computer to execute a corresponding amount determining step to determine a second corresponding amount which is the amount of energy source which the energy source production device produces by utilizing the amount of electric power corresponding to the second electric power amount.

In a ninth aspect of the present invention, a program is provided. A non-transitory computer readable medium which stores the above-described programmed may be provided. The above-described program is, for example, to cause a computer to execute an electric power controlling step to control transmission and reception of electric power between the power grid and the electric power storage device. The above-described program is, for example, to cause a computer to execute an energy information obtaining step to obtain information indicating a first electric amount which is the electric power amount supplied by the electric power storage device to the power grid during the first period. The above-described programmed is, for example, to cause a computer to execute a corresponding amount determining step to determine a first corresponding amount which is the amount of energy source which the energy source production device produces by utilizing the amount of electric power corresponding to the first electric amount, wherein the energy source production device utilizes the electric power supplied from the power grid to produce the energy source.

The summary clause does not necessarily describe all necessary features of the embodiments of the present invention. The present invention may also be a sub-combination of the features described above.

BRIEF DESCRIPTION OF THE DRAWINGS

FIG. 8 schematically shows one example of a data table 800.

FIG. 9 schematically shows one example of the data table 800.

FIG. 10 schematically shows one example of the data table 800.

FIG. 12 schematically shows one example of a data structure of an electric power transmission and reception history 1204.

FIG. 15 schematically shows one example of a data structure of an electric power transmission and reception history 1504.

FIG. 17 schematically shows one example of a data structure of a filling history 1704.

DESCRIPTION OF EXEMPLARY EMBODIMENTS

Hereinbelow, the present invention will be described through embodiments of the invention, but the following embodiments do not limit the invention disclosed in claims. In addition, not all combinations of features described in the embodiments necessarily have to be essential to solving means of the invention. Identical or similar portions in figures are given identical reference numbers, and the same explanation is omitted in some cases.

[Summary of the Energy Management System 100]

Figure 1:
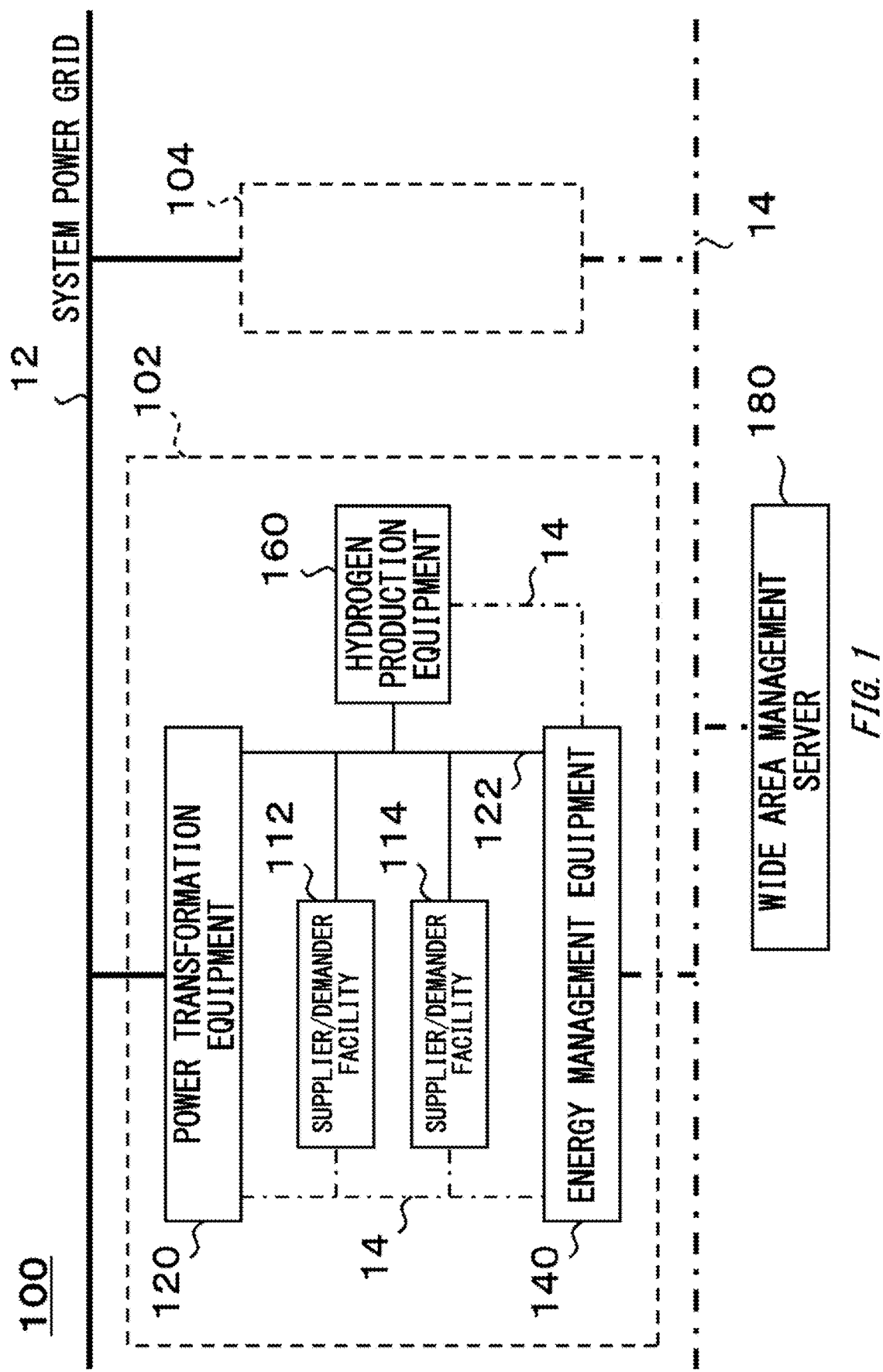
FIG. 1 schematically shows one example of a system configuration of an energy management system 100.

FIG. 1 schematically shows one example of a system configuration of the energy management system 100. In the present embodiment, the energy management system 100 includes a plurality of apparatuses which constitutes a community 102 (which is sometimes simply referred to as a community 102) and a plurality of apparatuses which constitutes a community 104 (which is sometimes simply referred to as a community 104). The energy management system 100 may include a wide area management server 180.

In the present embodiment, the community 102 includes a supplier/demander facility 112, a supplier/demander facility 114, power transformation equipment 120, a power transmission and distribution network 122, energy management equipment 140, and hydrogen production equipment 160. Each of a plurality of apparatuses constituting the community 102 may transmit and receive information with each other via a communication network 14. The energy management equipment 140 of the community 102 may transmit and receive information with another community via the communication network 14. The energy management equipment 140 of the community 102 may transmit and receive information with a wide area management server 180 via the communication network 14.

In the present embodiment, the community 104 may have the similar components to the community 102 except that the community 104 does not have the hydrogen production equipment 160. It is noted that in another embodiment the community 104 may include the hydrogen production equipment 160. In the present embodiment, for a simple description, a case in which the energy management system 100 includes the community 102 and the community 104 is described. However, the number of communities included in the energy management system 100 is not limited to the present embodiment. In another embodiment, the energy management system 100 includes one or more (sometimes referred to as equal to or more than one) communities. The energy management system 100 may include three or more communities.

The energy management system 100 may include one or more communities 102. The energy management system 100 may include one or more communities 104. The energy management system 100 may not include the community 102. The energy management system 100 may not include the community 104. In a case in which the community 102 does not include the hydrogen production equipment 160, the energy management system 100 may include the hydrogen production equipment 160 and one or more communities 104. In this case, the hydrogen production equipment 160 may constitute a part of one or more communities 104 or may not constitute a part of one or more communities 104.

In the present embodiment, for a simple description, the community 102 is described in detail using a case in which the community 102 includes a supplier/demander facility 112 and a supplier/demander facility 114 as an example. However, the number of supplier/demander facilities included in the community 102 is not limited to the present embodiment. In another embodiment, the community 102 includes three or more supplier/demander facilities. In addition, in the present embodiment, the community 102 is described in detail using, as an example, a case in which the hydrogen production equipment 160 is disposed outside the energy management equipment 140 in the community 102. However, the energy management equipment 140 is not limited to the present embodiment. In another embodiment, the energy management equipment 140 may constitute a part of the energy management equipment 140.

The system power grid 12 may be one example of the power grid. The energy management system 100 may be one example of the energy system. The community 102 may be one example of the energy system. In a case where the community 104 includes the hydrogen production equipment 160, the community 104 may be one example of the energy system. The supplier/demander facility 112 may be one example of a building. The supplier/demander facility 114 may be one example of a building. The power transmission and distribution network 122 may be one example of power grid. The energy management equipment 140 may be one example of an energy system. The hydrogen production equipment 160 may be one example of an energy source producing section and an energy source production device.

In the present embodiment, the power transmission and distribution network 122 of the community 102 is electrically connected to the system power grid 12 via the power transformation equipment 120. In the present embodiment, the power transmission and distribution network 122 of the community 104 is electrically connected to the system power grid 12 via the power transformation equipment 120.

According to the present embodiment, the community 102 and the community 104 can indirectly share electric power via the system power grid 12. It is noted that in another embodiment the community 102 and the community 104 may share electric power with each other via private distribution line (not illustrated).

Herein, the meaning of "element A and element B being electrically connected" is not limited to a case in which element A and element B are physically connected. For example, input winding and output winding in a transformer are not physically connected but are electrically connected. In addition, a member which electrically connects element A and element B may be interposed between element A and element B. Examples of the above-described member include a conductor, a circuit breaker or a switch, a transformer, or the like.

In the present embodiment, the system power grid 12 is electrically connected to a commercial power supply (not illustrated). The system power grid 12 may be an electric power system which is provided by an electric utility or an electric power transmission utility. The system power grid 12 may include an electric power system of a plurality of electric utilities or a plurality of electric power transmission utilities. The electric power system may be a system which incorporates electric power generation, electric power transformation, electric power transmission, and electric power distribution.

In the present embodiment, the communication network 14 may be a wired communication transmission path, a wireless communication transmission path, or a combination of a wireless communication transmission path and a wired communication transmission path. The communication network 14 may include a wireless packet communication network, the Internet, a P2P network, a private line, a VPN, an electric power line communication line and the like. The communication network 14: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, each of the community 102 and the community 104 may be a group composed of a plurality of suppliers/demanders. The members of each community share interests with respect to, for example, the supply and demand of energy. Each of a plurality of suppliers/demanders possesses, occupies or uses a supplier/demander facility (for example, a supplier/demander facility 112, a supplier/demander facility 114, or the like). A part of the plurality of suppliers/demanders may be a retail electric power supplier. Each of a plurality of suppliers/demanders may be one example of the user of the energy management system 100.

The supplier/demander facility may be a facility possessed by an individual or a corporation. The supplier/demander facility may be a house or office of an individual. The supplier/demander facility may be an office of a corporation. The supplier/demander facility may be a charge station which provides electricity for another user. The supplier/demander facility may be a hydrogen station which provides hydrogen for another user. The supplier/demander facility 112 and the supplier/demander facility 114 will be described in detail later.

In the present embodiment, the power transformation equipment 120 controls the electric power distribution between the system power grid 12 and the power transmission and distribution network 122. The operation of the power transformation equipment 120 may be controlled by the energy management equipment 140.

In one embodiment, the power transformation equipment 120 receives high voltage electric power of the system power grid 12 and converts at least one of the voltage and frequency of the electricity. The power transformation equipment 120 distributes converted electricity to the power transmission and distribution network 122. In another embodiment, the power transformation equipment 120 receives low voltage electric power of the power transmission and distribution network 122 and converts at least one of the voltage and frequency of the electricity. The power transformation equipment 120 distributes converted electricity to the system power grid 12 (sometimes referred to as reverse power flow). In yet another embodiment, the power transformation equipment 120 switches electric connection relationship between the system power grid 12 and the power transmission and distribution network 122. Thereby, for example, the state in which the power transmission and distribution network 122 are disconnected from the system power grid 12 and the state in which the power transmission and distribution network 122 is connected to the system power grid 12 may be switched.

In the present embodiment, the power transmission and distribution network 122 distributes electricity among a plurality of apparatuses constituting the community 102. A part of the power transmission and distribution network 122 may be power grid of an owner, manager, or operator of the system power grid 12. At least a part of the power transmission and distribution network 122 may be the power grid owned or managed by the community 102.

In the present embodiment, the energy management equipment 140 manages energy utilized by the community 102. For example, the energy management equipment 140 manages the demand and supply of the energy or energy source utilized by the community 102. Examples of the energy include electricity, heat, or the like. Examples of the energy source include liquid fuel, gaseous fuel, hydrogen source, or the like.

The detail of liquid fuel, gaseous fuel, and hydrogen source is not particularly limited. Examples of liquid fuel include (i) alcohol such as methanol, ethanol, propanol, butanol, or the like, (ii) liquefied petroleum gas such as liquefied natural gas, liquefied propane gas, or the like, (iii) liquid fossil fuel, (iv) liquid biofuel, (v) liquid hydrogen, (vi) liquid organic hydrogen storage material (sometimes referred to as organic halide), or the like. Examples of gaseous fuel include natural gas, methane gas, propane gas, butane gas, hydrogen gas, or the like. Examples of hydrogen source include hydrogen gas, alcohol, hydrogen storage alloy, organic hydrogen storage material, or the like. The organic hydrogen storage material may be organic halide.

In the present embodiment, the energy management equipment 140 manages the electric power utilized by the community 102. For example, the energy management equipment 140 manages the stability and quality of electric power provided via the power transmission and distribution network 122. The energy management equipment 140 may manage the electric power supply and demand of the community 102. For example, the energy management equipment 140 manages, for example, the electric power transmission and reception between the power transmission and distribution network 122 and each of the supplier/demander facility 112 and the supplier/demander facility 114.

The energy management equipment 140 may monitor the state of the electric power supply and demand of the community 102 and adjust the excess or deficiency of the electricity flowing through the power transmission and distribution network 122. In the present embodiment, the energy management equipment 140 may aggregate or adjust the electric power supply and demand of a plurality of supplier/demander facilities. The equipment which aggregates or adjusts the electric power supply and demand of a plurality of supplier/demander facilities is sometimes referred to as an aggregator.

In the present embodiment, for a simple description, the detail of the energy management system 100 and the energy management equipment 140 is described using, as an example, a case in which the energy management equipment 140 manages the electric power utilized in the community 102. However, the energy management system 100 and the energy management equipment 140 are not limited to the present embodiment. In another embodiment, the energy management equipment 140 may manage energy other than electric power.

The energy management equipment 140 may output to the power transformation equipment 120 the instruction for the power transformation equipment 120 to switch the electric connection relationship between the system power grid 12 and the power transmission and distribution network 122. Thereby, the energy management equipment 140 can switch, for example, the state in which the power transmission and distribution network 122 is disconnected from the system power grid 12 and the state in which the power transmission and distribution network 122 is connected to the system power grid 12. The energy management equipment 140 will be described in detail later.

In the present embodiment, the hydrogen production equipment 160 utilizes electric power to produce hydrogen. The detail of production steps of hydrogen is not particularly limited. The hydrogen production equipment 160 produces hydrogen with, for example, an electrochemical method. The hydrogen production equipment 160 may produce hydrogen with a chemical method or may produce hydrogen with a biological method. As described above, the hydrogen may be one example of an energy source.

In one embodiment, the hydrogen production equipment 160 utilizes the electric power supplied from at least one of the system power grid 12 and the power transmission and distribution network 122 to produce hydrogen. In another embodiment, the hydrogen production equipment 160 utilizes electric power supplied from the electric power storage device (not illustrated) electrically connected to the hydrogen production equipment 160 to produce hydrogen. In yet another embodiment, the hydrogen production equipment 160 utilizes electric power supplied from both of (i) at least one of the system power grid 12 and the power transmission and distribution network 122 and (ii) the electric power storage device (not illustrated) electrically connected to the hydrogen production equipment 160 to produce hydrogen. The hydrogen production equipment 160 will be described in detail later.

In the present embodiment, the wide area management server 180 manages the stability and quality of the electric power provided via the system power grid 12. The wide area management server 180 may manage the electric power supply and demand of the system power grid 12. For example, the wide area management server 180 manages the electric power transmission and reception between the system power grid 12 and each of the community 102 and the community 104. The wide area management server 180 may manage (i) the electric power transmission from the system power grid 12 to each of the community 102 and the community 104 and (ii) the electric power transmission from each of the community 102 and the community 104 to the system power grid 12. The wide area management server 180 may monitor the state of the electric power supply and demand of the system power grid 12 and adjust the excess or deficiency of the electricity flowing through the system power grid 12.

[Specific Configurations of Each Section of Energy Management System 100]

The each section of the energy management system 100 may be implemented by hardware, software or a combination of the hardware and the software. At least some of each section of the energy management system 100 may be implemented by a single server or may be implemented by a plurality of servers. At least some of each section of the energy management system 100 may be implemented on a virtual machine or a cloud system. At least some of each section of the energy management system 100 may be implemented by a personal computer or a mobile terminal. As the mobile terminal, a mobile phone, a smartphone, a PDA, a tablet, a notebook computer, a laptop computer, a wearable computer or the like are exemplified. The each section of the energy management system 100 may be configured to store information by using a distributed ledger technology such as a block chair or a distributed network.

In a case in which at least some of the components constituting the energy management system 100 are implemented by software, the components to be implemented by the software may be implemented by activating a program, in which operations relating to the components are prescribed, in an information processing device having a general configuration. The above-described information processing device includes, for example, (i) a data processing device including a processor such as a CPU, a GPU and the like, a ROM, a RAM, a communication interface, and the like, (ii) an input device such as a keyboard, a touch panel, a camera, a microphone, various types of sensors, a GPS receiver, and the like, (iii) an output device such as a display device, a speaker, a vibration device and the like, and (iv) a storage device (including an external storage device) such as a memory, an HDD and the like. In the above-described information processing device, the above-described data processing device or storage device may be configured to store a program. The above-described program may be stored in a non-transitory, computer-readable recording medium. The above-described program is executed by the processor, thereby causing the above-described information processing device to execute the operations prescribed by the program.

The program may be stored in a computer-readable medium such as a CD-ROM, a DVD-ROM, a memory, a hard disk and the like, or may be stored in a storage device connected to a network. The program may be installed into a computer configuring at least a part of the energy management system 100 from a computer-readable medium or a storage device connected to a network. The program may be executed to cause the computer to function as at least a part of each section of energy management system 100. The program for causing the computer to function as at least a part of each section of the energy management system 100 may have a module in which operations of each section of the energy management system 100 are prescribed. The program or the module is configured to activate the data processing device, the input device, the output device, the storage device and the like to cause the computer to function as each section of the energy management system 100 or to cause the computer to execute an information processing method in each section of the energy management system 100. The information processing described in the program functions as a specific means in which software relating to the program and various types of hardware resources of the energy management system 100 cooperate with each other, as the program is read into the computer. The above-described specific means implements calculation or processing of information according to a use purpose of the computer of the present embodiment, so that the energy management system 100 is established according to the use purpose.

[Summary of Each Section of Supplier/Demander Facility]

Figure 2:
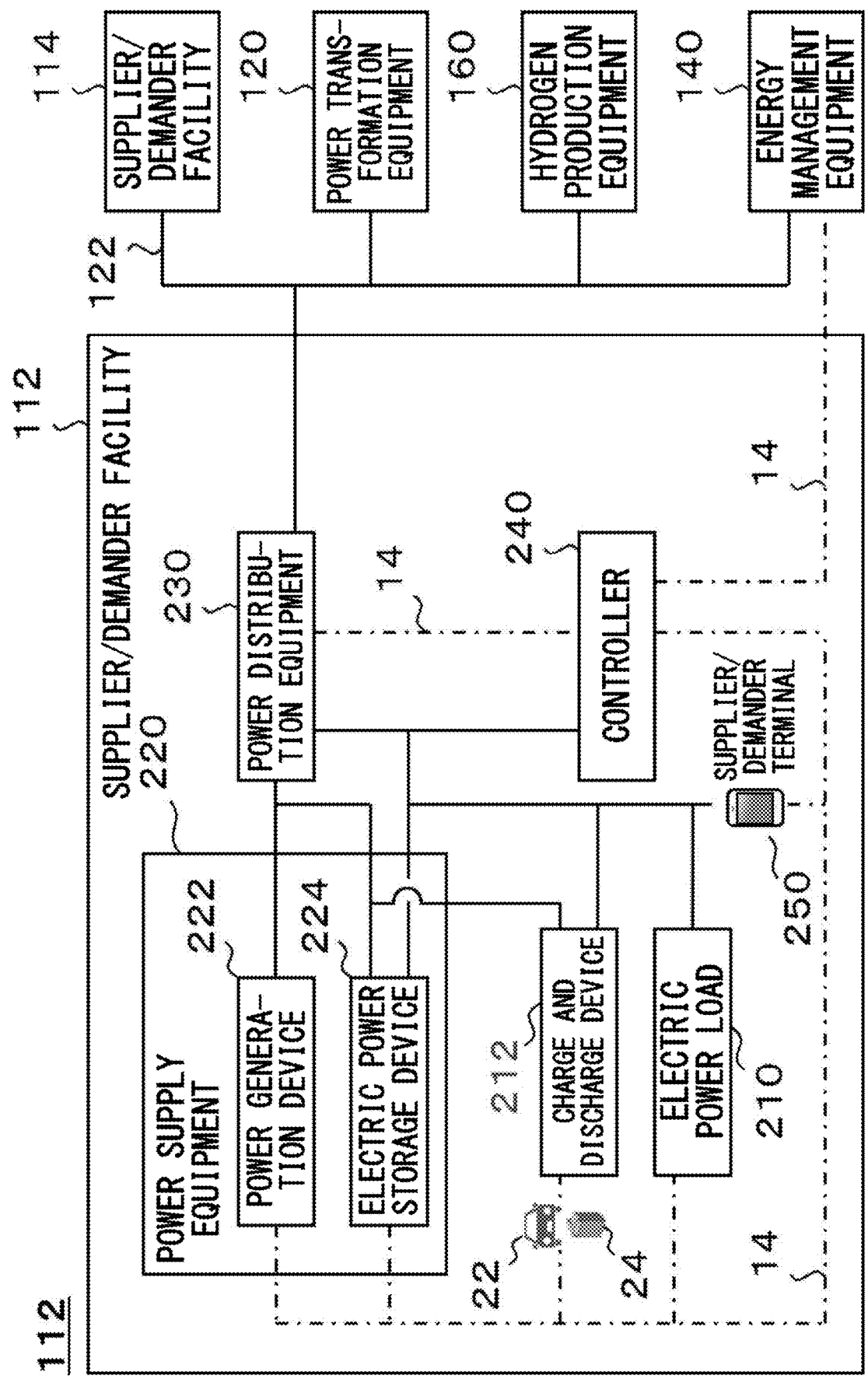
FIG. 2 schematically shows one example of an internal configuration of a supplier/demander facility 112.

FIG. 2 schematically shows one example of the internal configuration of the supplier/demander facility 112. In the present embodiment, the supplier/demander facility 112 includes one or more electric power loads 210, one or more charge and discharge devices 212, and power supply equipment 220. The supplier/demander facility 112 may include power distribution equipment 230, a controller 240, and one or more supplier/demander terminals 250. In the present embodiment, the power supply equipment 220 includes one or more power generation devices 222 and one or more electric power storage devices 224. It is noted that the supplier/demander facility 112 may not have at least one of the above-described components. In one embodiment, the supplier/demander facility 112 may not include the power supply equipment 220. In another embodiment, the supplier/demander facility 112 may not include one of the power generation device 222 and the electric power storage device 224. In another embodiment, the supplier/demander facility 112 may not include the supplier/demander terminal 250. It is noted that the supplier/demander facility 114 may have the components similar to the supplier/demander facility 112.

The charge and discharge device 212 may be one example of the electric power controlling section. The power distribution equipment 230 may be one example of the electric power controlling section and the energy information obtaining section. The controller 240 may be one example of the electric power controlling section and the energy information obtaining section. The power generation device 222 may be one example of the power generating section. The electric power storage device 224 may be one example of the electric power storage device disposed in the building.

In the present embodiment, the electric power load 210 uses electricity. The electric power load 210 may be an electric apparatus which consumes electric power. The operation of at least a part of the electric power load 210 may be controlled by the controller 240.

In the present embodiment, the charge and discharge device 212 may be electrically connected to the power distribution equipment 230. The charge and discharge device 212 may be electrically connected to the power distribution equipment 230 via the discharging electric wire which conducts electricity from the charge and discharge device 212 to the power distribution equipment 230 and the charging electric wire which conducts the electricity from the power distribution equipment 230 to the charge and discharge device 212. The charge and discharge device 212 may be electrically connected to the electric apparatus disposed inside the supplier/demander facility 112 via the power distribution equipment 230. The charge and discharge device 212 may be electrically connected to the power transmission and distribution network 122 via the power distribution equipment 230.

In the present embodiment, the charge and discharge device 212 is electrically connected to various types of storage batteries. The charge and discharge device 212 and various types of storage batteries may be connected such that they are physically detachable. The charge and discharge device 212 and various types of storage batteries may transmit and receive electric power with each other via power supply cable, or may transmit and receive electric power with each other in wireless power supply manner. Examples of various types of storage batteries include a storage battery of the electric vehicle 22 (not illustrated), a portable storage battery 24, a storage battery of the supplier/demander terminal 250 (not illustrated), or the like.

Various types of storage batteries may be one example of the electric power storage device. The electric vehicle 22 may be one example of the movable object. The storage battery of the electric vehicle 22 may be one example of the storage battery disposed in the movable object. The portable storage battery 24 may be one example of the transportable electric power storage device. The storage battery of the supplier/demander terminal 250 may be one example of the transportable electric power storage device.

The transportable electric power storage device is conveyed by an animal or movable object. The transportable electric power storage device may be attached to or carried by an animal, may be mounted to a movable object, or may be towed by the movable object. The movable object may be an apparatus which travels on the ground, may be an apparatus which flies in the air, or may be an apparatus which navigates in the water or on the water. The movable object may move in response to a user operation, or may move due to an autonomous movement function (sometimes referred to as auto cruise, a cruise control, or the like) of the computer mounted in the movable object. Examples of the movable object include a vehicle, a marine vessel, a flight object, or the like. Examples of the vehicle include a motor vehicle, a two-wheeled motor vehicle, a train, or the like.

Examples of the motor vehicle include an engine car, an electric vehicle, a fuel battery vehicle, a hybrid car, a working machine, or the like. Examples of the two-wheeled motor vehicle include (i) a motorcycle, (ii) a three wheeled motorcycle, (iii) Segway (registered trademark), Kickboard (registered trademark) equipped with a power unit, a skate board equipped with a power unit, a standing two-wheeled vehicle equipped with a power unit, or the like. Examples of a ship include a boat, a hovercraft, a personal watercraft, a submarine, a submersible, an underwater scooter, and the like. Examples of a flight object include an airplane, an airship, a balloon, a helicopter, a drone, or the like.

In one embodiment, the charge and discharge device 212 supplies electricity to the storage battery electrically connected to the charge and discharge device 212 and charges the storage battery. For example, the charge and discharge device 212 utilizes the electric power supplied from the system power grid 12 or the power transmission and distribution network 122 to charge the above-described storage battery. More specifically, the charge and discharge device 212 receives electricity from the power transmission and distribution network 122 via the power distribution equipment 230. In addition, the charge and discharge device 212 supplies to the above-described storage battery the electricity received from the power transmission and distribution network 122. The charge and discharge device 212 may control the transmission and reception of electric power between the above-described storage battery and the power transmission and distribution network 122. For example, the charge and discharge device 212 may control the magnitude of the charge current of the above-described storage battery.

In another embodiment, the charge and discharge device 212 discharges the storage battery electrically connected to the charge and discharge device 212. For example, the charge and discharge device 212 supplies to the system power grid 12 or the power transmission and distribution network 122 the electric power output from the above-described storage battery. More specifically, the charge and discharge device 212 receives electricity discharged by the above-described storage battery. In addition, the charge and discharge device 212 supplies, to the power transmission and distribution network 122 via the power distribution equipment 230, the electricity discharged by the above-described storage battery. The charge and discharge device 212 may control the transmission and reception of electric power between the above-described storage battery and the power transmission and distribution network 122. For example, the charge and discharge device 212 may control the magnitude of the discharge current of the above-described storage battery.

In the present embodiment, while various types of storage battery are electrically connected to the charge and discharge device 212, the storage battery may be treated as a part of the electric power storage device 224. For example, when the electric vehicle 22 or the portable storage battery 24 is electrically connected to the charge and discharge device 212, at least one of the dischargeable amount (sometimes referred to as a remaining amount) and the chargeable amount of the electric power storage device 224 increase. On the other hand, when the electric connection relationship between the electric vehicle 22 or the portable storage battery 24 and the charge and discharge device 212 is disconnected, at least one of the dischargeable amount (sometimes referred to as a remaining amount) and the chargeable amount of the electric power storage device 224 decrease.

In the present embodiment, the power supply equipment 220 supplies electric power to another apparatus. For example, the power supply equipment 220 is electrically connected to the power distribution equipment 230, and supplies electric power to another apparatus via the power distribution equipment 230. The electric power provided by the power supply equipment 220 of the supplier/demander facility 112 (i) may be used within the supplier/demander facility 112, (ii) may be provided to the outside of the supplier/demander facility 112 via the power distribution equipment 230 of the supplier/demander facility 112, or (iii) may be provided to the outside of the community 102 via the power transformation equipment 120 of the community 102. The operation of the power supply equipment 220 may be controlled by the controller 240.

In the present embodiment, the power generation device 222 generates electricity. Examples of the power generation device 222 include (i) a power generation device which utilizes renewable energy, such as a solar power generation device, wind power generation device, water power generation device, or the like, (ii) a fuel battery, (iii) a cogeneration system, (iv) a tri-generation system, or the like.

The power generation device 222 may include a fuel battery which utilizes hydrogen produced by the hydrogen production equipment 160 to generate electricity. Between the above-described fuel battery and the hydrogen production equipment 160, pipeline to distribute hydrogen may be disposed. A transportable hydrogen cylinder may be utilized for the transportation of hydrogen between the above-described fuel battery and the hydrogen production equipment 160.

A transportable hydrogen cylinder stores hydrogen. The transportable hydrogen cylinder is conveyed by an animal or a movable object. The transportable hydrogen cylinder may be attached to or carried by an animal, may be mounted to a movable object, or may be towed by the movable object. The transportable hydrogen cylinder may be one example of the second storage container.

The power generation device 222 may supply, to the system power grid 12 or the power transmission and distribution network 122 via the power distribution equipment 230, electric power generated by the fuel battery. The power generation device 222 may supply, to a various types of storage battery electrically connected to the electric power storage device 224 or the charge and discharge device 212 via the power distribution equipment 230, the electric power generated by the fuel battery.

It is noted that in a case where the energy management system 100 includes lower alcohol production equipment which utilizes electric power to produce lower alcohol such as methanol, ethanol, or the like, the power generation device 222 may include a fuel battery which generates electricity utilizing hydrogen produced by the lower alcohol production device. In addition, in a case where the energy management system 100 includes a fuel production device which utilizes electric power to produce fuel for thermal power generation, the power generation device 222 may include a thermal power generation device which utilizes the fuel produced by the fuel production device to generate electricity.

In the present embodiment, the electric power storage device 224 accumulates electricity. The electric power storage device 224 (i) may accumulate electricity generated by the power generation device 222 of the supplier/demander facility 112 or (ii) may accumulate the electricity provided from the outside of the supplier/demander facility 112. In the present embodiment, the electric power storage device 224 supplies electric power to another apparatus. The electric power provided by the electric power storage device 224 of the supplier/demander facility 112 (i) may be used within the supplier/demander facility 112, (ii) may be provided to the outside of the supplier/demander facility 112 via the power distribution equipment 230 of the supplier/demander facility 112, or (iii) may be provided to the outside of the community 102 via the power transformation equipment 120 of the community 102.

In the present embodiment, the electric power storage device 224 may be electrically connected to the power distribution equipment 230. The electric power storage device 224 may be electrically connected to the power distribution equipment 230 via the discharging electric wire which conducts electricity from the electric power storage device 224 to the power distribution equipment 230, and the charging electric wire which conducts electricity from the power distribution equipment 230 to the electric power storage device 224.

In the present embodiment, the power distribution equipment 230 controls the distribution of electric power between the power transmission and distribution network 122 and the wiring inside the supplier/demander facility 112. For example, the power distribution equipment 230 controls the transmission and reception of electric power between (i) the storage battery electrically connected to the charge and discharge device 212 and (ii) the system power grid 12 or the power transmission and distribution network 122. The operation of the power distribution equipment 230 may be controlled by the controller 240.

In one embodiment, the power distribution equipment 230 is configured to receive the supply of electric power from the power transmission and distribution network 122. The power distribution equipment 230 is configured to supply electric power to an electric apparatus disposed within the supplier/demander facility 112. The power distribution equipment 230 may be configured to adjust at least one of a voltage and a frequency of electricity that is to be supplied to the electric apparatus disposed within the supplier/demander facility 112. The power distribution equipment 230 may be configured to convert alternate current into direct current or may convert direct current into alternate current.

In another embodiment, the power distribution equipment 230 is configured to receive the supply of electric power from the power supply equipment 220 of the supplier/demander facility 112. The power distribution equipment 230 is configured to supply electric power to the power transmission and distribution network 122. The power distribution equipment 230 may be configured to adjust at least one of a voltage and a frequency of electricity that is to be supplied to the power transmission and distribution network 122. The power distribution equipment 230 may be configured to convert alternate current into direct current or may convert direct current into alternate current.

Also, in yet another embodiment, the power distribution equipment 230 is configured to control an amount of current that is to be supplied into the supplier/demander facility 112. The power distribution equipment 230 may be configured to switch an electric connection relationship between the power transmission and distribution network 122 and the internal wiring of the supplier/demander facility 112. For example, the power distribution equipment 230 has a breaker, and breaks current when a value of the current flowing through the power distribution equipment 230 exceeds any threshold value. The above-described threshold value may be set at any timing by the controller 240.

In the present embodiment, the power distribution equipment 230 may measure at least one of the instantaneous power [kW] and the electric power amount [kWh] of the electricity supplied to the electric apparatus disposed inside the supplier/demander facility 112. The power distribution equipment 230 may measure at least one of the instantaneous power [kW] and the electric power amount [kWh] of the electricity supplied to the power transmission and distribution network 122. The power distribution equipment 230 may include one or more electricity meters. The power distribution equipment 230 may output to the controller 240 the information indicating at least one of the measured instantaneous power [kW] and electric power amount [kWh]. The power distribution equipment 230 and the controller 240 may transmit and receive information via the communication network 14. The communication network 14 may be LAN arranged inside the supplier/demander facility 112, or may be communication network which utilizes a base station or access point outside the facility.

In the present embodiment, the controller 240 is configured to control at least a part of apparatuses disposed within the supplier/demander facility 112. The controller 240 may be configured to monitor a state of at least a part of the apparatuses disposed within the supplier/demander facility 112. The controller 240 may be configured to transmit and receive information to and from each apparatus via the communication network 14. The controller 240 will be described in detail later.

In the present embodiment, the controller 240 may execute a variety of information processing in cooperation with the energy management equipment 140, in some cases. However, sharing of information processing to be executed in the energy management equipment 140 and information processing to be executed in the controller 240 is not limited to the present embodiment. In another embodiment, the controller 240 may be configured to execute a part of the information processing in the energy management equipment 140 of the present embodiment, and the energy management equipment 140 may be configured to execute a part of the information processing in the controller 240 of the present embodiment.

The controller 240 may be implemented by hardware, software or a combination of the hardware and the software. In a case in which at least some of the components constituting the controller 240 are implemented by software, the components to be implemented by the software may be implemented by activating a program, in which operations relating to the components are prescribed, in an information processing device having a general configuration.

The above-described information processing device includes, for example, (i) a data processing device including a processor such as a CPU and a GPU, a ROM, a RAM, and a communication interface (ii) an input device such as a keyboard, a touch panel, a camera, a microphone, various types of sensors, and a GPS receiver, (iii) an output device such as a display device, a speaker, and a vibration device and (iv) a storage device (including an external storage device) such as a memory and an HDD. In the above-described information processing device, the above-described data processing device or storage device may be configured to store a program. The above-described program may be stored in a non-transitory, computer-readable recording medium. The above-described program is executed by the processor, thereby causing the above-described information processing device to execute the operations prescribed by the program. The above-described program may be a program for causing the computer to execute one or more sequences relating to a variety of information processing in the controller 240.

In the present embodiment, the supplier/demander terminal 250 is a communication terminal that is to be used by a user of the supplier/demander facility 112, and the detail is not particularly limited. As the supplier/demander terminal 250, a personal computer, a mobile terminal and the like may be exemplified. As the mobile terminal, a mobile phone, a smartphone, a PDA, a tablet, a notebook computer, a laptop computer, a wearable computer or the like may be exemplified. The supplier/demander terminal 250 may be used as a user interface of the controller 240. The supplier/demander terminal 250 may be one example of the electric power load 210.

In one embodiment, the supplier/demander terminal 250 is configured to transmit and receive information to and from the controller 240 via the communication network 14. In another embodiment, the supplier/demander terminal 250 is configured to transmit and receive information to and from the energy management equipment 140 via the communication network 14.

Figure 3:
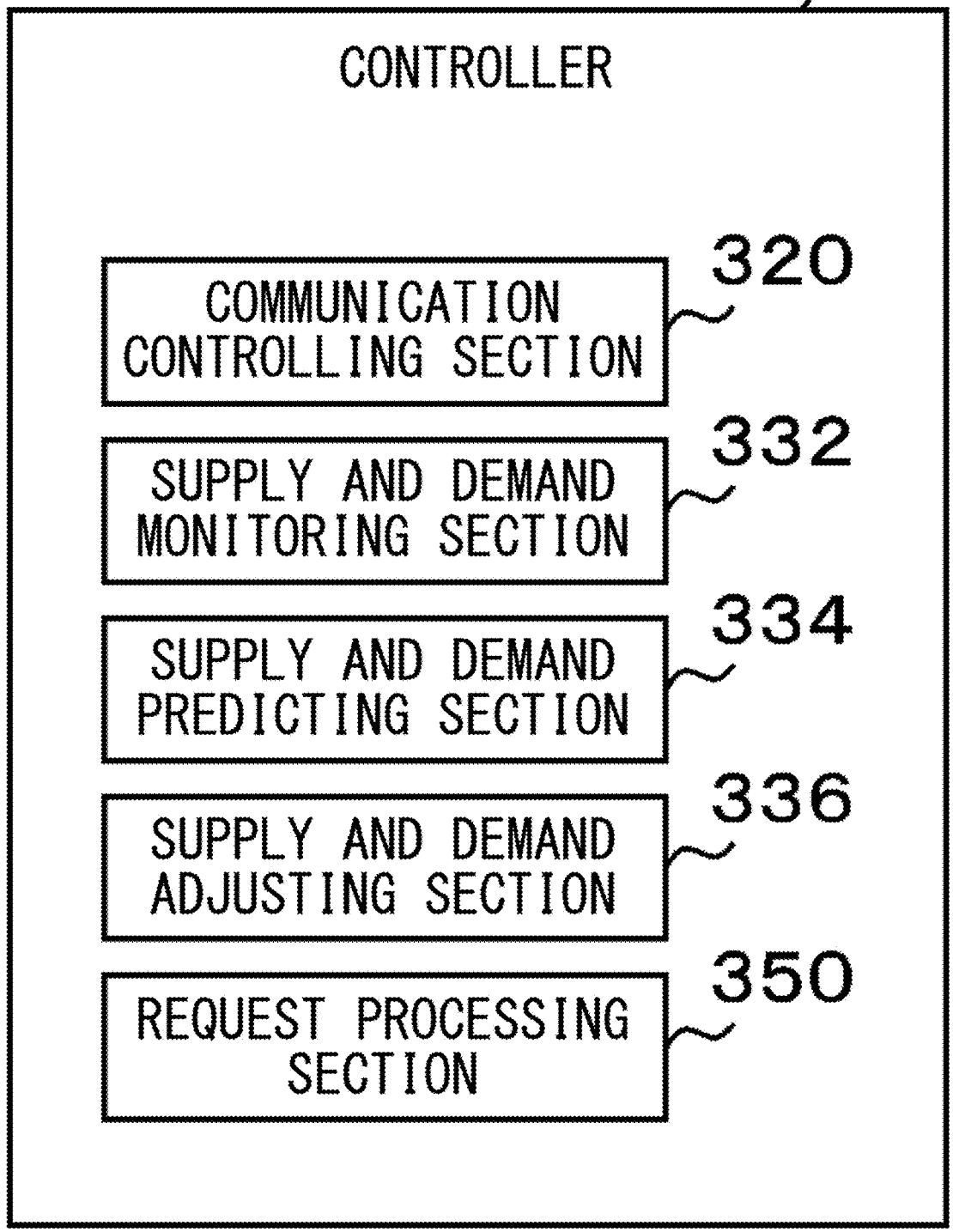
FIG. 3 schematically shows one example of an internal configuration of a controller 240.

FIG. 3 schematically shows one example of the internal configuration of the controller 240. In the present embodiment, the controller 240 includes a communication controlling section 320, a supply and demand monitoring section 332, a supply and demand predicting section 334, a supply and demand adjusting section 336, and a request processing section 350.

For the supplier/demander facility 112, the supply and demand monitoring section 332 of the supplier/demander facility 114 may be one example of the supply and demand status obtaining section. Similarly, for the supplier/demander facility 114, the supply and demand monitoring section 332 of the supplier/demander facility 112 may be one example of the supply and demand status obtaining section.

In the present embodiment, the communication controlling section 320 controls the communicating between the controller 240 and another apparatus. The communication controlling section 320 may be various types of communication interface. The communication controlling section 320 may correspond to one or more communication manners. In one embodiment, the communication controlling section 320 controls the communication between the controller 240 and another apparatus disposed inside the supplier/demander facility 112. In another embodiment, the communication controlling section 320 controls the communication between the controller 240 and the energy management equipment 140.

In the present embodiment, the supply and demand monitoring section 332 monitors the electric power supply and demand of the supplier/demander facility 112. The supply and demand monitoring section 332 obtains the information related to the status of the electric power supply and demand at the supplier/demander facility 112. The supply and demand monitoring section 332 may obtain the information related to the status of the electric power supply and demand from at least one of the electric power load 210, the power supply equipment 220, and the power distribution equipment 230.

The supply and demand monitoring section 332 may acquire the information about the status of the electric power supply and demand when a predetermined event occurs. As the predetermined event, (i) an event that predetermined time has come, (ii) an event that a predetermined time period has elapsed after the previous acquisition of the above-described information, (iii) an event that an instruction to acquire the above-described information is received from the supplier/demander terminal 250, and the like may be exemplified.

The supply and demand monitoring section 332 may be configured to acquire the information about the status of the electric power supply and demand every unit period. A length of the unit period is not particularly limited. The unit period may be 5 minutes, 10 minutes, 15 minutes, 30 minutes, one hour, 2 hours, 3 hours, 6 hours, 12 hours or one day.

As the information about the status of the electric power supply and demand of the supplier/demander facility 112, information about electric power (sometimes referred to as demand electric power) consumed by the supplier/demander facility 112, information about electric power supplied by the supplier/demander facility 112, information about electric power accumulated by the electric power storage device 224 of the supplier/demander facility 112, information about surplus electric power of the supplier/demander facility 112, information about electric power transmitted to the outside by the supplier/demander facility 112, information about electric power received from the outside by the supplier/demander facility 112, and the like may be exemplified. As the information about electric power, information indicative of a statistical value of the instantaneous power [kW] during each unit period, information indicative of the electric power amount [kWh] during each unit period, and the like may be exemplified.

As the statistical value, a maximum value, a minimum value, an average value, a medium value, a mode value, a degree of scatter and the like may be exemplified. For simple descriptions, [kW] is used as a unit of the instantaneous power. However, other units can also be used. Likewise, [kWh] is used as a unit of the electric power amount, but other units can also be used.

The supply and demand monitoring section 332 may be configured to transmit the information about the status of the electric power supply and demand to the energy management equipment 140. The supply and demand monitoring section 332 may be configured to transmit the information about the status of the electric power supply and demand to the energy management equipment 140, in association with information indicative of demand or supply of electric power, or time or time period at which electric power transmission and reception has occurred. The supply and demand monitoring section 332 may be configured to store the information about the status of the electric power supply and demand in a storage section (not shown) of the controller 240. In the meantime, as the term indicating time or time period, terms such as a timing, a moment and the like may also be used.

In the present embodiment, the supply and demand predicting section 334 is configured to predict at least one of electric power demand and electric power supply of the supplier/demander facility 112 at a future time or time period. The time or time period at which the prediction is made may also be sometimes referred to as prediction timing. The supply and demand predicting section 334 is configured to predict the electric power supply and demand of the supplier/demander facility 112 at prediction timing, based on information (sometimes also be referred to as supply and demand record) about the electric power supply and demand of the supplier/demander facility 112 during any past time period, for example. The supply and demand predicting section 334 may be configured to predict at least one of the statistical value of the instantaneous power and the electric power amount at prediction timing.

The supply and demand predicting section 334 may be configured to prepare a variety of plans relating to the electric power supply and demand by using a prediction result of the electric power supply and demand. For example, the supply and demand predicting section 334 prepares at least one of a power generation plan of the power generation device 222 and a charge and discharge plan of the electric power storage device 224, based on a predicted value of the electric power demand. The supply and demand predicting section 334 may be configured to prepare a plan relating to use restriction of the electric power load 210, based on a predicted value of the electric power supply. The supply and demand predicting section 334 may be configured to prepare a plan relating to electric power transmission and reception of the supplier/demander facility 112 and the power transmission and distribution network 122, based on the predicted value of the electric power demand, the predicted value of the electric power supply and the predicted value of a remaining amount of electric power accumulated in the electric power storage device 224, for example.

The supply and demand predicting section 334 may be configured to transmit information indicative of a prediction result to the energy management equipment 140. The supply and demand predicting section 334 may be configured to associate information indicative of prediction timing and a prediction result corresponding to the prediction timing, and to transmit the same to the energy management equipment 140. The supply and demand predicting section 334 may be configured to store the information indicative of the prediction result in the storage section (not shown) of the controller 240. The information indicative of the prediction result may include the information about the above-described plan.

In the present embodiment, the supply and demand adjusting section 336 is configured to adjust the supply and demand of the supplier/demander facility 112. For example, the supply and demand adjusting section 336 adjusts at least one of demand electric power and supply electric power of the supplier/demander facility 112 by controlling one or more apparatuses disposed within the supplier/demander facility 112. The supply and demand adjusting section 336 may be configured to adjust at least one of a transmitted electric power amount to the power transmission and distribution network 122 and a received electric power amount from the power transmission and distribution network 122 by controlling one or more apparatuses disposed within the supplier/demander facility 112. The supply and demand adjusting section 336 may be configured to generate a command for controlling at least one of one or more apparatuses disposed within the supplier/demander facility 112. The supply and demand adjusting section 336 may be configured to transmit the generated command to an apparatus corresponding to the command.

The supply and demand adjusting section 336 may be configured to adjust the supply and demand of the supplier/demander facility 112, based on at least one of a monitoring result of the supply and demand monitoring section 332 and a prediction result of the supply and demand predicting section 334. For example, the supply and demand adjusting section 336 adjusts the supply and demand of the supplier/demander facility 112, based on the plan of the electric power supply and demand prepared by the supply and demand predicting section 334 and the record of the electric power supply and demand acquired by the supply and demand monitoring section 332.

The supply and demand adjusting section 336 may be configured to determine a degree of tightness for electric power supply and demand, based on the monitoring result of the supply and demand monitoring section 332. The supply and demand adjusting section 336 may be configured to estimate a degree of tightness for future electric power supply and demand, based on the prediction result of the supply and demand predicting section 334. The degree of tightness for electric power supply and demand may be a parameter indicative of a probability of electric power shortage. The degree of tightness for electric power supply and demand may be indicated by continuous numerical values or may be indicated by stepwise divisions. Each division may be distinguished by a symbol or a character or may be distinguished by a number.

The degree of tightness for electric power supply and demand may be determined, based on at least one of the surplus electric power and the surplus supply capability of electric power. For example, the degree of tightness for electric power supply and demand is determined, based on (i) a ratio of the surplus electric power or the surplus supply capability to the demand electric power, (ii) a ratio of the surplus electric power or the surplus supply capability to the supply capability of electric power, (iii) an electric power supply and demand state of the system power grid 12 provided from a manager or operator of the system power grid 12, and the like. The degree of tightness for electric power supply and demand may be determined, based on electric power supply when electric power is not received from the outside. The supply and demand adjusting section 336 may be configured to acquire information, which indicates an electric power supply and demand state of the system power grid 12, from the wide-area management server 180.

In the present embodiment, the request processing section 350 is configured to accept various types of requests from other apparatuses and to process the requests. In one embodiment, the request processing section 350 is configured to process requests from other apparatuses disposed within the supplier/demander facility 112. For example, the request processing section 350 processes a request from the supplier/demander terminal 250. The request processing section 350 may be configured to generate requests to other apparatuses and to transmit the requests to the other apparatuses, in correspondence to the request from the supplier/demander terminal 250. In another embodiment, the request processing section 350 is configured to process requests from other apparatuses outside the supplier/demander facility 112. For example, the request processing section 350 is configured to process a request from the supplier/demander facility 114 or the energy management equipment 140.

[Summary of Energy Management Equipment 140]

Figure 4:
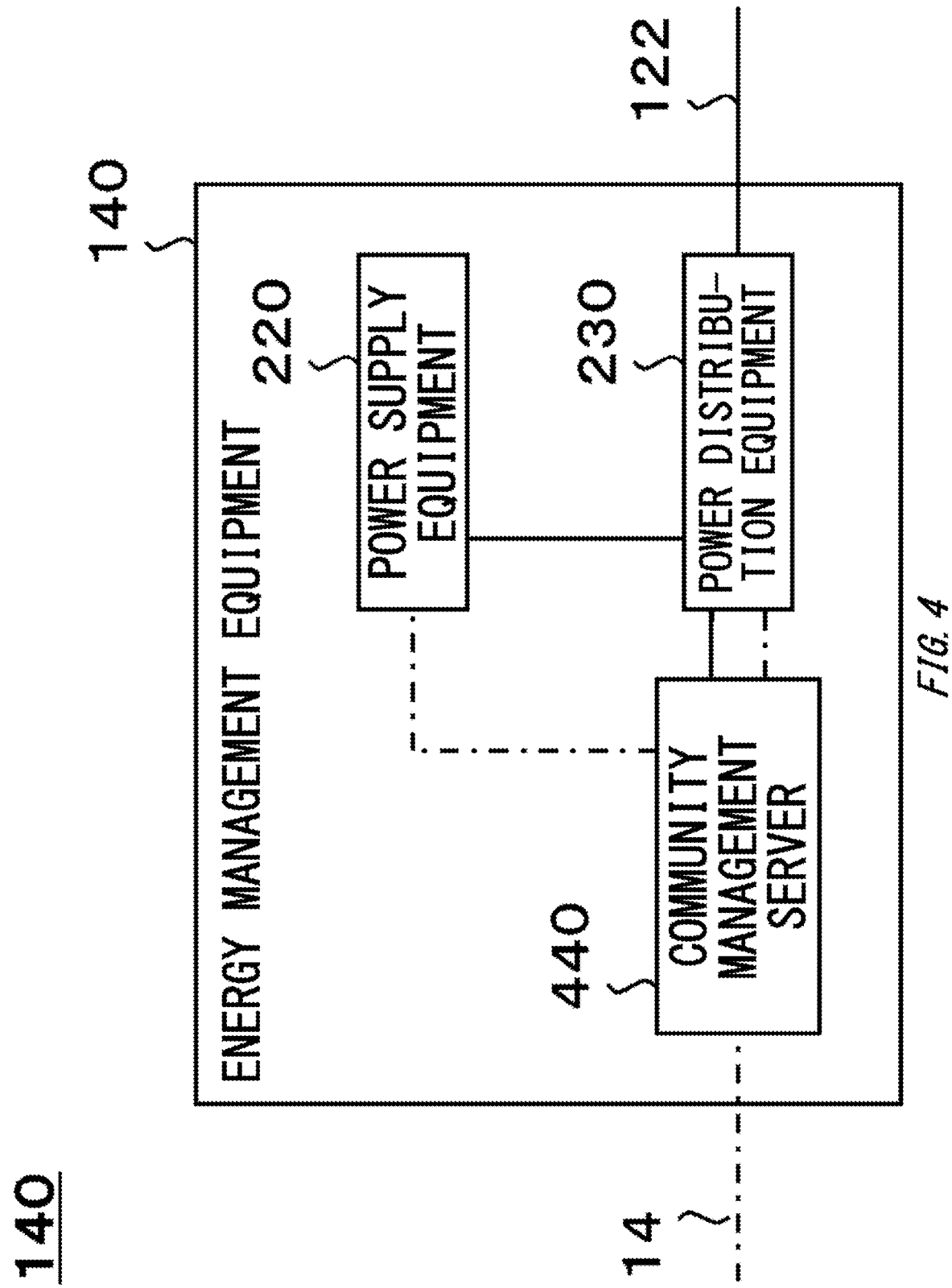
FIG. 4 schematically shows one example of an internal configuration of energy management equipment 140.

FIG. 4 schematically shows one example of the internal configuration of the energy management equipment 140. In the present embodiment, the energy management equipment 140 includes power supply equipment 220, power distribution equipment 230, and a community management server 440. The community management server 440 may be one example of the energy system and energy management server. It is noted that, as described above, in another embodiment, the energy management equipment 140 may include the hydrogen production equipment 160.

In the present embodiment, the power supply equipment 220 is different from the power supply equipment 220 of the supplier/demander facility 112, in that it operates under control of the community management server 440. As to features except the above-described difference, the power supply equipment 220 of the energy management equipment 140 may have a similar configuration to the power supply equipment 220 of the supplier/demander facility 112.

In the present embodiment, the power distribution equipment 230 is different from the power distribution equipment 230 of the supplier/demander facility 112, in that it is configured to control electric power distribution between the power transmission and distribution network 122 and each of the power supply equipment 220 and the community management server 440. As to features except the above-described difference, the power distribution equipment 230 of the energy management equipment 140 may have a similar configuration to the power distribution equipment 230 of the supplier/demander facility 112.

[Outline of Community Management Server 440]

In the present embodiment, the community management server 440 is configured to manage energy that is used in the community 102. For example, the community management server 440 is configured to manage electric power that is used in the community 102. The community management server 440 is configured to manage the electric power supply and demand of the community 102. The community management server 440 may be configured to manage power sharing within the community 102. The community management server 440 may be configured to manage power sharing between the community 102 and another community.

The community management server 440 performs a process to maintain the stability and quality of electricity flowing through the power transmission and distribution network 122. The community management server 440 performs a process to maintain the stability and quality of electricity flowing through the system power grid 12. The community management server 440 may perform the process to cooperate with the wide area management server 180 and maintain the stability and quality of the electricity flowing through the system power grid 12.

In the present embodiment, the community management server 440 manages the transmission and reception of electric power between (i) the system power grid 12 or the power transmission and distribution network 122, and (ii) the electric power storage device electrically connected to the charge and discharge device 212 disposed in one of a plurality of supplier/demander facilities which constitutes the community 102 (for example, the storage battery of the electric vehicle 22 or the portable storage battery 24). In one embodiment, the community management server 440 controls the transmission and reception of the above-described electric power. In another embodiment, the community management server 440 controls the information related to the transmission and reception of the above-described electric power.

For example, the community management server 440 associates and stores (i) the information indicating a time or period, and (ii) the information indicating the electric power amount transmitted and received between the system power grid 12 or the power transmission and distribution network 122 and the above-described storage battery. The community management server 440 may manage the information related to the transmission and reception of the electric power between the electric power storage device and the system power grid 12 or the power transmission and distribution network 122 for every user of the electric power storage device. Thereby, even if the same user owns, occupies, or uses a plurality of storage batteries, the community management server 440 can manage the electric power amount which the user supplies to the system power grid 12 or the power transmission and distribution network 122 at a particular time or period. Similarly, at the particular time or period, the above-described community management server 440 can manage the electric power amount received from the system power grid 12 or the power transmission and distribution network 122.

In the present embodiment, the community management server 440 may manage the electric power amount [kWh] which each user of the energy management system 100 supplies to the system power grid 12 or the power transmission and distribution network 122, by converting it to another value. Examples of another value include (i) monetary value, (ii) electronic value, (iii) proprietary value, (iv) an amount of another type of energy or energy source, or the like. Examples of the monetary value include currency, money, or the like. Examples of electronic value include a point, mileage, electronic money, or the like. Examples of proprietary value include cryptocurrency. It is noted that the cryptocurrency may be one example of the monetary value or the electronic value, depending on the nation. Examples of another type of an energy source include hydrogen, lower alcohol, or the like.

For example, the community management server 440 converts (i) the electric power amount supplied to the power transmission and distribution network 122 from the electric power storage device of a particular user via the charge and discharge device 212 and the power distribution equipment 230 during a first period of a particular duration to (ii) the amount of hydrogen which the hydrogen production equipment 160 produces by utilizing the amount of electric power corresponding to the electric power amount. The community management server 440 may convert (i) the electric power amount supplied to the power transmission and distribution network 122 from the electric power storage device of a particular user via the charge and discharge device 212 and the power distribution equipment 230 during a first period of a particular duration to (ii) the amount of hydrogen which the hydrogen production equipment 160 produces by utilizing the amount of electric power corresponding to the electric power amount during a first period.

In the present embodiment, the community management server 440 manages, for each of one or more users, the amount of the value possessed by the user. The community management server 440 of the community 102 may manage the amount of value possessed by each member of the community 102 or may manage the amount of value possessed by each user who utilizes the energy management system 100. It is noted that the owner, manager, or operator of the shared facility of the community 102 may be regarded as a member of the community 102. The member of the community 102 may be one example of the user who utilizes the energy management system 100.

In the present embodiment, each user can convert between the value possessed by himself/herself and the energy or energy source. For example, each user can convert the value possessed by himself/herself to electric power or hydrogen. The conversion rate may be fixed or varied.

In a case electric power is supplied from the electric power storage device of each user to the system power grid 12 or the power transmission and distribution network 122, the community management server 440 adds to the amount of the value currently possessed by each user the amount of value corresponding to the electric power amount supplied to the system power grid 12 or the power transmission and distribution network 122. On the other hand, in a case where electric power is supplied from the system power grid 12 or the power transmission and distribution network 122 to the electric power storage device of each user, the community management server 440 subtracts the amount of value corresponding to the electric power amount supplied to the system power grid 12 or the power transmission and distribution network 122 from the amount of value currently possessed by each user. In the same manner, in a case where each user utilizes hydrogen produced by the hydrogen production equipment 160, the community management server 440 subtracts the amount of value corresponding to the amount of hydrogen utilized by each user from the amount of the value currently possessed by each user. The above-described electric power storage device may be the electric power storage device electrically connected to the charge and discharge device 212 (for example, the storage battery of the electric vehicle 22 or the portable storage battery 24).

In the present embodiment, the community management server 440 manages the hydrogen production equipment 160. The community management server 440 may manage the supply and demand of hydrogen in the community 102. The community management server 440 may manage the amount of hydrogen which is generated by the hydrogen production equipment 160. For example, the community management server 440 associates and stores the information indicating a time or period and the information indicating the amount of hydrogen generated by the hydrogen production equipment 160 at the time or during the period. The community management server 440 may associate and store the information indicating a time or a period and the information indicating the amount of hydrogen generated by the hydrogen production equipment 160 and the information indicating the electric power amount consumed to generate the hydrogen at the time or during the period.

The community management server 440 may manage the usage status of hydrogen generated by the hydrogen production equipment 160. For example, in a case where the hydrogen production equipment 160 supplied hydrogen to the outside, the community management server 440 associates and stores the information indicating the destination to which the hydrogen was supplied and the information indicating the time or period when the hydrogen was supplied. The community management server 440 will be described in detail later.

[Specific Configurations of Each Section of Community Management Server 440]

The community management server 440 may be implemented by hardware, software or hardware and software. In a case in which at least some of the components constituting the community management server 440 are implemented by software, the components to be implemented by the software may be implemented by activating a program, in which operations relating to the components are prescribed, in an information processing device having a general configuration.

The above-described information processing device includes, for example, (i) a data processing device including a processor such as a CPU and a GPU, a ROM, a RAM, a communication interface, and the like, (ii) an input device such as a keyboard, a touch panel, a camera, a microphone, various types of sensors, a GPS receiver, (iii) an output device such as a display device, a speaker, and a vibration device, and (iv) a storage device (including an external storage device) such as a memory and an HDD. In the above-described information processing device, the above-described data processing device or storage device may be configured to store a program. The above-described program may be stored in a non-transitory, computer-readable recording medium. The above-described program is executed by the processor, thereby causing the above-described information processing device to execute the operations prescribed by the program. The above-described program may be a program for causing a computer to function as the community management server 440.

In one embodiment, the above-described program may be a program which causes a computer to perform an energy management method. The above-described energy management method has, for example, an energy information obtaining step to obtain the information indicating the first electric amount which is the electric power amount supplied by the electric power storage device to the power grid during a first period. The above-described energy management method has, for example, a corresponding amount determining step to determine a first corresponding amount which is the amount of an energy source produced by the energy source production device which utilizes electric power supplied from the power grid to produce an energy source by utilizing the amount of electric power corresponding to the first electric amount.

In another embodiment, the above-described program may be a program which causes a computer to perform an energy management method. The above-described energy management method has, for example, an energy information obtaining step to obtain the information indicating the second electric power amount which is the electric power amount supplied by the electric power storage device to the energy source production device which utilizes the electric power supplied from the electric power storage device to produce an energy source during the first period. The above-described energy management method has, for example, a corresponding amount determining step to determine a second corresponding amount which is the amount of an energy source which the energy source production device produces by utilizing the amount of electric power corresponding to the second electric power amount.

In another embodiment, the above-described program may be a program which causes a computer to perform the energy management method. The above-described energy management method has, for example, an electric power controlling step to control the transmission and reception of electric power between the power grid and the electric power storage device. The above-described energy management method has, for example, an energy information obtaining step to obtain the information indicating the first electric amount which is the electric power amount supplied by the electric power storage device to the power grid in a first period. The above-described energy management method has, for example, a corresponding amount determining step to determine a first corresponding amount which is the amount of an energy source produced by the energy source production device which utilizes electric power supplied from the power grid to produce energy source by utilizing the amount of electric power corresponding to the first electric amount.

In a further embodiment, the above-described program may be a program which causes a computer to perform a production method of an energy source. The above-described production method of an energy source has, for example, an electric power controlling step to control the transmission and reception of electric power between the power grid and the electric power storage device. The above-described production method of an energy source has, for example, an energy information obtaining step to obtain the information indicating the first electric amount which is the electric power amount supplied by the electric power storage device to the power grid during the first period. The above-described production method of an energy source has, for example, an energy source producing step to produce the energy source by controlling an energy source production device which produces the energy source by utilizing electric power supplied by the power grid. The above-described production method of an energy source has, for example, a corresponding amount determining step to determine a first corresponding amount which is the amount of an energy source produced by utilizing the amount of electric power corresponding to the first electric amount.

In a further embodiment, the above-described program may be a program which causes a computer to perform a production method of an energy source. The above-described production method of an energy source has, for example, an energy source producing step to produce the energy source by controlling an energy source production device which produces the energy source by utilizing electric power supplied by the electric power storage device. The above-described production method of an energy source has, for example, an energy information obtaining step to obtain the information indicating the second electric power amount which is the electric power amount supplied from the electric power storage device during the first period of the energy source producing step. The above-described production method of an energy source has, for example, a corresponding amount determining step to determine a second corresponding amount which is the amount of an energy source produced by utilizing the amount of electric power corresponding to the second electric power amount.

Figure 5:
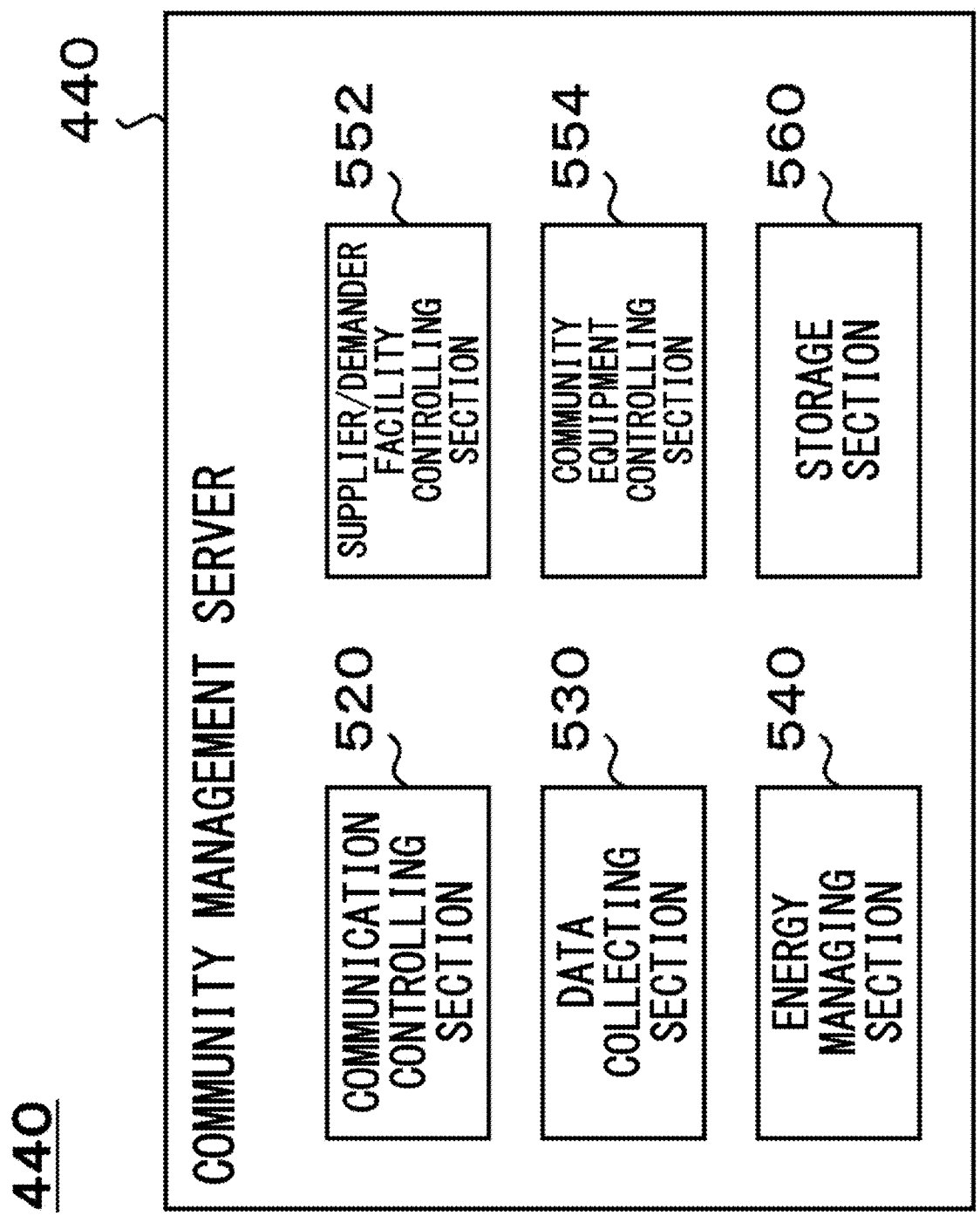
FIG. 5 schematically shows one example of an internal configuration of a community management server 440.

FIG. 5 schematically shows one example of the internal configuration of the community management server 440. In the present embodiment, the community management server 440 includes a communication controlling section 520, a data collecting section 530, an energy managing section 540, a supplier/demander facility controlling section 552, a community equipment controlling section 554, and a storage section 560.

The data collecting section 530 may be one example of the energy information obtaining section. The energy managing section 540 may be one example of the energy management server. The supplier/demander facility controlling section 552 may be one example of the electric power controlling section. The storage section 560 may be one example of the storage section.

The communication controlling section 520 of the present embodiment controls the communication between the community management server 440 and another apparatus. The communication controlling section 520 may be various types of communication interface. The communication controlling section 520 may correspond to one or more communication manners.

The communication controlling section 520 may control the communication between the community management server 440 and the apparatus disposed inside the energy management equipment 140. The communication controlling section 520 may control the communication between the community management server 440 and the controller 240 disposed in each of a plurality of supplier/demander facilities which constitute the community 102. The communication controlling section 520 may control the communication between the community management server 440 and at least one of the power transformation equipment 120 and the hydrogen production equipment 160.

The communication controlling section 520 may control the communication between the community management server 440 of the community 102 and the community management server 440 of another community. The communication controlling section 520 may control the communication between the community management server 440 and the wide area management server 180.

In the present embodiment, the data collecting section 530 collects various types of information related to the community 102. For example, from the controller 240 disposed in each of a plurality of supplier/demander facilities constituting the community 102, the data collecting section 530 obtains information related to the electric power supply and demand of the supplier/demander facility. The data collecting section 530 may obtain from the power transformation equipment 120 the information related to the record of the electric power transmission and reception between the system power grid 12 and the community 102. The data collecting section 530 may obtain from the hydrogen production equipment 160 the information related to the record of the electric power transmission and reception between the community 102 and the community 104.

In the present embodiment, the data collecting section 530 collects at least one of (i) the information indicating the history of the electric power transmission and reception between the electric power storage device of each user who utilizes the energy management system 100 and the system power grid 12 or the power transmission and distribution network 122 and (ii) the information indicating the history of the electric power being supplied by the above-described electric power storage device to the hydrogen production equipment 160. The information indicating the history is sometimes referred to as an electric power transmission and reception history. The data collecting section 530 may collect the electric power transmission and reception history related to the electric power storage device of each member of the community 102. The above-described electric power storage device may be the electric power storage device 224, or may be various types of storage batteries electrically connected to the charge and discharge device 212.

In one embodiment, the electric power transmission and reception history related to each electric power storage device may be the information which associates (i) the identification information to identify the user of the electric power storage device and (ii) the information indicating the electric power amount transmitted by the electric power storage device to the system power grid 12 or the power transmission and distribution network 122 or the electric power amount received by the electric power storage device from the system power grid 12 or the power transmission and distribution network 122. The electric power transmission and reception history related to each electric power storage device may be the information which associates (i) the identification information to identify the electric power storage device and (ii) the information indicating the electric power amount transmitted by the electric power storage device to the system power grid 12 or the power transmission and distribution network 122 or the electric power amount received by the electric power storage device from the system power grid 12 or the power transmission and distribution network 122.

The electric power transmission and reception history related to each electric power storage device may further include the information indicating the time or period (sometimes referred to as electric power transmission and reception timing) when the electric power transmission and reception is performed between the electric power storage device and the system power grid 12 or the power transmission and distribution network 122. The electric power transmission and reception history related to each electric power storage device may further include the information indicating the location (sometimes referred to as electric power transmission and reception location) when the electric power transmission and reception is performed between the electric power storage device and the system power grid 12 or the power transmission and distribution network 122.

For example, the electric power transmission and reception history related to each electric power storage device includes the information indicating the location where the electric power storage device supplies the electric power to the system power grid 12 or the power transmission and distribution network 122 during time period P1. The electric power transmission and reception history related to each electric power storage device may include the information indicating the location where the electric power storage device receives the electric power from the system power grid 12 or the power transmission and distribution network 122 during time period P2 which is temporally after time period P1.

The transmitted electric power amount from each electric power storage device to the system power grid 12 or the power transmission and distribution network 122 may be one example of the first electric amount. The period during which each electric power storage device transmits electric power to the system power grid 12 or the power transmission and distribution network 122 may be one example of the first period. Time period P1 may be one example of the first period. Time period P2 may be one example of the second period.

In another embodiment, the electric power transmission and reception history related to each electric power storage device may be the information which associates (i) the identification information to identify the user of the electric power storage device and (ii) the information indicating the electric power amount transmitted by the electric power storage device to the hydrogen production equipment 160. The electric power transmission and reception history related to each electric power storage device may be the information which associates (i) the identification information to identify the electric power storage device and (ii) the information indicating the electric power amount transmitted by the electric power storage device to the hydrogen production equipment 160.

The electric power transmission and reception history related to each electric power storage device may further include the information indicating the time or period (which may be one example of the electric power transmission and reception timing) when the electric power storage device transmits electric power to the hydrogen production equipment 160. The electric power transmission and reception history related to each electric power storage device may further include the information to identify the hydrogen production equipment 160 to which the electric power storage device supplies electric power.

The transmitted electric power amount from each electric power storage device to the hydrogen production equipment 160 may be one example of the second electric power amount. The period during which each electric power storage device transmits electric power to the hydrogen production equipment 160 may be one example of the first period.

In the present embodiment, the data collecting section 530 collects the information related to the supply and demand of hydrogen. In one embodiment, the data collecting section 530 collects the information related to the operation status of the hydrogen production equipment 160. For example, the data collecting section 530 collects the information which associates (i) the information indicating a time or period and (ii) the amount of hydrogen produced by the hydrogen production equipment 160 at the time or during the period.

The data collecting section 530 may collect the information which associates (i) the information indicating a time or period, (ii) the information indicating the amount of hydrogen produced by the hydrogen production equipment 160 at the time or during the period, and (iii) the information indicating the electric power amount which the hydrogen production equipment 160 consumed to produce the amount of the hydrogen.

In another embodiment, the data collecting section 530 collects the information related to the usage status of hydrogen for each user who utilizes the energy management system 100. For example, for each user who utilizes the energy management system 100 or each member of the community 102, the data collecting section 530 collects the information which associates (i) the information indicating a time or period and (ii) the information indicating the amount of hydrogen which the user or member received from the hydrogen production equipment 160 at the time or during the period. The data collecting section 530 may obtain the information indicating the location of the hydrogen production equipment 160. The information indicating the location of the hydrogen production equipment 160 may be the information indicating the location to which hydrogen was transported.

The data collecting section 530 may obtain the information indicating the remaining amount of hydrogen supplied to each user or each member described above. For example, for each user who utilizes the energy management system 100 or each member of the community 102, the data collecting section 530 collects the information which associates (i) the information indicating a time or period and (ii) the information indicating the remaining amount of hydrogen supplied to the user or member at the time or during the period.

Each of the plurality of supplier/demander facilities, the power transformation equipment 120, and the hydrogen production equipment 160 which constitute the community 102 may transmit the above-described information to the data collecting section 530 in response to the request from the data collecting section 530 or periodically. The data collecting section 530 may store the collected information in the storage section 560.

In the present embodiment, the energy managing section 540 manages the electric power supply and demand of the community 102. For example, the energy managing section 540 obtains the information related to the status of the electric power supply and demand in each supplier/demander facility from each of the supplier/demander facility 112 and the supplier/demander facility 114. In the present embodiment, the energy managing section 540 manages the electric power amount which each supplier/demander facility supplied to the outside (sometimes referred to as transmitted electric power amount) and the electric power amount which each supplier/demander facility received from the outside (sometimes referred to as received electric power amount) by converting it to an electronic value. The electronic value is sometimes referred to as point, mileage, or the like. The energy managing section 540 will be described in detail later.

It is noted that in the present embodiment the energy managing section 540 was described in detail using as an example the case in which the energy managing section 540 is disposed in the community management server 440. However, the energy managing section 540 is not limited to the present embodiment. In another embodiment, the energy managing section 540 may be disposed in the wide area management server 180. In this case, the wide area management server 180 may be one example of the energy management server.

In the present embodiment, the supplier/demander facility controlling section 552 generates the instruction to control each of a plurality of supplier/demander facilities managed by the community management server 440. The supplier/demander facility controlling section 552 transmits the generated instruction to the supplier/demander facility which is the target of the instruction. Thereby, the community management server 440 can control each supplier/demander facility.

For example, the supplier/demander facility controlling section 552 generates an instruction for the charge and discharge device 212 of the supplier/demander facility 112 or the power distribution equipment 230, wherein the instruction is to control the transmission and reception of the electric power between (i) the storage battery electrically connected to the electric power storage device 224 or the charge and discharge device 212 and (ii) the system power grid 12 or the power transmission and distribution network 122. The supplier/demander facility controlling section 552 transmits the generated instruction to the controller 240 of the supplier/demander facility 112. Thereby, the community management server 440 can control the transmission and reception of the above-described electric power.

In the present embodiment, the community equipment controlling section 554 generates the instruction to control at least one of the power supply equipment 220 and the power distribution equipment 230 disposed in the energy management equipment 140. The supplier/demander facility controlling section 552 transmits the generated instruction to the equipment which is the target of the instruction. Thereby, the community management server 440 can control the electric power transmission and reception of the energy management equipment 140.

The community equipment controlling section 554 generates the instruction to control the hydrogen production equipment 160. For example, the community equipment controlling section 554 generates the instruction to control the production of hydrogen in the hydrogen production equipment 160. The community equipment controlling section 554 transmits the generated instruction to the hydrogen production equipment 160. Thereby, the community equipment controlling section 554 can control the hydrogen production equipment 160 to produce hydrogen.

In the present embodiment, the storage section 560 stores various types of information needed for the information processing in each section of the community management server 440. The storage section 560 may store various types of information generated by each section of the community management server 440. For example, the storage section 560 stores the information collected by the data collecting section 530. The storage section 560 may store the information related to the information processing in the energy managing section 540. Examples of the information processing in the energy managing section 540 include the process to manage the amount of the electronic value possessed by each supplier/demander facility, the process to manage the billing for each supplier/demander facility, or the like.

[Summary of Each Section of Energy Managing Section 540]

Figure 6:
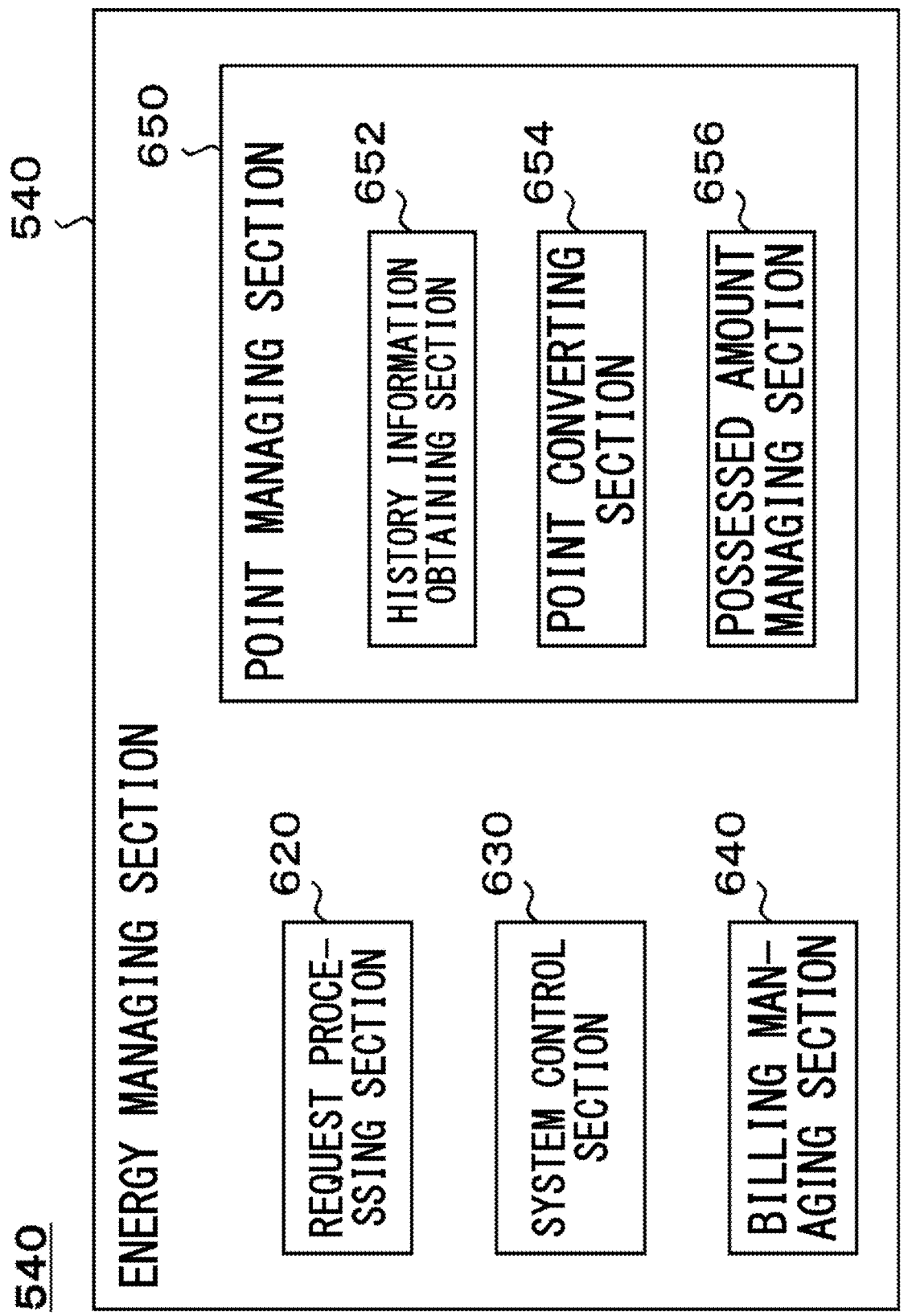
FIG. 6 schematically shows one example of an internal configuration of an energy managing section 540.

FIG. 6 schematically shows one example of the internal configuration of the energy managing section 540. In the present embodiment, the energy managing section 540 includes a request processing section 620, a system control section 630, a billing managing section 640, and a point managing section 650. In the present embodiment, the point managing section 650 has a history information obtaining section 652, a point converting section 654, and a possessed amount managing section 656.

The system control section 630 may be one example of the electric power controlling section. The point managing section 650 may be one example of the energy information obtaining section, the corresponding amount determining section, and the energy management server. The history information obtaining section 652 may be one example of the energy information obtaining section. The point converting section 654 may be one example of the energy management server. The point converting section 654 may be one example of an energy information obtaining section, a corresponding amount determining section, a first suppliable amount determining section, and a second suppliable amount determining section. The possessed amount managing section 656 may be one example of the first suppliable amount determining section and the second suppliable amount determining section.

In the present embodiment, the request processing section 620 accepts various types of requests. The request processing section 620 processes the request which is accepted and responds to the request. The request processing section 620 may cooperate with another element of the community management server 440 to perform at least a part of a plurality of processes involved in the request which is accepted. The request processing section 620 may transfer at least a part of the accepted request to another element of the energy managing section 540.

In the present embodiment, the request processing section 620 accepts the request from at least one of a plurality of supplier/demander facilities constituting the community 102. Examples of the request from the supplier/demander facility constituting the community 102 include (i) the request indicating that the supplier/demander facility wishes to supply electric power to the power transmission and distribution network 122, (ii) the request indicating that the supplier/demander facility wishes to receive electric power from the power transmission and distribution network 122, or the like.

The request processing section 620 may accept the request from the hydrogen production equipment 160. Examples of the request from the hydrogen production equipment 160 include (i) the request indicating that the hydrogen production equipment 160 wishes to receive electric power from the power transmission and distribution network 122, (ii) the request indicating that the hydrogen production equipment 160 wishes to supply hydrogen to the user of the energy management system 100 or the member of the community 102, (iii) the request indicating that the hydrogen production equipment 160 wishes to increase the storage capacity of hydrogen in the hydrogen production equipment 160, or the like.

The request processing section 620 may accept the request from the wide area management server 180. Examples of the request from the wide area management server 180 include the request to increase or decrease the transmitted electric power amount from the community 102 to the system power grid 12, the request to increase or decrease the received electric power amount from the community 102 to the system power grid 12, or the like.

In the present embodiment, the system control section 630 manages the electric power supply and demand of the community 102. The system control section 630 may manage the electric power supply and demand of the community 102 using a procedure similar to the procedure with which the supply and demand adjusting section 336 manages the electric power supply and demand of the supplier/demander facility. The system control section 630 may monitor the electric power supply and demand of the community 102 and determine the tightness of the electric power supply and demand of the community 102.

The system control section 630 may control the operation of the power transformation equipment 120 to adjust the electric power supply and demand of the community 102. For example, the system control section 630 transmits to the power transformation equipment 120 an instruction for the power transformation equipment 120, wherein the instruction is to switch the electrically connection relationship between the system power grid 12 and the power transmission and distribution network 122. The system control section 630 may transmit to the power transformation equipment 120 the information related to the electric power transmitted and received between the system power grid 12 and the power transmission and distribution network 122.

The system control section 630 may control the one or more power supply equipment 220 disposed in at least one of a plurality of supplier/demander facilities constituting the community 102 to adjust the electric power supply and demand of the community 102. The system control section 630 may control the power supply equipment 220 via the controller 240 of each supplier/demander facility. For example, the system control section 630 transmits to the controller 240 the instruction to cause the power supply equipment 220 to adjust the generated electric power amount and the charged or discharged electric power amount.

The system control section 630 may control the one or more power distribution equipment 230 disposed in at least one of a plurality of supplier/demander facilities constituting the community 102 to adjust the electric power supply and demand of the community 102. The system control section 630 may control the power distribution equipment 230 via the controller 240 of each supplier/demander facility. For example, the system control section 630 transmits to the controller 240 the instruction to cause the power distribution equipment 230 to switch the electric connection relationship between the power transmission and distribution network 122 and the inside wiring of the supplier/demander facility 112. Thereby, the system control section 630 can limit or control the electric power transmission and reception between the each supplier/demander facility and the power transmission and distribution network 122.

The system control section 630 may control the charge and discharge device 212, the power supply equipment 220, and the power distribution equipment 230 of each supplier/demander facility to adjust the electric power supply and demand of the community 102. For example, in a case where the electric power supplied from a plurality of supplier/demander facilities constituting the community 102 to the power transmission and distribution network 122 is insufficient, the system control section 630 supplies electric power from at least one of the charge and discharge device 212 and the power supply equipment 220 of each supplier/demander facility to the power transmission and distribution network 122. In a case where the electric power supplied from a plurality of supplier/demander facilities constituting the community 102 to the power transmission and distribution network 122 is excessive, the system control section 630 receives electric power from the power transmission and distribution network 122 and accumulates the electric power in the electric power storage device 224 of each supplier/ demander facility or the storage battery electrically connected to the charge and discharge device 212.

The system control section 630 may control the power supply equipment 220 and the power distribution equipment 230 of the energy management equipment 140 to adjust the electric power supply and demand of the community 102. For example, in a case where the electric power which is supplied from a plurality of supplier/demander facilities constituting the community 102 to the power transmission and distribution network 122 is insufficient, the system control section 630 supplies electric power from the power supply equipment 220 of the energy management equipment 140 to the power transmission and distribution network 122. In a case where the electric power supplied from a plurality of supplier/demander facilities constituting the community 102 to the power transmission and distribution network 122 is excessive, the system control section 630 receives electric power from the power transmission and distribution network 122 and accumulates the electric power in the electric power storage device 224 of the energy management equipment 140.

The system control section 630 may control the hydrogen production equipment 160 to adjust the electric power supply and demand of the community 102. For example, in a case where the electric power supplied from a plurality of supplier/demander facilities constituting the community 102 to the power transmission and distribution network 122 is insufficient, the system control section 630 facilitates the utilization of hydrogen in the community 102 and suppresses the utilization of electric power in the community 102. In addition, the system control section 630 operates the fuel battery of the power supply equipment 220 of each supplier/demander facility and supplies electric power from the power supply equipment 220 to the power transmission and distribution network 122. In a case where the electric power supplied from a plurality of supplier/demander facilities constituting the community 102 to the power transmission and distribution network 122 is excessive, the system control section 630 operates the hydrogen production equipment 160. Thereby, the hydrogen can be stored as surplus electric power.

The system control section 630 can control the energy management equipment 140 or at least one of the power supply equipment 220 and the power distribution equipment 230 disposed in each supplier/demander facility to control the power supply system to which one or more power supply equipment 220 are electrically connected via the power transmission and distribution network 122. The power supply system may be configured by two or more pieces of power supply equipment 220 which are electrically connected and disposed in two or more supplier/demander facilities. Thereby, a virtual electric storage system is constructed which utilizes the surplus electric power or surplus supply capability of the community 102.

The user of each supplier/demander facility constituting the community 102 can transmit each surplus electric power to the power transmission and distribution network 122 to accumulate electric power in the virtual electric storage system. At this time, the electric power supplied from one supplier/demander facility to the power transmission and distribution network 122 may be utilized by, for example, another supplier/demander facility or energy management equipment 140 as the surplus electric power of the community 102.

On the other hand, the user of each supplier/demander facility constituting the community 102 can receive the surplus electric power of the community 102 from the power transmission and distribution network 122 to utilize the electric power accumulated in the virtual electric storage system. At this time, the electric power which one supplier/demander facility receives from the power transmission and distribution network 122 may be the surplus electric power of the community 102, may be the electric power accumulated in the electric power storage device 224 of another supplier/demander facility or the energy management equipment 140, or may be the electric power generated by utilizing the surplus capability of power generation of the power generation device 222 of another supplier/demander facility or energy management equipment 140.

The system control section 630 controls the transmission and reception of electric power between the above-described power supply system and each of one or more supplier/demander facilities. For example, the system control section 630 determines whether each user is allowed to receive the electric power from the power transmission and distribution network 122. The system control section 630 may permit the electric power transmission from the power supply system to each user within a range of electric power amount corresponding to the possessed point of each user managed by the point managing section 650. The possessed point will be described in detail later.

In a case where a user wishes to receive electric power equal to or larger than the possessed point of the user, the system control section 630 may determine to charge for the electric power amount supplied to the user beyond the electric power amount corresponding to the possessed point. In a case where a user wishes to receive electric power equal to or larger than the possessed point of the user, the system control section 630 may control the power distribution equipment 230 of the supplier/demander facility utilized by the user to prevent the electric power beyond the electric power amount corresponding to the possessed point from being supplied to the user.

In a case where a user wishes to receive electric power equal to or larger than the possessed point of the user, the system control section 630 may control the power distribution equipment 230 of the supplier/demander facility utilized by the user to limit the supply manner in which the electric power beyond the electric power amount corresponding to the possessed point is supplied to the user. Examples of the limitation related to the supply manner include (i) reducing the amount of current in comparison with the case in which the electric power is supplied in a range of the electric power amount corresponding to the possessed point, (ii) setting the upper limit on the electric power amount supplied beyond the electric power amount corresponding to the possessed point, or the like.

In the present embodiment, the system control section 630 manages the supply and demand of hydrogen in the community 102. For example, the system control section 630 may allow hydrogen to be supplied from the hydrogen production equipment 160 to each user within a range of the hydrogen amount corresponding to the possessed point of each user managed by the point managing section 650.

In a case where a user wishes to receive hydrogen which is equal to or more than the possessed point of the user, the system control section 630 may determine to charge for the hydrogen amount supplied to the user beyond the hydrogen amount corresponding to the possessed point. In a case where the user wishes to receive hydrogen which is equal to or more than the possessed point of the user, the system control section 630 may control the hydrogen production equipment 160 to prevent hydrogen from being supplied to the user beyond the hydrogen amount corresponding to the possessed point.

In a case a user wishes to receive hydrogen which is equal to or more than the possessed point of the user, the system control section 630 may control the hydrogen production equipment 160 to limit the supply manner of hydrogen supplied to the user beyond the hydrogen amount corresponding to the possessed point. Examples of the limitation related to the supply manner include (i) reducing the flow rate of hydrogen in comparison with the case in which hydrogen is supplied in a range of the hydrogen amount corresponding to the possessed point, (ii) setting the upper limit on the hydrogen amount supplied beyond the hydrogen amount corresponding to the possessed point, or the like.

In the present embodiment, for each of a plurality of supplier/demander facilities constituting the community 102, the billing managing section 640 settles the electric power transmission and reception between the supplier/demander facility and the community 102. For each of a plurality of supplier/demander facilities constituting the community 102, the billing managing section 640 may settle the sharing of electric power between the supplier/demander facility and another supplier/demander facility.

For example, for each of a plurality of supplier/demander facilities constituting the community 102, the billing managing section 640 aggregates the transmitted electric power amount and the received electric power amount between the supplier/demander facility and the community 102 or another supplier/demander facility for every predetermined period (sometimes referred to as settlement period). The billing managing section 640 may aggregate the income and expenditure with respect to electric power for each of the plurality of supplier/demander facilities constituting the community 102 for every settlement period.

In the present embodiment, the billing managing section 640 may aggregate the transmitted electric power amount and the received electric power amount between the supplier/demander facility and the community 102 or another supplier/demander facility for each of the plurality of supplier/demander facilities constituting the community 102 for every unit period included in the settlement period. For each of the plurality of supplier/demander facilities, the billing managing section 640 may manage the transmitted electric power amount for every unit period by dividing it into the electric power amount sold to the system power grid 12 or the energy management equipment 140 and the electric power amount stored in the virtual electric storage system. Similarly, for each of the plurality of supplier/demander facilities, the billing managing section 640 may manage the received electric power amount for every unit period by dividing it into the electric power amount purchased from the system power grid 12 or the energy management equipment 140 and the electric power amount accumulated utilized in the virtual electric storage system.

In the present embodiment, the billing managing section 640 has been described in detail using as an example a case in which for each of the plurality of supplier/demander facilities constituting the community 102, the billing managing section 640 aggregates the income and expenditure with respect to the electric power. However, the billing managing section 640 is not limited to the present embodiment. In another embodiment, the billing managing section 640 may aggregate the income and expenditure with respect to the electric power for each of the plurality of users with the procedure similar to the above-described procedure.

In the present embodiment, the billing managing section 640 has been described in detail using as an example a case in which for each of the plurality of supplier/demander facilities constituting the community 102, the billing managing section 640 aggregates the income and expenditure with respect to the electric power. However, the billing managing section 640 is not limited to the present embodiment. In another embodiment, the billing managing section 640 may aggregate the income and expenditure with respect to the electric power for each of the plurality of users with the procedure similar to the above-described procedure.

In the present embodiment, the point managing section 650 manages the electric power amount which each supplier/demander facility supplied to the outside (sometimes referred to as transmitted electric power amount) and the electric power amount which each supplier/demander facility received from the outside (sometimes referred to as received electric power amount) by converting them to another value. For example, the point managing section 650 manages the electric power amount which each supplier/demander facility supplied to the outside (sometimes referred to as transmitted electric power amount) and the electric power amount which each supplier/demander facility received from the outside (sometimes referred to as received electric power amount) by converting them to an electronic value.

The point managing section 650 may manage the transmitted electric power amount from the electric power storage device of each user to the system power grid 12 or the power transmission and distribution network 122 and the received electric power amount from the system power grid 12 of the electric power storage device of each user or the power transmission and distribution network 122 by converting them to an electronic value. The above-described electric power storage device may be the electric power storage device 224 of each user or may be the storage battery electrically connected to the charge and discharge device 212 of each user.

In the present embodiment, for a simple description, the point managing section 650 is described in detail using as an example the case in which the point managing section 650 manages the above-described transmitted electric power amount and received electric power amount by converting them to a point. However, the point managing section 650 is not limited to the present embodiment. In another embodiment, the point managing section 650 may manage the above-described transmitted electric power amount and the received electric power amount without converting them to a point.

The transmitted electric power amount may be one example of the externally-supplied electric power amount. The received electric power amount may be one example of the externally-received electric power amount. The amount of the electronic value may be one example of the amount which correlates with the electric power amount (sometimes referred to as amount of power correlation).

The externally-supplied electric power amount of each supplier/demander facility may be the electric power amount which each supplier/demander facility supplies to the outside. The externally-supplied electric power amount of each supplier/demander facility may be, among the electric power amount which each supplier/demander facility supplies to the outside, the electric power amount corresponding to the electric power amount received by the power storage equipment disposed in the outside of each supplier/demander facility. The above-described power storage equipment may be at least one of a plurality of electric power storage devices

224 disposed in each of a plurality of supplier/demander facilities constituting the community 102 and the energy management equipment 140 of the community 102 (sometimes referred to as a plurality of electric power storage devices disposed inside the community 102).

In one embodiment, the externally-supplied electric power amount of a particular supplier/demander facility in a particular time period P may be the same amount as the electric power amount which the supplier/demander facility supplied to the outside in time period P. The above-described externally-supplied electric power amount may be a value considering the loss involved in the electric power transmission and distribution, the charge and discharge, or the like.

In another embodiment, the externally-supplied electric power amount Pa [kWh] of a particular supplier/demander facility in a particular time period P may be determined based on (i) the electric power amount Pb [kWh] supplied from the supplier/demander facility to the community 102 in time period P, (ii) the electric power amount Pc [kWh] supplied from each supplier/demander facility of the community 102, the energy management equipment 140 of the community 102, and the outside of the community 102 to the community 102 in the time period P, and (iii) the electric power amount Pd [kWh] accumulated in a plurality of electric power storage devices 224 disposed inside the community 102 in the time period P. For example, the above-described externally-supplied electric power amount Pa may be calculated as: Pa=Pd×(Pb/Pc). It is noted that the calculation method of the externally-supplied electric power amount Pa is not limited to the present embodiment. In the calculation of the externally-supplied electric power amount Pa, the loss involved in the electric power transmission and distribution, the charge and discharge, or the like may be further considered.

The externally-received electric power amount of each supplier/demander facility may be the electric power amount which each supplier/demander facility receives from the outside. The externally-received electric power amount of each supplier/demander facility may be the electric power amount corresponding to the electric power amount supplied from the power storage equipment disposed outside each supplier/demander facility among the electric power amount which each supplier/demander facility receives from the outside.

In one embodiment, the externally-received electric power amount of a particular supplier/demander facility in a particular time period P may be the same amount as the electric power amount which the supplier/demander facility received from the outside in the time period P. The above-described externally-received electric power amount may be a value considering the loss involved in the electric power transmission and distribution, the charge and discharge, or the like.

In another embodiment, the externally-received electric power amount Pe [kWh] of a particular supplier/demander facility in a particular time period P may be determined based on (i) the electric power amount Pf [kWh] which the supplier/demander facility received from the community 102 in time period P, (ii) the total supplied electric power amount Pg [kWh] of the community 102 in the time period P, and (iii) the electric power amount Ph [kWh] supplied from a plurality of electric power storage devices 224 disposed inside the community 102 to the community 102 in the time period P. For example, the above-described externally-supplied electric power amount Pa may be calculated as: Pe=Pf*(Ph/Pg). It is noted that the calculation method of the externally-received electric power amount Pe is not limited to the present embodiment. In the calculation of the externally-received electric power amount Pe, the loss involved in the electric power transmission and distribution, the charge and discharge, or the like may be further considered.

In yet another embodiment, the point managing section 650 may manage the above-described transmitted electric power amount or received electric power amount by converting it to the amount of hydrogen produced by utilizing the amount of electric power corresponding to the transmitted electric power amount or the received electric power amount. The amount of electric power corresponding to the transmitted electric power amount or the received electric power amount may be the same amount of electric power as the transmitted electric power amount or the received electric power amount, and may be the amount of electric power considering at least a part of the loss of electric power involved in at least a part of the electric power transmission and distribution, the electric power transformation, and the power generation.

In the present embodiment, the point managing section 650 may manage the hydrogen amount received by the hydrogen production equipment 160 from each supplier/demander facility by converting it to another value. The point managing section 650 may manage the hydrogen amount received by each user from the hydrogen production equipment 160 by converting it to another value. Each user utilizes, for example, a hydrogen cylinder mounted to the movable object or a transportable hydrogen cylinder to receive hydrogen from the hydrogen production equipment 160. For example, the point managing section 650 manages the above-described hydrogen amount by converting it to an electronic value. The amount of electronic value may be one example of the amount which correlates with the hydrogen amount (sometimes referred to as hydrogen correlated amount).

In the present embodiment, for a simple description, the point managing section 650 is described in detail using as an example the case in which the point managing section 650 manages the above-described hydrogen amount by converting it to a point. However, the point managing section 650 is not limited to the present embodiment. In another embodiment, the point managing section 650 may manage the above-described hydrogen amount without converting it to an electronic value.

In yet another embodiment, the point managing section 650 may manage the above-described hydrogen amount by converting it to the electric power amount obtained by utilizing the hydrogen to generate electricity. The point managing section 650 may convert the above-described hydrogen amount to the electric power amount considering at least a part of the loss of hydrogen involved in at least a part of storage, transportation, and power generation.

In the present embodiment, the history information obtaining section 652 obtains the information related to the electric power supply and demand of each supplier/demander facility from each of one or more supplier/demander facilities constituting the community 102. The history information obtaining section 652 may obtain the information related to the supply and demand of hydrogen in the community 102. The history information obtaining section 652 may obtain various types of information collected by the data collecting section 530. The history information obtaining section 652 may output the obtained information to the point converting section 654.

For example, the history information obtaining section 652 obtains from each of one or more supplier/demander facilities at least one of (i) the information indicating the electric power amount supplied by each supplier/demander facility to the power transmission and distribution network 122 and (ii) the information indicating the electric power amount received by each supplier/demander facility from the power transmission and distribution network 122. The history information obtaining section 652 may obtain from each of one or more supplier/demander facilities at least one of (i) the information indicating the electric power amount supplied by each supplier/demander facility to the power transmission and distribution network 122 and the timing of the supply and (ii) the information indicating the electric power amount received by each supplier/demander facility from the power transmission and distribution network 122 and the timing of the reception.

For example, the history information obtaining section 652 may access the storage section 560 and obtain the electric power transmission and reception history related to each user who utilizes the energy management system 100 or each member of the community 102. The history information obtaining section 652 may access the storage section 560 to obtain the information related to the usage status of hydrogen of each user who utilizes the energy management system 100 or each member of the community 102.

[Conversion Between Electric Power Amount and Point]

In the present embodiment, the point converting section 654 converts an electric power amount to a point. The point managing section 650 may convert a point to an electric power amount. (i) The point converting section 654 may mutually convert an electric power amount and a point for each of the one or more supplier/demander facilities or (ii) the point converting section 654 may convert the electric power amount and the point for at least one of the one or more supplier/demander facilities. (i) The point converting section 654 may mutually convert the electric power amount and the point for each of the one or more users, or (ii) the point converting section 654 may mutually convert the electric power amount and the point for at least one of the one or more users.

In the present embodiment, the point converting section 654 obtains the information indicating the electric power amount supplied by each electric power supplier/demander from the history information obtaining section 652 to the outside. The point converting section 654 converts the electric power amount supplied by each electric power supplier/demander to the outside to the point. Thereby, the point converting section 654 obtains the amount of power correlation which correlates with the electric power amount supplied by each electric power supplier/demander to the outside. The point converting section 654 may output to the possessed amount managing section 656 the information indicating the point count which correlates with the electric power amount supplied by the electric power supplier/demander to the outside. The point converting section 654 may store in the storage section 560 the information indicating the point count which correlates with electric power amount supplied by the electric power supplier/demander to the outside.

In the present embodiment, the point converting section 654 obtains the information indicating the electric power amount received by each electric power supplier/demander from the history information obtaining section 652 to the outside. The point converting section 654 converts to the point the electric power amount received by each electric power supplier/demander from the outside. Thereby, the point converting section 654 obtains the amount of power correlation which correlates with the electric power amount received by each electric power supplier/demander from the outside. The point converting section 654 may output to the possessed amount managing section 656 the information indicating the point count which correlates with the electric power amount received by the electric power supplier/demander to the outside. The point converting section 654 may store in the storage section 560 the information indicating the point count which correlates with electric power amount received by the electric power supplier/demander from the outside.

In the present embodiment, the point converting section 654 obtains the electric power transmission and reception history related to each user who utilizes the energy management system 100 or each member of the community 102 from the history information obtaining section 652. The point converting section 654 converts to a point the electric power amount transmitted by the electric power storage device of each user to the system power grid 12, the power transmission and distribution network 122 or the hydrogen production equipment 160. The point converting section 654 may output to the possessed amount managing section 656 the information indicating the point count which correlates with the above-described transmitted electric power amount.

In the present embodiment, the point converting section 654 obtains from the history information obtaining section 652 the electric power transmission and reception history related to each user who utilizes the energy management system 100 or each member of the community 102. The point converting section 654 converts to the point the electric power amount received by the electric power storage device of each user from the system power grid 12 or the power transmission and distribution network 122. The point converting section 654 may output to the possessed amount managing section 656 the information indicating the point count which correlates with the above-described transmitted electric power amount.

[Conversion Rate Between Point and Electric Power]

The conversion rate between the point and the electric power may be constant or may be varied depending on the timing. In the same timing, the conversion rate in a case where the supplier/demander facility supplies electric power to the power transmission and distribution network 122 may be the same as or different from the conversion rate in a case where the supplier/demander facility receives electric power from the power transmission and distribution network 122. The conversion rate may be a value obtained by dividing the point count by the electric power amount [pt/kWh].

For example, in a timing at which electric power supply and demand of the community 102 is tight, the conversion rate is set to be high compared to other timings. Thereby, the electric power transmission from each supplier/demander facility to the power transmission and distribution network 122 is facilitated and the electric power demand in each supplier/demander facility is suppressed. Whether there is a timing at which the electric power supply and demand is tight may be determined based on the tightness of the electric power supply and demand of the community 102 determined by the system control section 630.

In the present embodiment, for a simple description, the point managing section 650 is described in detail by using as an example the case in which all of the electric power supplied by each supplier/demander facility to the power transmission and distribution network 122 are converted to points and all of the electric power received by each supplier/demander facility from the power transmission and distribution network 122 are converted to points. However, the point managing section 650 is not limited to the present embodiment.

In another embodiment, a part of electric power supplied by each supplier/demander facility to the power transmission and distribution network 122 may be converted to a point. Similarly, a part of electric power received by each supplier/demander facility from the power transmission and distribution network 122 may be converted to a point. Whether the electric power is converted to a point may be determined depending on whether a virtual electric storage system is utilized. In a case where a virtual electric storage system is utilized, the electric power is converted to a point. Whether a virtual electric storage system is utilized may be determined based on the indication of the user of the supplier/demander facility or various types of settings.

[An Embodiment in which a Point Count is Calculated Based on the Correlation Between Hydrogen and Electric Power]

The point converting section 654 may utilize the conversion rate based on the correlation between hydrogen and electric power to mutually convert the electric power amount and the point count. Examples of the correlation between hydrogen and electric power include (i) the amount of hydrogen which can be produced by utilizing a particular amount of electric power, (ii) the amount of hydrogen needed to generate a particular amount of electric power, and the like.

It is noted that the point converting section 654 (i) may utilize the conversion rate based on the correlation between hydrogen and electric power to convert the electric power amount to the point count, (ii) may utilize another type of conversion rate to convert the electric power amount to the point count, or (iii) may utilize the conversion rate based on the correlation between hydrogen and electric power and another conversion rate to convert the electric power amount to the point count. For example, the point converting section 654 (i) utilizes the conversion rate based on the correlation between hydrogen and electric power to convert the electric power amount to the point count when converting to the point the electric power amount supplied by the electric power storage device of the user to the system power grid 12 or the power transmission and distribution network 122 or (ii) utilizes another conversion rate to convert the electric power amount to the point when converting to the point the electric power amount received by the electric power storage device of the user from the system power grid 12 or the power transmission and distribution network 122.

In the present embodiment, the point converting section 654 determines the conversion rate based on the amount of hydrogen which the hydrogen production equipment 160 produces by utilizing the amount of electric power corresponding to the electric power amount which is the target of the conversion process. In other words, the point converting section 654 converts the electric power amount to the point based on the amount of hydrogen which the hydrogen production equipment 160 produces by utilizing the amount of electric power corresponding to the electric power amount which is the target of the conversion process. The amount of electric power corresponding to the electric power amount which is the target of the conversion process may be (i) the same amount as the electric power amount which is the target of the conversion process, or (ii) the amount of electric power considering at least a part of the loss of the electric power involved in at least a part of electric power transmission and distribution, electric power transformation, and power generation. The amount of the converted point may be one example of the first corresponding amount and the second corresponding amount. The amount of point is sometimes referred to as a point count.

Embodiment 1 in which a Transmitted Electric Power Amount is Converted to a Point In one embodiment, the point converting section 654 determines the amount of hydrogen which the hydrogen production equipment 160 produces by utilizing the amount of electric power corresponding to the electric power amount transmitted by the electric power storage device of each user to the system power grid 12 or the power transmission and distribution network 122. The point converting section 654 may determine the amount of hydrogen which the hydrogen production equipment 160 produces by utilizing the amount of electric power corresponding to at least a part of the electric power amount transmitted by the electric power storage device of each user to the system power grid 12 or the power transmission and distribution network 122. The point converting section 654 determines the above-described amount of hydrogen as the point count corresponding to the above-described electric power amount.

More specifically, for example, the point converting section 654 receives the information indicating the electric power amount transmitted by the electric power storage device of a particular user to the system power grid 12 or the power transmission and distribution network 122 in time period P1. The point converting section 654 determines the amount of hydrogen which the hydrogen production equipment 160 could produce in time period P1 by utilizing the amount of electric power corresponding to the above-described electric power amount. The above-described amount of hydrogen may be determined based on the specification of the hydrogen production equipment 160 or may be determined based on the record of the hydrogen production equipment 160. The point converting section 654 outputs the above-described amount of hydrogen as the point count given to the user. The point converting section 654 may store the information indicating the output point count in the storage section 560. The above-described point count may be one example of the first corresponding amount.

Embodiment 2 in which a Transmitted Electric Power Amount is Converted to a Point In another embodiment, the point converting section 654 determines the amount of hydrogen which the hydrogen production equipment 160 produces by utilizing the amount of electric power corresponding to the electric power amount transmitted by the electric power storage device of each user to the hydrogen production equipment 160. The point converting section 654 may determine the amount of hydrogen which the hydrogen production equipment 160 produces by utilizing the amount of electric power corresponding to at least a part of the electric power amount transmitted by the electric power storage device of each user to the hydrogen production equipment 160. The point converting section 654 determines the above-described amount of hydrogen as the point count corresponding to the above-described electric power amount.

More specifically, for example, the point converting section 654 receives the information indicating the electric power amount directly transmitted by the electric power storage device of a particular user to the hydrogen production equipment 160 in time period P1. The point converting section 654 determines the amount of hydrogen which the hydrogen production equipment 160 produced in time period P1 by utilizing the amount of electric power corresponding to the above-described electric power amount. The above-described amount of hydrogen may be determined based on the specification of the hydrogen production equipment 160 or may be determined based on the record of the hydrogen production equipment 160. The point converting section 654 outputs the above-described amount of hydrogen as the point count given to the user. The point converting section 654 may store the information indicating the output point count in the storage section 560. The above-described point count may be one example of the second corresponding amount.

In a case where the hydrogen production equipment 160 includes the electric power storage device, in time period P1, the electric power directly transmitted from the electric power storage device of a particular user to the hydrogen production equipment 160 is possibly stored in the electric power storage device of the hydrogen production equipment 160 and is not utilized to produce hydrogen. In this case, the point converting section 654 may determine the amount of hydrogen which the hydrogen production equipment 160 could produce in time period P1 by utilizing the amount of electric power corresponding to the above-described electric power amount.

Embodiment 3 in which a Transmitted Electric Power Amount is Converted to a Point In yet another embodiment, the point converting section 654 determines (i) the amount of hydrogen which the hydrogen production equipment 160 produces by utilizing the amount of electric power corresponding to the electric power amount transmitted by the electric power storage device of each user to the system power grid 12 or the power transmission and distribution network 122 and (ii) the amount of hydrogen which the hydrogen production equipment 160 produces by utilizing the amount of electric power corresponding to the electric power amount transmitted by the electric power storage device of each user to the hydrogen production equipment 160. The point converting section 654 may determine (i) the amount of hydrogen which the hydrogen production equipment 160 produces by utilizing the amount of electric power corresponding to at least a part of the electric power amount transmitted by the electric power storage device of each user to the system power grid 12 or the power transmission and distribution network 122 and (ii) the amount of hydrogen which the hydrogen production equipment 160 produces by utilizing the amount of electric power corresponding to at least a part of the electric power amount transmitted by the electric power storage device of each user to the hydrogen production equipment 160. The point converting section 654 determines the total of the above-described amount of hydrogen as the point count corresponding to the above-described electric power amount.

More specifically, for example, the point converting section 654 receives (i) the information indicating the electric power amount transmitted in time period P1 by the electric power storage device of a particular user to the system power grid 12 or the power transmission and distribution network 122 and (ii) the information indicating the electric power amount directly transmitted in time period P1 by the electric power storage device of a particular user to the hydrogen production equipment 160. The point converting section 654 determines the amount of hydrogen which the hydrogen production equipment 160 could produce in time period P1 by utilizing the amount of electric power corresponding to the total of the above-described electric power amount. The above-described amount of hydrogen may be determined based on the specification of the hydrogen production equipment 160 or may be determined based on the record of the hydrogen production equipment 160. The point converting section 654 outputs the above-described amount of hydrogen as the point count given to the user. The point converting section 654 may store the information indicating the output point count in the storage section 560. The above-described point count may be one example of the total of the first corresponding amount and the second corresponding amount.

According to these embodiments, the point converting section 654 can determine the point count which is given to the user in a case where the electric power storage device of a particular user transmits electric power to the system power grid 12 or the power transmission and distribution network 122. According to these embodiments, the point count given to each user is determined based on the hydrogen amount which the hydrogen production equipment 160 can produce by utilizing the amount of electric power corresponding to the point count. In addition, for example, the billing managing section 640 considers at least a part of the electric power amount supplied by each user to the system power grid 12 or the power transmission and distribution network 122 as a part of the electric power amount which the hydrogen production equipment 160 utilizes to produce hydrogen, and calculates the electric power utilization amount of the hydrogen production equipment 160 during each settlement period. Thereby, the cost to produce hydrogen in the hydrogen production equipment 160 decreases, and the utilization of hydrogen as an energy source is facilitated.

[Specific Example of the Embodiment in which a Transmitted Electric Power Amount is Converted to a Point]

For example, in time period P1, the electric power storage device located at place A supplies electric power of $Q_1$ [kWh] to the power transmission and distribution network 122. On the other hand, in time period P1, the hydrogen production equipment 160 located at place B consumes $Q_2$ [kWh] of electric power to produce hydrogen of $V_1$ [m$^3$]. In these cases, the amount of hydrogen produced with the amount of electric power corresponding to the transmitted electric power amount from the electric power storage device to the power transmission and distribution network 122 may be determined based on the specification of the hydrogen production equipment 160 or may be determined based on the record of the hydrogen production equipment 160. For example, according to the record of the hydrogen production equipment 160 in the above-described example, it is considered that in time period P1 the hydrogen production equipment 160 produced $V_1 \times Q_1/Q_2$ [m$^3$] of hydrogen with the same amount of electric power as the transmitted electric power amount from the electric power storage device to the power transmission and distribution network 122.

On the other hand, when the above-described loss of electric power is considered, the amount of hydrogen produced with the electric power corresponding to the transmitted electric power amount from the electric power storage device to the power transmission and distribution network 122 is represented as, for example using the coefficient ks related to the above-described loss of electric power, $V_1 \times ks \times Q_1/Q_2$ [m$^3$]. It is noted that ks is a positive number. ks may be a positive number less than one.

In one embodiment, the value of ks is determined based on, for example, the location where the electric power storage device of the user supplies electric power to the system power grid 12 or the power transmission and distribution network 122 and the location of the hydrogen production equipment 160. The value of ks may be determined based on the distance between the location where the electric power storage device of the user supplies electric power to the system power grid 12 or the power transmission and distribution network 122 and the location of the hydrogen production equipment 160. The value of ks is determined such that, for example, the value of ks decreases as the above-described distance increases. The value of ks may be changed in a stepwise manner depending on the above-described distance or may be continuously changed depending on the above-described distance.

In another embodiment, the value of ks is, for example, determined based on the distance between the location where the electric power storage device of the user supplies electric power to the system power grid 12 or the power transmission and distribution network 122 and a particular location. The value of ks is determined such that, for example, the value of ks decreases as the above-described distance increases. The value of ks may be changed in a stepwise manner depending on the above-described distance or may be continuously changed depending on the above-described distance. The point managing section 650 may specify the above-described particular location based on the input by the owner, manager, or operator of the community management server 440. The point managing section 650 may specify the above-described particular location according to the request from the user.

This encourages the user of an electric power storage device mounted to the movable object or a transportable electric power storage device to utilize the charge and discharge device 212 disposed near the above-described particular location to supply electric power to the system power grid 12 or the power transmission and distribution network 122. As a result, the unbalance of the electric power supply and demand of the community 102 is improved.

Embodiment 1 in which a Received Electric Power Amount is Converted to a Point

In one embodiment, the point converting section 654 determine the amount of hydrogen which the hydrogen production equipment 160 produces by utilizing the amount of electric power corresponding to the electric power amount received by the electric power storage device of each user from the system power grid 12 or the power transmission and distribution network 122. The point converting section 654 may determine the amount of hydrogen which the hydrogen production equipment 160 produces by utilizing the amount of electric power corresponding to at least a part of the electric power amount received by the electric power storage device of each user from the system power grid 12 or the power transmission and distribution network 122. The point converting section 654 determines the above-described amount of hydrogen as the point count corresponding to the above-described electric power amount.

More specifically, for example, the point converting section 654 receives the information indicating the electric power amount received by the electric power storage device of a particular user from the system power grid 12 or the power transmission and distribution network 122 in time period P1. The point converting section 654 determines the amount of hydrogen which the hydrogen production equipment 160 could produce in time period P1 by utilizing the amount of electric power corresponding to the above-described electric power amount. The above-described amount of hydrogen may be determined based on the specification of the hydrogen production equipment 160 or may be determined based on the record of the hydrogen production equipment 160. The point converting section 654 outputs the above-described amount of hydrogen as the point count consumed by the user. The point converting section 654 may store the information indicating the output point count in the storage section 560.

Embodiment 2 in which a Received Electric Power Amount is Converted to a Point

In another embodiment, the point converting section 654 determines the amount of hydrogen needed to generate the amount of electric power corresponding to the electric power amount received by the electric power storage device of each user from the system power grid 12 or the power transmission and distribution network 122. The point converting section 654 may determine the amount of hydrogen needed to generate the amount of electric power corresponding to at least a part of the electric power amount received by the electric power storage device of each user from the system power grid 12 or the power transmission and distribution network 122. The above-described correlation between hydrogen and electric power may be determined based on a theoretical value, or may be determined based on the record value of any power generation equipment. The point converting section 654 outputs the above-described amount of hydrogen as the point count consumed by the user. The point converting section 654 may store the information indicating the output point count in the storage section 560.

[A Specific Example of an Embodiment in which a Received Electric Power Amount is Converted to a Point]

For example, in time period P1, the electric power storage device located in place A receives electric power of $Q_1$ [kWh] from the power transmission and distribution network 122. On the other hand, in time period P1, the hydrogen production equipment 160 located in place B consumes electric power of $Q_2$ [kWh] to produce hydrogen of $V_1$ [m$^3$]. In these cases, the amount of hydrogen produced with the amount of electric power corresponding to the electric power amount received by the electric power storage device from the power transmission and distribution network 122 may be determined based on the specification of the hydrogen production equipment 160 or may be determined based on the record of the hydrogen production equipment 160. For example, according to the record of the hydrogen production equipment 160 in the above-described example, it is considered that in time period P1 the hydrogen production equipment 160 produced $V_1 \times Q_1/Q_2$ [m$^3$] of hydrogen with the same amount of electric power as the electric power amount received by the electric power storage device from the power transmission and distribution network 122.

On the other hand, when the above-described loss of electric power is considered, the amount of hydrogen produced with the electric power corresponding to the transmitted electric power amount received by the electric power storage device from the power transmission and distribution network 122 is represented as, for example using the coefficient kr related to the above-described loss of electric power, $V_1 \times kr \times Q_1/Q_2$ [m³]. It is noted that kr is a positive number. kr may be a positive number larger than one.

In one embodiment, the value of kr is determined based on, for example, the location where the electric power storage device of the user receives electric power from the system power grid 12 or the power transmission and distribution network 122 and the location of the hydrogen production equipment 160. The value of kr may be determined based on the distance between the location where the electric power storage device of the user receives electric power from the system power grid 12 or the power transmission and distribution network 122 and the location of the hydrogen production equipment 160. The value of kr is determined such that, for example, the value of kr increases as the above-described distance increases. The value of kr may be changed in a stepwise manner depending on the above-described distance, or may be continuously changed depending on the above-described distance.

In another embodiment, the value of kr is, for example, determined based on the distance between the location where the electric power storage device of the user receives electric power from the system power grid 12 or the power transmission and distribution network 122 and a particular location. The value of kr is determined such that, for example, the value of kr increases as the above-described distance increases. The value of kr may be changed in a stepwise manner depending on the above-described distance, or may be continuously changed depending on the above-described distance. The point managing section 650 may specify the above-described particular location based on the input by the owner, manager, or operator of the community management server 440. The point managing section 650 may specify the above-described particular location according to the request from the user.

This encourages the user of an electric power storage device mounted to the movable object or a transportable electric power storage device to utilize the charge and discharge device 212 disposed near the above-described particular location to supply electric power to the system power grid 12 or the power transmission and distribution network 122. As a result, the unbalance of the electric power supply and demand of the community 102 is improved.

[Conversion Rate Between a Point and Hydrogen]

The conversion rate between the point and hydrogen may be constant or may be varied depending on the timing. The conversion rate may be a value obtained by dividing the point count by the hydrogen amount [pt/m³-H$_2$].

For example, in a timing at which electric power supply and demand of the community 102 is tight, the conversion rate is set to be high compared to other timings. Thereby, the utilization of hydrogen as an energy source is facilitated. Whether there is a timing at which the electric power supply and demand is tight may be determined based on the tightness of the electric power supply and demand of the community 102 determined by the system control section 630.

In the present embodiment, the possessed amount managing section 656 manages a point possessed by each supplier/demander facility for each of one or more supplier/demander facilities constituting the community 102. The possessed amount managing section 656 may manage, for every user of the energy management system 100 or for every member of the community 102, the point possessed by each user or each member.

The possessed amount managing section 656 may determine the point count possessed by each user or each member (sometimes referred to as a point balance), based on the point count determined by the point converting section 654. For example, the possessed amount managing section 656 determines a point balance based on (a) the information indicating the point count determined by the point converting section 654 and (b) at least one of (i) the information related to the possession period of the point and (ii) the information indicating the location where each user or each member supplied electric power to the system power grid 12 or the power transmission and distribution network 122 and the location where the user or the member received electric power from the system power grid 12 or the power transmission and distribution network 122. The possessed amount managing section 656 will be described in detail later.

In one embodiment, the point balance of each user or each member indicates the maximum value of the electric power amount supplied from the system power grid 12 or the power transmission and distribution network 122 to the electric power storage device of each user or each member in a first economical condition. The first economical condition may be a condition indicating the unit price of electric power. The condition indicating the unit price of electric power may be a condition that the unit price of electric power is 0 [yen/kWh]. The possessed point count may be one example of the first suppliable amount.

In another embodiment, the point balance of each user or each member indicates the maximum value of hydrogen amount which can be transported from the hydrogen storage tank which stores hydrogen produced by the hydrogen production equipment 160 to the hydrogen cylinder of each user or each member under a second economic condition. The above-described hydrogen cylinder may be a hydrogen cylinder which is mounted to the movable object of each user or each member and stores the hydrogen supplied from the hydrogen storage tank. The second economic condition may be a condition indicating the unit price of hydrogen. The condition indicating the unit price of hydrogen may be a condition that the unit price of hydrogen is 0 [yen/kWh]. The possessed point count may be one example of the second suppliable amount.

It is noted that, in the present embodiment, the point managing section 650 is described in detail using as an example the case in which the possessed amount managing section 656 adjusts the point balance based on (a) the point count determined by the point converting section 654 and (b) the location where each user or each member supplied electric power to the system power grid 12 or the power transmission and distribution network 122 and the location where the user or member received electric power from the system power grid 12 or the power transmission and distribution network 122. However, the point managing section 650 is not limited to the present embodiment. In another embodiment, the point converting section 654 may adjust the conversion rate based on the location where each user or each member supplied electric power to the system power grid 12 or the power transmission and distribution network 122 and the location where each user or each member receives electric power from the system power grid 12 or the power transmission and distribution network 122. The point converting section 654 may adjust the conversion rate with the similar method to the method of the possessed amount managing section 656 described below.

Figure 7:
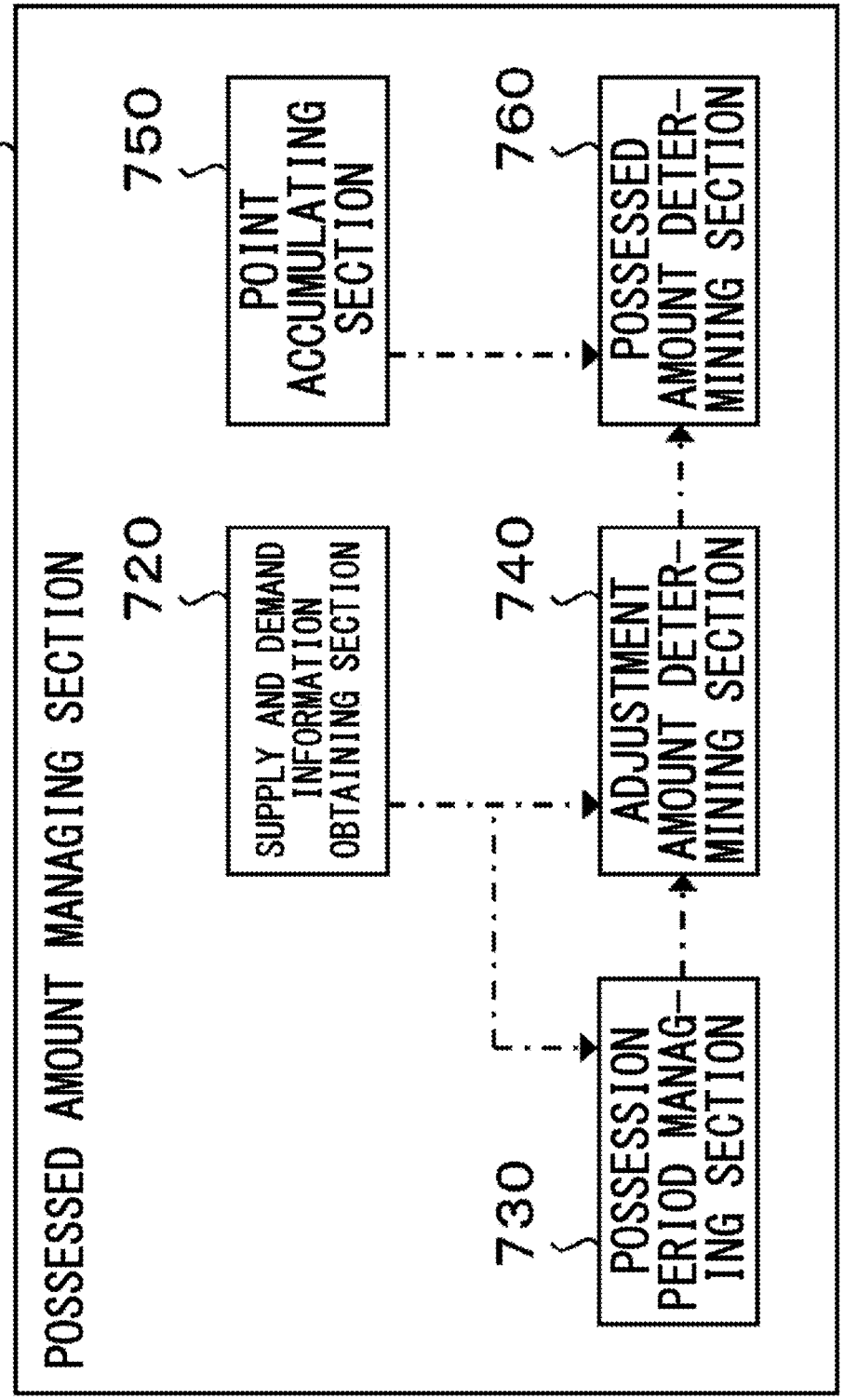
FIG. 7 schematically shows one example of an internal configuration of a possessed amount managing section 656.

FIG. 7 schematically shows one example of the internal configuration of the possessed amount managing section 656. In the present embodiment, the possessed amount managing section 656 includes a supply and demand information obtaining section 720, a possession period managing section 730, an adjustment amount determining section 740, a point accumulating section 750, and a possessed amount determining section 760. Each section of the possessed amount managing section 656 may transmit and receive information to/from each other without being limited to the description of arrows in the drawing.

The point accumulating section 750 may be one example of the first suppliable amount determining section and the second suppliable amount determining section. The possessed amount determining section 760 may be one example of the first suppliable amount determining section and the second suppliable amount determining section.

In the present embodiment, the supply and demand information obtaining section 720 obtains the information related to the status of the electric power supply and demand or the hydrogen supply and demand of the community 102. The supply and demand information obtaining section 720 may obtain the information related to the supply and demand balance of electricity distributed in the power transmission and distribution network 122. The supply and demand information obtaining section 720 may obtain the information related to the operation status of the hydrogen production equipment 160, the remaining amount of hydrogen stored in the hydrogen production equipment 160, or the like.

For example, the supply and demand information obtaining section 720 obtains from the system control section 630 the information indicating the tightness of the electric power supply and demand or the hydrogen supply and demand of the community 102. The tightness of the electric power supply and demand and the hydrogen supply and demand of the community 102 may be an indicator determined based on the record value of the electric power supply and demand or the hydrogen supply and demand of the community 102, or the tightness of the electric power supply and demand or the hydrogen supply and demand of the community 102 may be an indicator determined based on the predicted value of the electric power supply and demand or the hydrogen supply and demand of the community 102.

For example, the supply and demand information obtaining section 720 outputs the information indicating the surplus supply capability of the community 102 to at least one of the possession period managing section 730 and the adjustment amount determining section 740. The supply and demand information obtaining section 720 may output the information of the surplus supply capability in any timing. In one embodiment, the supply and demand information obtaining section 720 outputs the information indicating the surplus supply capability at the timing when a particular supplier/demander facility supplied electric power to the power transmission and distribution network 122. In another embodiment, the supply and demand information obtaining section 720 outputs the information indicating the surplus supply capability at the timing when a particular supplier/demander facility received electric power from the power transmission and distribution network 122. In yet another embodiment, the supply and demand information obtaining section 720 outputs the information indicating the surplus supply capability for a period specified by the possession period managing section 730 or the adjustment amount determining section 740.

In the present embodiment, for a simple description, the possessed amount managing section 656 is described in detail using as an example the case in which the surplus supply capability of the community 102 is utilized as the indicator indicating the tightness of the electric power supply and demand of the community 102. However, it is noted that the possessed amount managing section 656 is not limited to the present embodiment.

In the present embodiment, the possession period managing section 730 manages the information related to the possession period of the point. Examples of the information related to the possession period of the point include the information indicating the possession period of the point, the information related to the electric power supply and demand in the possession period of the point, or the like.

In one embodiment, the possession period managing section 730 manages the possession period of the point. The possession period of the point may be one example of the elapsed time period. The possession period of the point (i) may be the period from the moment when a particular supplier/demander facility supplied electric power to the power transmission and distribution network 122 to a particular moment, or (ii) may be the period from the moment when the difference between the point given to the particular supplier/demander facility and the point consumed by the supplier/demander facility meets a predetermined first condition to a particular moment. The difference between the point given to the particular supplier/demander facility and the point consumed by the supplier/demander facility may be the difference between the accumulated amount of the point given to the supplier/demander facility and the accumulated amount of the point consumed by the supplier/demander facility (sometimes referred to as an accumulated point difference). The accumulated point difference may be the difference between the accumulated amount of the point given to a particular user or member and the accumulated amount of the point consumed by the user or member. The accumulated point difference may be one example of the amount obtained by subtracting, from the point given to a particular user or member, the point consumed by the user or the member.

The detail of the above-described particular moment is not particularly limited. The above-described particular moment may be the moment when a particular supplier/demander facility consumes the point, may be the moment specified by a particular supplier/demander facility, or may be the moment specified by the possession period managing section 730 or the adjustment amount determining section 740.

Examples of the predetermined first condition include (i) the condition that the accumulated point difference becomes zero, (ii) the condition that the accumulated point difference is within or outside a predetermined range, (iii) the condition that the parameter determined based on the accumulated point difference becomes zero, (iv) the condition that the above-described parameter is within or outside a predetermined range, or the like. The predetermined range may be a numerical range, or may be a range of the class related to the stepwise evaluation. When the predetermined range is a numerical range, only the upper limit of the numerical range may be defined, only the lower limit of the numerical range may be defined, or the upper limit and the lower limit of the numerical range may be defined. The above-described parameter may be a possessed point count.

The possession period managing section 730 may manage the possession period of the point for each of the points given at a plurality of timings. The possession period managing section 730 may manage the possession period of the above-described point with the First-In First-Out (FIFO) manner or may manage the possession period of the above-described point with the Last-in First-Out (LIFO) manner. The possession period managing section 730 may manage the possession period of the above-described point with the average value of the possession period of the possessed point.

In another embodiment, the possession period managing section 730 manages the information related to the electric power supply and demand of a part of the community 102 or the community 102 in at least a part of the possession period of the point. For example, the possession period managing section 730 manages, for each of the points given in a plurality of timings, the information related to the surplus supply capability of the community 102 at the timing when the point is given. The possession period managing section 730 may manage the information related to the surplus supply capability of the community 102 at the timing when a part of the possessed point is consumed.

The possession period managing section 730 may extract, based on the surplus supply capability of the community 102 in the possession period, the period (sometimes referred to as a tightness period) which is included in the possession period and during which the surplus supply capability of the community 102 meets a predetermined second condition. A plurality of tightness periods may be included in a single possession period. The information indicating the relationship between the possession period and one or more tightness periods included in the possession period may be one example of the indicator indicating the tightness of the community 102.

In the present embodiment, the adjustment amount determining section 740 determines the adjustment amount to calculate the amount of the possessed point of the supplier/demander facility based on the accumulated point difference related to a particular supplier/demander facility. The adjustment amount determining section 740 may determine, based on the accumulated point difference related to a particular user or member, the adjustment amount to calculate the amount of the possessed point of the user or the member. The adjustment amount may be a negative amount, may be zero, or may be a positive amount. The adjustment amount may be one example of the modified amount.

[The First Embodiment of the Calculation Method of the Adjustment Amount]

In the present embodiment, the adjustment amount determining section 740 determines the adjustment amount based on the information related to the possession period of the point. As described above, examples of the information related to the possession period of the point include the information indicating the possession period of the point, the information related to the electric power supply and demand during the possession period of the point, or the like.

In one embodiment, the adjustment amount determining section 740 determines the adjustment amount based on the duration of the possession period of the point. For example, the adjustment amount determining section 740 determines the adjustment amount such that the adjustment amount decreases as the possession period of the point increases. The adjustment amount determining section 740 may determine the adjustment amount such that the adjustment amount increases as the possession period of the point increases. The adjustment amount determining section 740 may determine the adjustment amount such that the amount of possessed point decreases as the possession period of the point increases.

The relationship between the duration of the possession period of the point and the adjustment amount may be constant during a possession period of the point, or may be varied depending on the timing. The relationship between the duration of the possession period of the point and the adjustment amount (for example, the degree of increase or the degree of decrease) may be determined according to the status of the electric power supply and demand of the community 102.

The relationship between the duration of the possession period of the point and the adjustment amount may be constant regardless of the amount of the possessed point or may be varied depending on the amount of the possessed point. The relationship between the duration of the possession period of the point and the adjustment amount may be set such that the change rate of the adjustment amount relative to the duration of the possession period of the point increases as the amount of the possessed point increases. The relationship between the duration of the possession period of the point and the adjustment amount may be set such that the change rate of the adjustment amount relative to the duration of the possession period of the point decreases as the amount of the possessed point increases.

In another embodiment, the adjustment amount determining section 740 determines the adjustment amount based on the status of the electric power supply and demand of the community 102 in at least a part of the possession period of the point. The adjustment amount determining section 740 may determine the adjustment amount based on the relationship between the possession period of the point and the one or more tightness periods included in the possession period. For example, the adjustment amount determining section 740 determines the adjustment amount based on the ratio (AB) of the total duration of one or more tightness periods (A) to the duration of the possession period (B). The adjustment amount determining section 740 may determine the adjustment amount such that the adjustment amount increases as the above-described ratio increases. The adjustment amount determining section 740 may determine the adjustment amount such that the adjustment amount decreases as the above-described ratio increases.

The adjustment amount determining section 740 may determine the adjustment amount such that the amount of the possessed point after receiving electric power from the outside decreases as the tightness of the electric power supply and demand increases. The adjustment amount determining section 740 may determine the adjustment amount such that the amount of the possessed point after supplying electric power to the outside increases as the tightness of the electric power supply and demand increases.

[The Second Embodiment of a Calculation Method an Adjustment Amount]

In the present embodiment, the adjustment amount determining section 740 determines the adjustment amount based on the status of the electric power supply and demand of the community 102 at a particular moment. For example, the adjustment amount determining section 740 determines the adjustment amount such that the adjustment amount increases as the tightness of the electric power supply and demand of the community 102 at a particular moment increases. The adjustment amount determining section 740 may determine the adjustment amount such that the adjustment amount decreases as the tightness of the electric power supply and demand of the community 102 at a particular moment increases.

The detail of the above-described particular moment is not particularly limited. The above-described particular moment may be the moment when a particular supplier/demander facility consumes the point, may be the moment specified by a particular supplier/demander facility, or may be the moment specified by the possession period managing section 730 or the adjustment amount determining section 740.

[The Third Embodiment of a Calculation Method of an Adjustment Amount]

In the present embodiment, the adjustment amount determining section 740 determines the adjustment amount based on the status of the electric power supply and demand of the community 102 at the moment when electric power was supplied to the power transmission and distribution network 122. For example, the adjustment amount determining section 740 determines the adjustment amount such that the adjustment amount increases as the tightness of the electric power supply and demand of the community 102 at the moment when electric power was supplied to the power transmission and distribution network 122 increases. The adjustment amount determining section 740 may determine the adjustment amount such that the adjustment amount decreases as the tightness of the electric power supply and demand of the community 102 at the moment when electric power was supplied to the power transmission and distribution network 122.

The adjustment amount determining section 740 may, for example, refer to the possession period managing section 730 to determine the above-described adjustment amount for each of electric power supplied to the power transmission and distribution network 122 during a plurality of timings. The adjustment amount determining section 740 may determine the above-described adjustment amount with the First-In First-Out (FIFO) manner or may determine the above-described adjustment amount with the Last-In First-Out (LIFO) manner.

[The Fourth Embodiment of a Calculation Method of an Adjustment Amount]

In the present embodiment, the adjustment amount determining section 740 determines the adjustment amount based on (i) the location where each user of the energy management system 100 or each member of the community 102 supplied electric power to the system power grid 12, the power transmission and distribution network 122, or the hydrogen production equipment 160, and (ii) the location where the user or the member received electric power from the system power grid 12 or the power transmission and distribution network 122. The adjustment amount determining section 740 may determine the adjustment amount based on (i) the location where each user or each member utilized the electric power storage device of the user or the member to supply electric power to the system power grid 12, the power transmission and distribution network 122, or the hydrogen production equipment 160, and (ii) the location where the user or the member utilized the electric power storage device of the user or the member to receive electric power from the system power grid 12 or the power transmission and distribution network 122.

Specifically, the adjustment amount determining section 740 obtains the information indicating the location (sometimes referred to as an electric power transmission location) where the electric power storage device of each user or each member supplied electric power to the system power grid 12, the power transmission and distribution network 122, or the hydrogen production equipment 160. Similarly, the adjustment amount determining section 740 obtains the information indicating the location (sometimes referred to as an electric power reception location) where the electric power storage device of each user or each member receives electric power from the system power grid 12 or the power transmission and distribution network 122. The electric power transmission location may be one example of the supplying location. The electric power reception location may be one example of the receiving location.

The adjustment amount determining section 740 may obtain the information indicating the time or period (sometimes referred to as an electric power transmission timing) when the electric power storage device of each user or each member supplied electric power to the system power grid 12, the power transmission and distribution network 122, or the hydrogen production equipment 160. Similarly, the adjustment amount determining section 740 may obtain the information indicating the time or period (sometimes referred to as an electric power reception timing) when the electric power storage device of each user or each member receives electric power from the system power grid 12 or the power transmission and distribution network 122. The electric power reception timing may be a time or period which is temporally after the electric power transmission timing. The electric power transmission timing may be one example of the first period. The electric power reception timing may be one example of the second period.

The adjustment amount determining section 740 adjusts the magnitude of the adjustment amount so that the possessed amount managing section 656 can adjust the ratio (A/B) of the decrease amount of the point balance of a particular user or member as a result of the electric power being received (A) to the electric power amount received by the user or member (B). The adjustment amount determining section 740 may determine the adjustment amount such that the above-described ratio is lower in a case which meets the first geographic condition than in the case which does not meets the first geographic condition. Examples of the first geographic condition include (i) the condition that the distance between the electric power transmission location and the electric power reception location is smaller than a threshold, (ii) the condition that the electric power transmission location and the electric power reception location of the charge and discharge device 212 are the same, (iii) the condition that the charge and discharge device 212 of the electric power transmission location and the charge and discharge device 212 of the electric power reception location are disposed within the same community, or the like.

In one embodiment, the adjustment amount determining section 740 determines, in a case where a particular user or member utilizes the electric power storage device of the user or member to receive electric power from the system power grid 12 or the power transmission and distribution network 122, the adjustment amount to adjust the point count consumed by the user or member. For example, the possessed amount determining section 760 determines the point balance of the above-described user or member by subtracting the above-described adjustment amount from the accumulated point difference output by the point accumulating section 750. The possessed amount determining section 760 may determine the point balance of the above-described user or member by dividing the accumulated point difference output by the point accumulating section 750 by the above-described adjustment amount.

In another example, the point accumulating section 750 may calculate the accumulated point difference by adding to the last point balance the value obtained by subtracting the above-described adjustment amount from the point count output by the point converting section 654. In addition, the point accumulating section 750 may calculate the accumulated point difference by adding to the last point balance the value obtained by dividing the point count output by the point converting section 654 by the above-described adjustment amount.

In the present embodiment, the adjustment amount determining section 740 may determine the adjustment amount such that, the adjustment amount is lower in a case where the electric power transmission location and the electric power reception location meet the first geographic condition than in the case where the electric power transmission location and the electric power reception location do not meet the first geographic condition. Depending on the possession status of the point, a single electric power reception location may correspond to a plurality of electric power transmission locations.

The first geographic condition may be as described above. (ii) The above-described adjustment amount in a case which meets the condition that the electric power transmission location and the electric power reception location of the charge and discharge device 212 are the same may be smaller than (iii) the above-described adjustment amount in a case which meets the condition that the charge and discharge device 212 at the electric power transmission location and the charge and discharge device 212 at the electric power reception location are disposed within the same community.

In another embodiment, the adjustment amount determining section 740 determines, in a case where a particular user or member utilizes the electric power storage device of the user or member to receive electric power from the system power grid 12 or the power transmission and distribution network 122, the adjustment amount to adjust the point count consumed by the user or member. For example, the possessed amount determining section 760 determines the point balance of the above-described user or member by adding or multiplying the above-described adjustment amount to or by the accumulated point difference output by the point accumulating section 750. In another example, the point accumulating section 750 may calculate the accumulated point difference by adding to the last point balance the value obtained by adding or multiplying the above-described adjustment amount to or by the point count output by the point converting section 654.

In the present embodiment, the adjustment amount determining section 740 may determine the adjustment amount such that the adjustment amount is higher in a case where the electric power transmission location and the electric power reception location meet the first geographic condition than in a case where the electric power transmission location and the electric power reception location do not meet the first geographic condition. Depending on the possession status of the point, a single electric power reception location may correspond to a plurality of electric power transmission locations.

The first geographic condition may be as described above. (ii) The above-described adjustment amount in a case which meets the condition that the electric power transmission location and the electric power reception location of the charge and discharge device 212 are the same may be higher than (iii) the above-described adjustment amount in a case which meets the condition that the charge and discharge device 212 at the electric power transmission location and the charge and discharge device 212 at the electric power reception location are disposed within the same community.

[The Fifth Embodiment of a Calculation Method of an Adjustment Amount]

In the present embodiment, the adjustment amount determining section 740 determines the adjustment amount based on (i) the location where each user of the energy management system 100 or each member of the community 102 supplied electric power to the system power grid 12, the power transmission and distribution network 122, or the hydrogen production equipment 160, and (ii) the location where the user or the member received hydrogen from the hydrogen production equipment 160. The adjustment amount determining section 740 may determine the adjustment amount based on (i) the location where each user or each member utilizes the electric power storage device of the user or member to supply electric power to the system power grid 12, the power transmission and distribution network 122, or the hydrogen production equipment 160 and (ii) the location where the user or member transports hydrogen to the hydrogen cylinder mounted to the movable object of the user or member from the hydrogen storage tank of the hydrogen production equipment 160.

Specifically, the adjustment amount determining section 740 obtains the information indicating the location (sometimes referred to as an electric power transmission location) where the electric power storage device of each user or each member supplied electric power to the system power grid 12, the power transmission and distribution network 122, or the hydrogen production equipment 160. Similarly, the adjustment amount determining section 740 obtains the information indicating the location (sometimes referred to as a transport location) to which hydrogen is transported from the hydrogen production equipment 160 to the hydrogen cylinder of each user or each member.

The adjustment amount determining section 740 may obtain the information indicating the time or period (sometimes referred to as an electric power transmission timing) where the electric power storage device of each user or each member supplied electric power to the system power grid 12, the power transmission and distribution network 122, or the hydrogen production equipment 160. Similarly, the adjustment amount determining section 740 may obtain the information indicating the time or period (sometimes referred to as a transportation timing) when the hydrogen is transported from the hydrogen production equipment 160 to the hydrogen cylinder of each user or each member. The transportation timing may be a time or period which is temporally after the electric power transmission timing. The electric power transmission timing may be one example of the first period. The transportation timing may be one example of the third time period.

The adjustment amount determining section 740 adjusts the magnitude of the adjustment amount so that the possessed amount managing section 656 can adjust the ratio (A/B) of the decrease amount of the point balance of a particular user or member as a result of the hydrogen being received (A) to the hydrogen amount received by the user or member (B). The adjustment amount determining section 740 may determine the adjustment amount such that the above-described ratio in a case which meets the second geographic condition is lower than in the case which does not meet the second geographic condition. Examples of the second geographic condition include (i) the condition that the distance between the electric power transmission location and the transport location is smaller than a threshold, (ii) the condition that the electric power transmission location and the transport location are disposed within the same community, and the like.

In one embodiment, the adjustment amount determining section 740 determines, in a case where a particular user or member receives hydrogen from the hydrogen production equipment 160, the adjustment amount to adjust the point count consumed by the user or member. For example, the possessed amount determining section 760 determines the point balance of the above-described user or member by subtracting the above-described adjustment amount from the accumulated point difference output by the point accumulating section 750. The possessed amount determining section 760 may determine the point balance of the above-described user or member by dividing the accumulated point difference output by the point accumulating section 750 by the above-described adjustment amount.

In another example, the point accumulating section 750 may calculate the accumulated point difference by adding to the last point balance the value obtained by subtracting the above-described adjustment amount from the point count output by the point converting section 654. In addition, the point accumulating section 750 may calculate the accumulated point difference by adding to the last point balance the value obtained by dividing the point count output by the point converting section 654 by the above-described adjustment amount.

In the present embodiment, the adjustment amount determining section 740 may determine the adjustment amount such that the adjustment amount is lower in a case where the electric power transmission location and the transport location meet the second geographic condition than in a case where the electric power transmission location and the transport location does not meet the second geographic condition. Depending on the possession status of the point, a single electric power reception location may correspond to a plurality of electric power transmission locations.

In another embodiment, the adjustment amount determining section 740 determines, in a case where a particular user or member receives hydrogen from the hydrogen production equipment 160, the adjustment amount to adjust the point count consumed by the user or member. For example, the possessed amount determining section 760 determines the point balance of the above-described user or member by adding or multiplying the above-described adjustment amount to or by the accumulated point difference output by the point accumulating section 750. In another example, the point accumulating section 750 may calculate the accumulated point difference by adding to the last point balance the value obtained by adding or multiplying the above-described adjustment amount to or by the point count output by the point converting section 654.

In the present embodiment, the adjustment amount determining section 740 may determine the adjustment amount such that the adjustment amount is higher in a case where the electric power transmission location and the transport location meet the second geographic condition than in a case where the electric power transmission location and the transport location does not meet the second geographic condition. Depending on the possession status of the point, a single electric power reception location may correspond to a plurality of electric power transmission locations.

In the present embodiment, the point accumulating section 750 accumulates, for each of one or more supplier/demander facilities constituting the community 102, each of the points given to each supplier/demander facility and the points consumed by each supplier/demander facility. The point accumulating section 750 may calculate the accumulated point difference of each supplier/demander facility. The accumulated point difference of each supplier/demander facility is obtained by subtracting the accumulated amount of the points consumed by each supplier/demander facility from the accumulated amount points given to each supplier/demander facility.

In the present embodiment, in a case where a particular supplier/demander facility supplies electric power to the power transmission and distribution network 122, the point accumulating section 750 obtains from the point converting section 654 the information indicating the point count correlating with the electric power amount supplied by the supplier/demander facility to the power transmission and distribution network 122. The above-described point count may be one example of the amount of the points given to a particular supplier/demander facility.

Similarly, in a case where a particular supplier/demander facility receives electric power from the power transmission and distribution network 122, the point accumulating section 750 obtains from the point converting section 654 the information indicating the point count correlating with the electric power amount received by the supplier/demander facility from the power transmission and distribution network 122. The above-described point count may be one example of the amount of points consumed by a particular supplier/demander facility.

In the present embodiment, the point accumulating section 750 may accumulate, for every user of the energy management system 100 or for every member of the community 102, each of the points given to the user or member and the points consumed by the user or member. The point accumulating section 750 may calculate the accumulated point difference of each user or each member. The accumulated point difference of each user or each member is obtained by subtracting the accumulated amount of points consumed by each user or each member from the accumulated amount of points given to each user or each member.

In a case where a particular user or member supplies electric power from the electric power storage device of the user or member to the system power grid 12, the power transmission and distribution network 122, or the hydrogen production equipment 160, the point accumulating section 750 obtains from the point converting section 654 the information indicated by the point count corresponding to the transmitted electric power amount of the user or member. The point accumulating section 750 may add to the last point balance the point count output by the point converting section 654. The above-described point count may be one example of the amount of the points given to the above-described user or member.

In a case where a particular user or member receives electric power from the system power grid 12 or the power transmission and distribution network 122 to the electric power storage device of the user or member, the point accumulating section 750 obtains from the point converting section 654 the information indicating the point count corresponding to the received electric power amount of the user or member. The point accumulating section 750 may subtract from the last point balance the point count output by the point converting section 654. The point accumulating section 750 may subtract from the last point balance the point count output by the point converting section 654 within a range of the last point balance. This prevents the point balance from becoming a negative value. The above-described point count may be one example of the amount of points consumed by the above-described user or member.

In a case where a particular user or member transports hydrogen from the hydrogen production equipment 160 to the hydrogen cylinder of the user or member, the point accumulating section 750 obtains the information indicating the point count corresponding to the hydrogen amount received by the user or member from the point converting section 654. The point accumulating section 750 may subtract from the last point balance the point count output by the point converting section 654. The point accumulating section 750 may subtract from the last point balance the point count output by the point converting section 654 within a range of the last point balance. This prevents the point balance from becoming a negative value. The above-described point count may be one example of the amount of points consumed by the above-described user or member. The above-described point count may be one example of the amount of points consumed by the above-described user or member.

In the present embodiment, the point accumulating section 750 is described in detail by using as an example a case in which the point accumulating section 750 calculates a new point balance by adding or subtracting to or from the last point balance the point count output by the point converting section 654. However, the point accumulating section 750 is not limited to the present embodiment. In another embodiment, the point accumulating section 750 may calculate the new point balance based on the last point balance, the point count output by the point converting section 654, and the adjustment amount output by the adjustment amount determining section 740.

In the present embodiment, the possessed amount determining section 760 determines the amount of the points possessed by each of the one or more supplier/demander facilities constituting the community 102. The amount of the points possessed by the supplier/demander facility may be sometimes referred to as a possessed point, a possessed point count, a point balance, or the like.

The amount of points possessed by each supplier/demander facility may be the amount correlating with the electric power amount which can be used, monetized, or disposed by each electric power supplier/demander. The amount of points possessed by each supplier/demander facility indicates the amount of points which can be utilized by each supplier/demander facility. The each supplier/demander facility can consume the points possessed by each supplier/demander facility to utilize the electric power generated by utilizing the surplus electric power or surplus supply capability of the community 102. In the present embodiment, each supplier/demander facility can consume the points within a range of the amount of the points possessed by each supplier/demander facility.

Each possessed amount determining section 760 determines, based on (i) the amount of the points correlating with the electric power amount supplied by a particular supplier/demander facility to the power transmission and distribution network 122 and (ii) the amount of the points correlating with the electric power amount received by the supplier/demander facility from the power transmission and distribution network 122, the amount of the points possessed by the supplier/demander facility. More specifically, the possessed amount determining section 760 determines, based on the accumulated point difference of a particular supplier/demander facility, the amount of the points possessed by the supplier/demander facility.

The possessed amount determining section 760 may determine, based on (i) the amount of the points correlating with the electric power amount supplied by a particular supplier/demander facility to the power transmission and distribution network 122, (ii) the amount of the points correlating with the electric power amount received by the supplier/demander facility from the power transmission and distribution network 122, and (iii) the adjustment amount determined by the adjustment amount determining section 740, the amount of the points possessed by the supplier/demander facility. More specifically, the possessed amount determining section 760 determines, based on the accumulated point difference of a particular supplier/demander facility and the adjustment amount determined by the adjustment amount determining section 740, the amount of the points possessed by the supplier/demander facility. For example, the possessed amount determining section 760 totals the accumulated point difference of a particular supplier/demander facility and the adjustment amount determined by the adjustment amount determining section 740 to determine the amount of the points possessed by the supplier/demander facility.

Thereby, the possessed amount determining section 760 can determine the possessed point count based on, for example, the information related to the possession period of the point. The possessed amount determining section 760 can determine the possessed point count based on, for example, the status of the electric power supply and demand of the community 102 at a particular moment. The possessed amount determining section 760 can determine the possessed point count based on, for example, the status of the electric power supply and demand of the community 102 at the moment when the supplier/demander facility supplies electric power to the community 102.

With the similar method, the possessed amount determining section 760 may determine the amount of the point possessed by each user of the energy management system 100 or each member of the community 102. As described above, the amount of the points possessed by each user or each member indicates the maximum value of the electric power amount which can be supplied from the system power grid 12 or the power transmission and distribution network 122 to the electric power storage device of each user or each member under the first economical condition. In addition, the point balance of each user or each member indicates the maximum value of hydrogen amount which can be transported for each user or each member from the hydrogen storage tank which stores hydrogen produced by the hydrogen production equipment 160 to the hydrogen cylinder of each user or each member under a second economic condition.

FIG. 8 schematically shows one example of the data table 800. The data table 800 may be one example of the data structure of the database managed by the possession period managing section 730. For example, the data table 800 is stored in the storage section 560.

In the present embodiment, the data table 800 associates and stores a community ID 812, a supplier/demander ID 814, information 822 indicating the timing when the electric power transmission or electric power reception was performed, a period ID 824 to identify the unit period to which the electric power transmission timing or the electric power reception timing belongs, information 826 indicating the location where the electric power transmission or the electric power reception was performed, information 832 indicating the transmitted electric power amount, information 834 indicating the received electric power amount, information 840 indicating the amount of the points consumed or given as a result of the electric power transmission or electric power reception, information 850 indicating the surplus supply capability of the community 102 at the electric power transmission timing or the electric power reception timing. Thereby, the possession period managing section 730 can manage the amount of a plurality of points given or consumed at a plurality of timings. For example, the possession period managing section 730 can achieve the management in the First-in First-out manner or the management in the Last in First out manner by utilizing the data table 800.

The unit period to which the electric power transmission timing or the electric power reception timing belongs is used to facilitate the calculation of the possession period of the point. The duration of the unit period to which the electric power transmission timing or the electric power reception timing belongs may be the same as or may be different from the duration of the unit period utilized to adjust the balance of the electric power supply and demand. For example, the duration of the unit period to which the electric power transmission timing or the electric power reception timing belongs is one month, three months, six months, or one year, and the duration of the unit period utilized to adjust the balance of the electric power supply and demand is 15 minutes, 30 minutes, or one hour.

FIG. 9 schematically shows one example of the data table 900. The data table 900 may be one example of the data structure of the database managed by the billing managing section 640. The data table 900 may be one example of the data table indicating the income as a result of the supplier/demander facility supplying electric power to the outside. The data table 900 is stored in, for example, the storage section 560.

In the present embodiment, the data table 900 associates and stores a community ID 922, a supplier/demander ID 924, information 930 indicating the timing (sometimes referred to as an electric power transmission timing) when the supplier/demander facility supplies electric power to the power transmission and distribution network 122, information 940 related to the transmitted electric power amount at the electric power transmission timing, and information 950 related to the income of the supplier/demander facility for the electric power transmission. The information 940 related to the transmitted electric power amount may include information 942 indicating the total of the transmitted electric power amount during the electric power transmission period and information 944 related to the breakdown. The information 944 related to the breakdown may include the information 948 indicating the information 946 indicating the sold electric power amount and the electric power amount converted to the point. The information 950 related to the income may include the information 952 related to a price and the information 954 related to the amount of a given point.

FIG. 10 schematically shows one example of the data table 1000. The data table 1000 may be one example of the data structure of the database managed by the billing managing section 640. The data table 1000 may be one example of the data table indicating the expenditure as a result of the supplier/demander facility receiving electric power from the outside. The data table 1000 is stored, for example, in the storage section 560.

In the present embodiment, the data table 1000 associates and stores a community ID 1022, a supplier/demander ID 1024, information 1030 indicating the timing (sometimes referred to as an electric power reception timing) when the supplier/demander facility receives electric power from the power transmission and distribution network 122, information 1040 related to the received electric power amount in the electric power reception timing, and information 1050 related to the expenditure of the supplier/demander facility for the received electric power. The information 1040 related to the received electric power amount may include the information 1042 indicating the total of the received electric power amount during the electric power reception period and the information 1044 related to the breakdown. The information 1044 related to the breakdown may include the information 1046 indicating the purchased electric power amount and the information 1048 indicating the electric power amount converted to the point. The information 1050 related to the expenditure may include the information 1052 related to a price and the information 1054 related to the amount of the consumed point.

Figure 11:
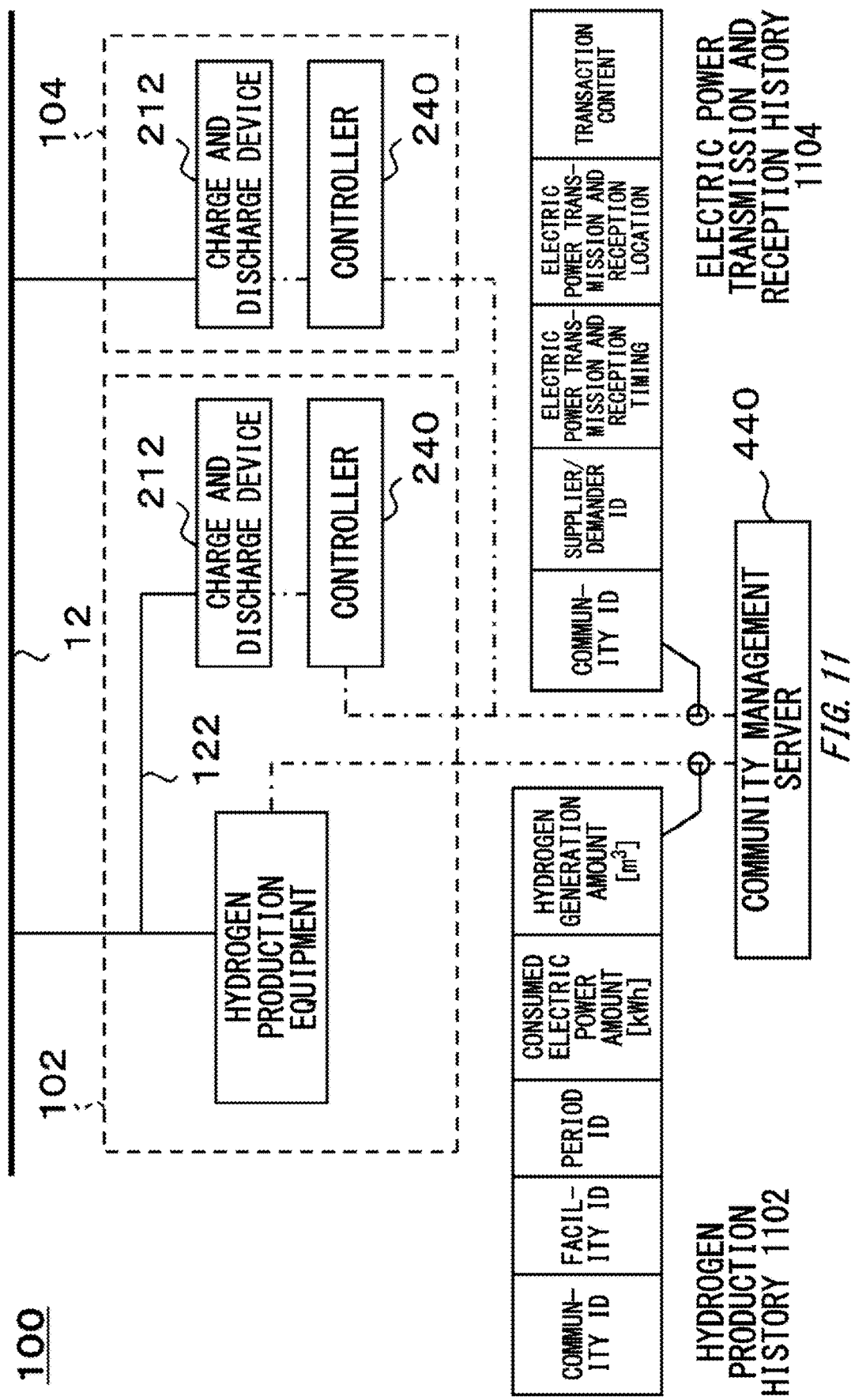
FIG. 11 schematically shows one example of the information processing in the energy management system 100.

FIG. 11 schematically shows one example of the information processing in the energy management system 100. In the present embodiment, the community management server 440 obtains the hydrogen production history 1102 from the hydrogen production equipment 160 of the community 102. The hydrogen production history 1102 includes, for example, (i) the community ID to identify the community to which the hydrogen production equipment 160 belongs, (ii) the equipment ID to identify the hydrogen production equipment 160, (iii) the information indicating the time or period, (iv) the information indicating the electric power amount consumed by the hydrogen production equipment 160 to produce hydrogen at the above-described time or period, and (v) the information indicating the hydrogen amount produced by the hydrogen production equipment 160 at the above-described time or period.

In the present embodiment, the community management server 440 may obtain hydrogen transportation history (not shown) from the hydrogen production equipment 160 of the community 102. The hydrogen transportation history includes, for example, (i) the community ID to identify the community to which the user or member who received hydrogen belongs, (ii) the supplier/demander ID to identify the user or member, (iii) the information indicating the timing when the transportation of hydrogen was performed, (iv) the information indicating the location where the transportation of hydrogen was performed, and (v) the information indicating the content of the transaction related to the transportation of hydrogen.

In the present embodiment, the community management server 440 of the community 102 obtains the electric power transmission and reception history 1104 from the controller 240 disposed in any supplier/demander facility of the community 102. Each supplier/demander facility of the community 102 may transmit the electric power transmission and reception history 1104 in a case where the transmission or reception of electric power between the charge and discharge device 212 of the supplier/demander facility and the electric power storage device of a particular user or member is detected. Each supplier/demander facility of the community 102 may periodically transmit the electric power transmission and reception history 1104.

For example, the electric power transmission and reception history 1104 includes (i) the community ID to identify the community to which a user or member belongs who utilizes the electric power storage device to perform electric power transmission or electric power reception, (ii) the supplier/demander ID to identify the user or member, (iii) the information indicating the timing when the electric power transmission or electric power reception was performed, (iv) the information indicating the location where the electric power transmission or electric power reception was performed, and (v) the information indicating the content of the transaction related to the electric power transmission or electric power reception. For the detail of the electric power transmission and reception history, refer to another example described below.

In the present embodiment, the community management server 440 may obtain the electric power transmission and reception history 1104 from the controller 240 disposed in any supplier/demander facility of the community 104. The community management server 440 may obtain the electric power transmission and reception history 1104 from the controller 240 disposed in any supplier/demander facility of the community 104 via the wide area management server 180.

FIG. 12 schematically indicates one example of the data structure of the electric power transmission and reception history 1204. FIG. 12 may be one example of the data structure indicating the history of electric power transmission. In the present embodiment, the electric power transmission and reception history 1204 associates and stores a community ID 1222, a supplier/demander ID 1224, information 1232 indicating the electric power transmission and reception timing, information 1234 indicating the electric power transmission and reception location, and information 1240 indicating the transaction content. The information 1240 indicating the transaction content may include the information indicating the transmitted electric power amount, the information to specify the electric power receiving side, the information indicating the type of income, or the like.

When identification information of a particular facility or equipment is added to the information which specifies the electric power receiving side, the community management server 440 perform a process to subtract the transmitted electric power amount identified in the information 1240 indicating the transaction content from the electric power utilization amount of the specified facility or equipment. It is noted that if the electric power receiving side is not specified, the community management server 440 may perform the process regarding that the community 102 is specified as the electric power receiving side. The information indicating the type of income may be the information indicating the type of consideration value of the electric power.

User A may be the owner or occupant of the supplier/demander facility 112 of the community 102. According to the electric power transmission and reception history 1204, the status of electric power transaction is recorded for every user. Thereby, the community management server 440 can aggregate the electric power transaction for every user.

Figure 13:
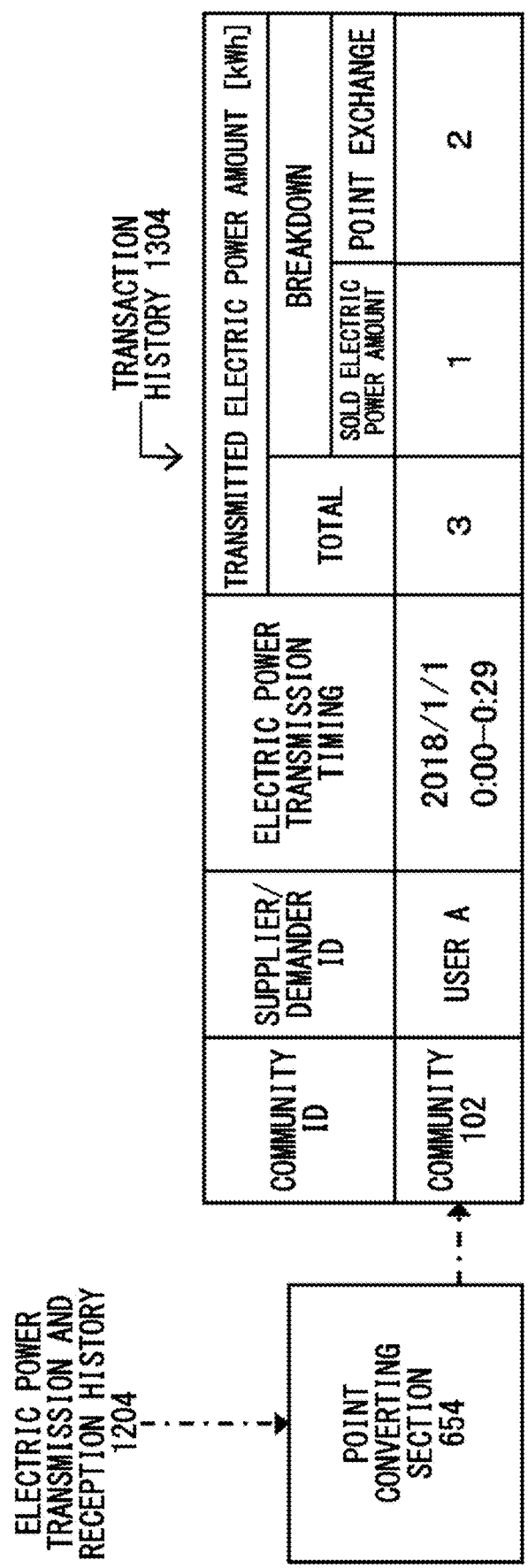
FIG. 13 schematically shows one example of the information processing in a point converting section 654.

FIG. 13 schematically shows one example of the information processing in the point converting section 654. According to the present embodiment, when the point converting section 654 receives the electric power transmission and reception history 1204, the point converting section 654 outputs the transaction history 1304. For example, the transaction history 1304 includes (i) the community ID of the community to which the user or member who performs electric power transmission belongs, (ii) the demander ID of the above-described user or member, (iii) the information indicating the timing when the electric power transmission was performed, and (iv) the information indicating the transmitted electric power amount. The information indicating the transmitted electric power amount may include the information indicating the sold electric power amount and the information indicating the electric power amount converted to the point.

The point converting section 654 may transmit the transaction history 1304 to the billing managing section 640. In addition, the point converting section 654 converts to the point count the electric power amount converted to the point among the transmitted electric power amount. The point converting section 654 may transmit the information indicating the point count to the possessed amount managing section 656.

Figure 14:
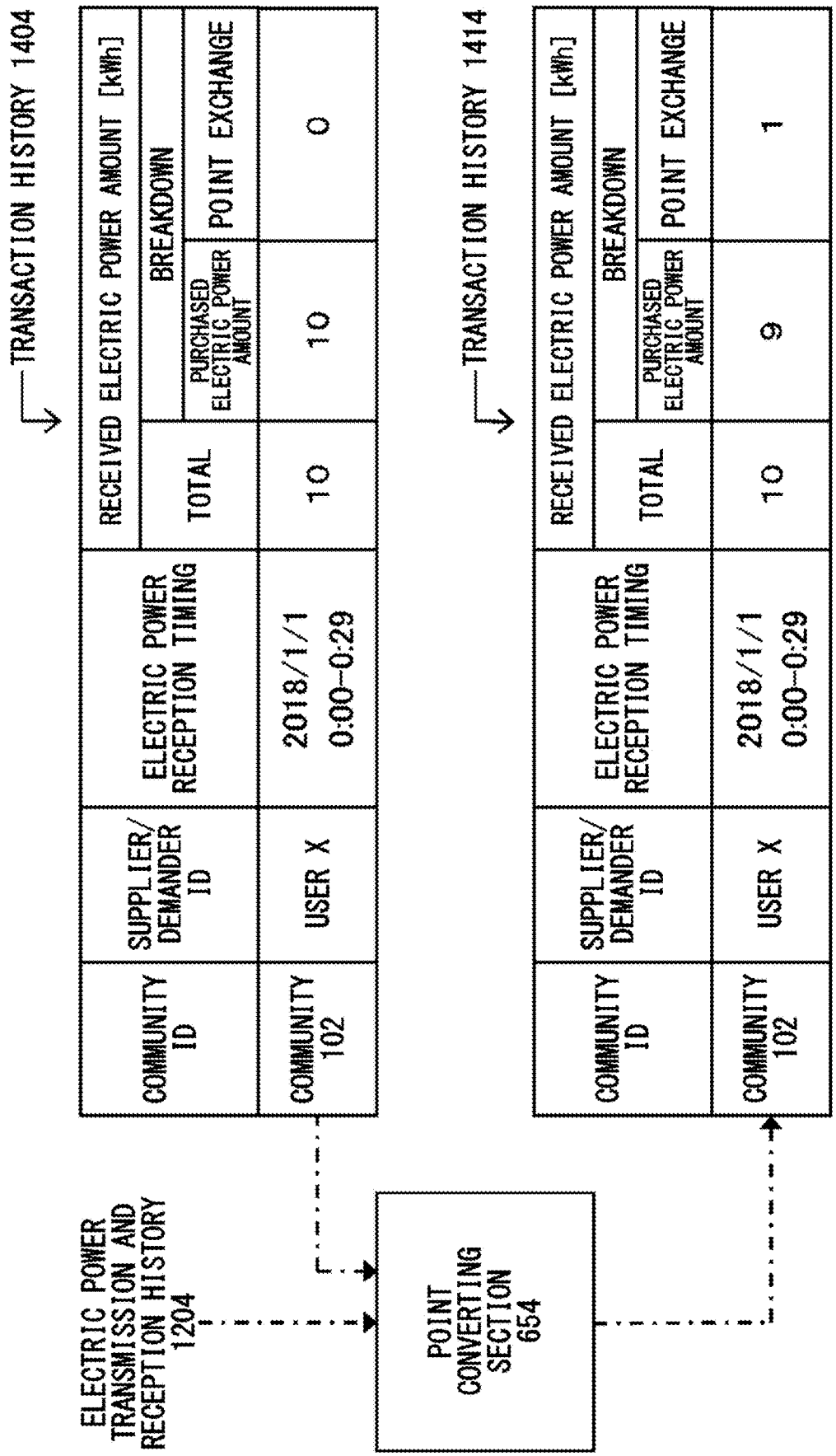
FIG. 14 schematically shows one example of the information processing in the point converting section 654.

FIG. 14 schematically shows one example of the information processing in the point converting section 654. FIG. 14 schematically shows one example of the process to settle the electric power utilization amount of the hydrogen production equipment 160. Using FIG. 14, one example of the process is described, in which the transaction history 1414 after the transaction indicated in the electric power transmission and reception history 1204 is performed is generated based on the last transaction history 1404 in which the transaction indicated in the electric power transmission and reception history 1204 is performed. The transaction history 1404 and the transaction history 1414 may be one example of the information indicating the electric power utilization amount of the hydrogen production equipment 160. The user X may be the owner, manager, or operator of the hydrogen production equipment 160.

According to the present embodiment, the point converting section 654 receives the electric power transmission and reception history 1204 and the last transaction history 1404. The point converting section 654 analyzes the electric power transmission and reception history 1204 and the transaction history 1404 to output the transaction history 1414.

In the example of FIG. 14, from the transaction history 1404, it is considered that the hydrogen production equipment 160 purchases 10 kWh of electric power. On the other hand, from the electric power transmission and reception history 1204, it is considered that the electric power supplied by user A of the community 102 to the power transmission and distribution network 122 of the community 102 is transmitted to the hydrogen production equipment 160 of the community 102. In addition, it is considered that the transmitted electric power amount from user A to the power transmission and distribution network 122 is 1 [kWh].

Then, the point converting section 654 subtracts the transmitted electric power amount indicated in the electric power transmission and reception history 1204 from the purchased electric power amount indicated in the transaction history 1404. In addition, the point converting section 654 adds the transmitted electric power amount indicated in the electric power transmission and reception history 1204 to the electric power amount converted to the point indicated in the transaction history 1404. Thus, the transaction history 1414 is generated.

FIG. 15 schematically shows one example of the data structure of the electric power transmission and reception history 1504. FIG. 15 may be one example of the data structure indicating the history of electric power reception. The electric power transmission and reception history 1504 associates and stores a community ID 1522, a supplier/demander ID 1524, information 1532 indicating the electric power transmission and reception timing, information 1534 indicating electric power transmission and reception location, and information 1540 indicating the transaction content. The information 1540 indicating the transaction content may include the information indicating the transmitted electric power amount, the information indicating the type of the expenditure, or the like. The information indicating the type of the expenditure may be the information indicating the type of the consideration value of electric power.

Figure 16:
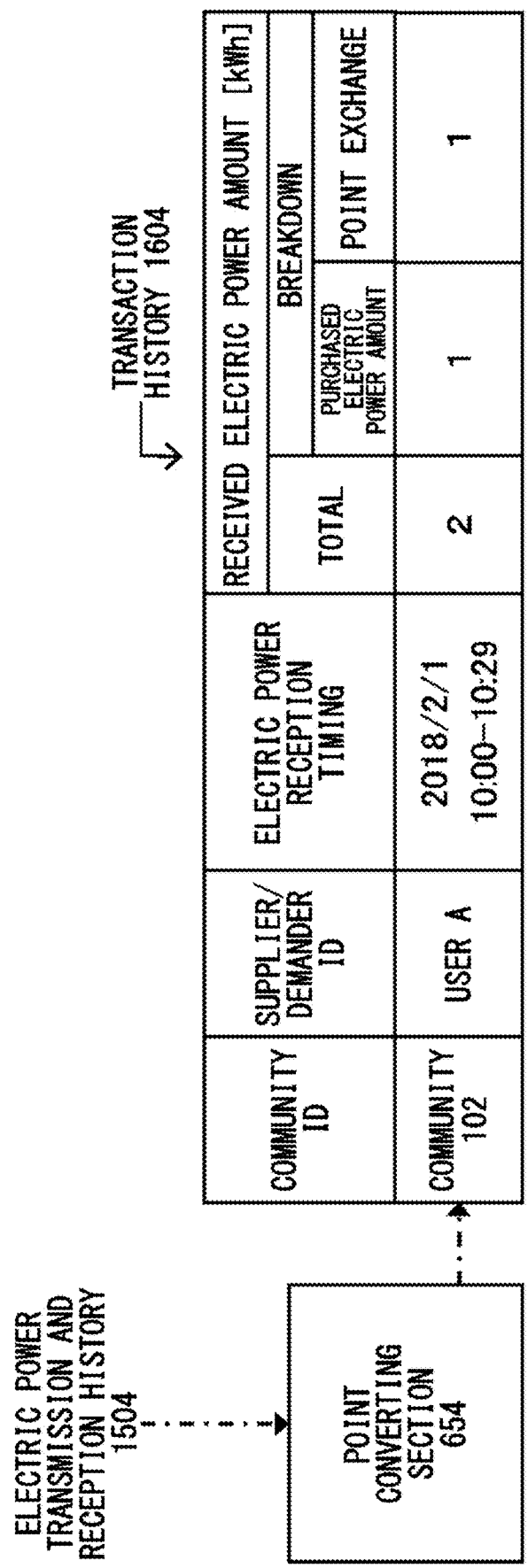
FIG. 16 schematically shows one example of the information processing in the point converting section 654.

FIG. 16 schematically indicates one example of the information processing in the point converting section 654. According to the present embodiment, when the point converting section 654 receives the electric power transmission and reception history 1504, the point converting section 654 outputs the transaction history 1604. For example, the transaction history 1604 includes (i) the community ID of the community to which the user or member who performs electric power reception belongs, (ii) the demander ID of the above-described user or member, (iii) the information indicating the timing when the electric power reception was performed, and (iv) the information indicating the received electric power amount. The information indicating the received electric power amount may include the information indicating the purchased electric power amount and the information indicating the electric power amount converted to the point.

The point converting section 654 may transmit the transaction history 1604 to the billing managing section 640. In addition, the point converting section 654 converts to the point count the electric power amount converted to the point among the received electric power amount. The point converting section 654 may transmit the information indicating the point count to the possessed amount managing section 656.

FIG. 17 schematically shows one example of the data structure of the filling history 1704. In the present embodiment, the filling history 1704 associates and stores a community ID 1722, a supplier/demander ID 1724, information 1732 indicating the timing when hydrogen was filled, information 1734 indicating the location where hydrogen was filled, and the information 1740 indicating the transaction content. The information 1740 indicating the transaction content may include the information indicating the fill amount, the information indicating the type of the expenditure, or the like. The information indicating the type of the expenditure may be the information indicating the type of the consideration value of the electric power.

Figure 18:
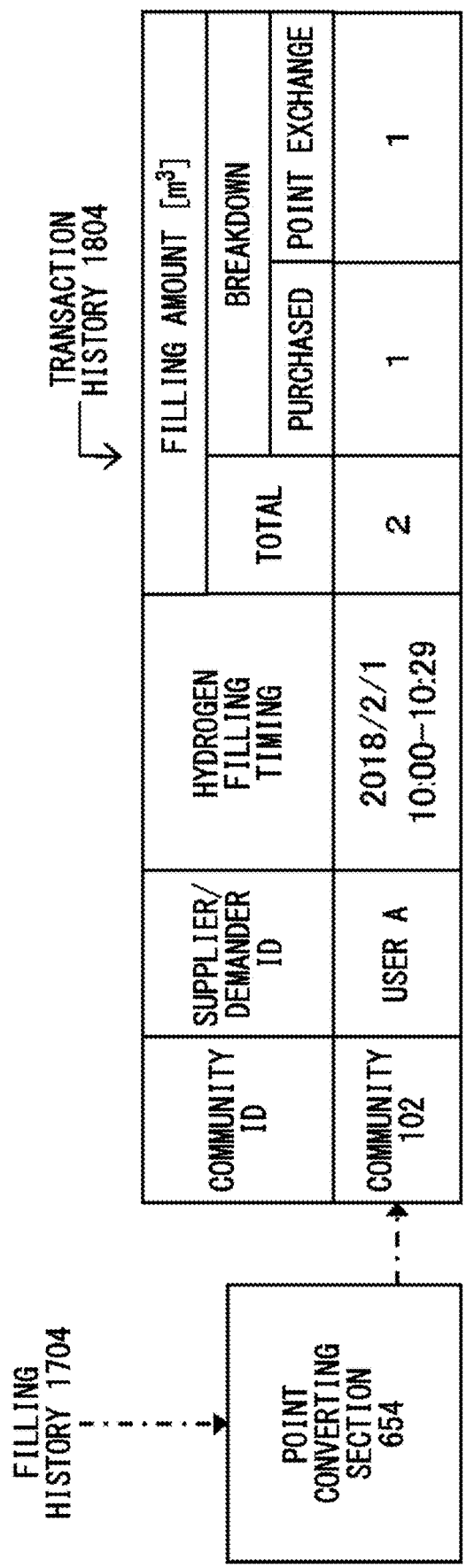
FIG. 18 schematically shows one example of the information processing in the point converting section 654.

FIG. 18 schematically shows one example of the information processing in the point converting section 654. According to the present embodiment, when the point converting section 654 receives the filling history 1704, the point converting section 654 outputs the transaction history 1804. For example, the transaction history 1804 includes (i) a community ID of the community to which the user or member who received hydrogen belongs, (ii) a demander ID of the above-described user or member, (iii) information indicating the timing when hydrogen was transported, and (iv) information indicating the fill amount of hydrogen. The information indicating the fill amount may include the information indicating the purchased hydrogen amount and the information indicating the hydrogen amount converted to the point. The fill amount of hydrogen may be one example of the transported hydrogen amount.

Figure 19:
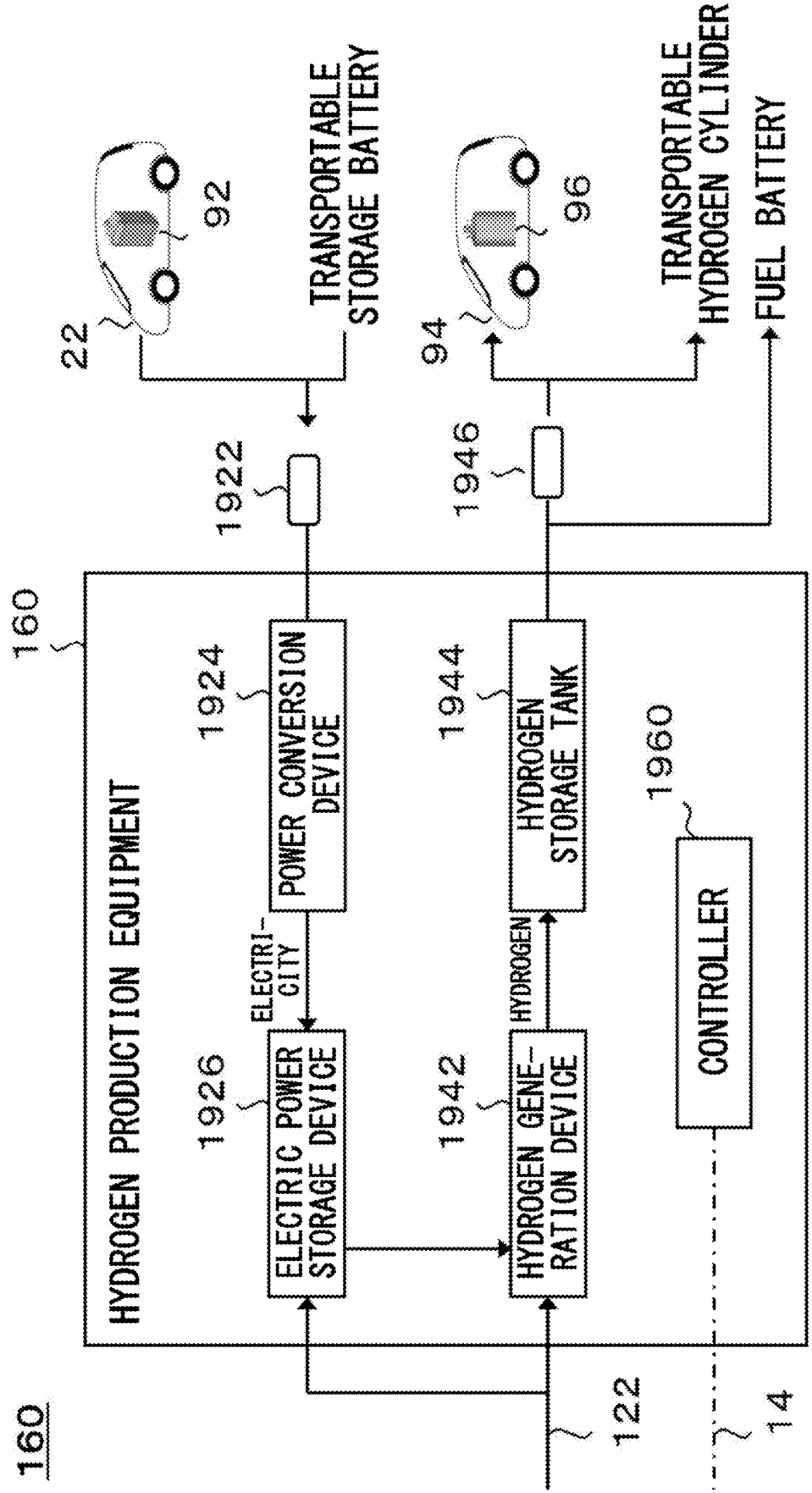
FIG. 19 schematically shows one example of the internal configuration of hydrogen production equipment 160.

FIG. 19 schematically shows one example of the internal configuration of the hydrogen production equipment 160. In the present embodiment, the hydrogen production equipment 160 includes a connector 1922, a power conversion device 1924, and an electric power storage device 1926. In the present embodiment, the hydrogen production equipment 160 includes a hydrogen generation device 1942, a hydrogen storage tank 1944, and a filling nozzle 1946. In addition, the hydrogen production equipment 160 includes the controller 1960.

The hydrogen generation device 1942 may be one example of the energy source producing section and the energy source production device. The hydrogen storage tank 1944 may be one example of the first storage container.

In the present embodiment, the connector 1922 is electrically connected to the connector (not shown) of the electric vehicle 22. Thereby, the storage battery 92 of the electric vehicle 22 is electrically connected to the power conversion device 1924. Similarly, the connector 1922 is electrically connected to the input and output terminal (not shown) of a transportable storage battery. Thereby, the transportable storage battery is electrically connected to the power conversion device 1924. Examples of the transportable storage battery include the storage battery conveyed by an animal or movable object, the storage battery attached to or carried by the animal, the storage battery mounted to the movable object, the storage battery towed by the movable object, or the like. The transportable storage battery may be the portable storage battery 24.

The storage battery 92 may be one example of the electric power storage device. The transportable storage battery may be one example of the electric power storage device.

In the present embodiment, the power conversion device 1924 converts direct current to alternate current or convert alternate current to direct current through the control of the controller 1960. The power conversion device 1924 converts the quality of electricity through the control of the controller 1960. Examples of the quality of electricity include the voltage, the change of voltage, the frequency, the change of frequency, the phase, the change of phase, or the like.

The input terminal (not shown) of the power conversion device 1924 is electrically connected to the connector 1922. The output terminal (not shown) of the power conversion device 1924 is electrically connected to the input terminal (not shown) of the electric power storage device 1926. For example, the power conversion device 1924 converts the voltage of electricity received from the connector 1922, and supplies the converted electricity to the electric power storage device 1926.

In the present embodiment, the electric power storage device 1926 accumulates the electricity supplied from the storage battery connected to the connector 1922. The electric power storage device 1926 may accumulate the electricity supplied from the power transmission and distribution network 122. The electric power storage device 1926 supplies electric power to the hydrogen generation device 1942.

In the present embodiment, the hydrogen generation device 1942 utilizes electric power supplied from the power transmission and distribution network 122 or the electric power storage device 1926 to produce hydrogen. For example, the hydrogen generation device 1942 produces hydrogen through the electrolysis of water. The hydrogen generation device 1942 may obtain hydrogen from lower alcohol. The hydrogen generation device 1942 transports the produced hydrogen to the hydrogen storage tank 1944.

In the present embodiment, the hydrogen storage tank 1944 stores hydrogen produced by the hydrogen generation device 1942. The hydrogen storage tank 1944 transports hydrogen to the outside of the hydrogen production equipment 160. For example, the hydrogen storage tank 1944 transports hydrogen to the fuel battery disposed within the community 102 via pipeline (not shown). The hydrogen storage tank 1944 transports hydrogen to the hydrogen cylinder 96 mounted to the fuel battery vehicle 94 or a transportable hydrogen cylinder via the filling nozzle 1946.

The transportable hydrogen cylinder stores hydrogen. The transportable hydrogen cylinder is conveyed by an animal or a movable object. The transportable hydrogen cylinder may be attached to or carried by an animal, may be mounted to a movable object, or may be towed by a movable object.

The fuel battery vehicle 94 may be one example of the movable object. The hydrogen cylinder 96 may be one example of the second storage container. The transportable hydrogen cylinder may be one example of the second storage container.

In the present embodiment, the controller 1960 controls the operation of each section of the hydrogen production equipment 160. The controller 1960 may control the operation of each section of the hydrogen production equipment 160 according to the instruction of the community management server 440.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as such application does not cause a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The present specification discloses the following matters, for example.

[Item 1] An electric power information management system including a supply information obtaining section which obtains supplied electric power correlation amount correlating with an externally-supplied electric power amount which is an electric power amount supplied by an electric power supplier/demander including at least one of a power generation equipment and a power storage equipment to the outside; a reception information obtaining section which obtains received electric power correlation amount correlating with an externally-received electric power amount which is the electric power amount received by the above-described electric power supplier/demander from the outside; an available amount determining section which determines available electric power correlation amount which is correlated with the electric power amount which can be used, monetized, or disposed by the above-described electric power supplier/demander, and which can be utilized by the above-described electric power supplier/demander, and the above-described available amount determining section determines, based on (A) the above-described supplied electric power correlation amount, (B) the above-described received electric power correlation amount, and (C) the information related to an elapsed time period which is the period (i) from the moment at which the above-described electric power supplier/demander supplied the electric power to the outside or (ii) from the moment at which the difference between the above-described supplied electric power correlation amount and the above-described received electric power correlation amount meets a predetermined first condition to a particular moment, the above-described available electric power correlation amount at the above-described particular moment.

[Item 2] An electric power information management system including a supply information obtaining section which obtains supplied electric power correlation amount correlating with an externally-supplied electric power amount which is an electric power amount supplied by an electric power supplier/demander including at least one of a power generation equipment and a power storage equipment to the outside; a reception information obtaining section which obtains received electric power correlation amount correlating with an externally-received electric power amount which is the electric power amount received by the above-described electric power supplier/demander from the outside; a supply and demand status obtaining section which obtains the information related to the status of the electric power supply and demand; an available amount determining section which determines available electric power correlation amount which is correlating with the electric power amount which can be used, monetized, or disposed by the above-described electric power supplier/demander, and which can be utilized by the above-described electric power supplier/demander, and the above-described available amount determining section determines, based on (A) the above-described supplied electric power correlation amount, (B) the above-described received electric power correlation amount, and (F) the above-described information related to the status of the electric power supply and demand at a particular moment obtained by the above-described supply and demand status obtaining section, the above-described available electric power correlation amount at the above-described particular moment.

[Item 3] An electric power information management system including a supply information obtaining section which obtains supplied electric power correlation amount correlating with an externally-supplied electric power amount which is an electric power amount supplied to the outside by an electric power supplier/demander including at least one of a power generation equipment and a power storage equipment; a reception information obtaining section which obtains received electric power correlation amount correlating with an externally-received electric power amount which is the electric power amount received by the above-described electric power supplier/demander from the outside; a supply and demand status obtaining section which obtains the information related to the status of the electric power supply and demand; an available amount determining section which determines available electric power correlation amount which is correlating with the electric power amount which can be used, monetized, or disposed by the above-described electric power supplier/demander, and which can be utilized by the above-described electric power supplier/demander, and the above-described available amount determining section determines, based on (A) the above-described supplied electric power correlation amount, (B) the above-described received electric power correlation amount, and (G) the above-described information related to the status of the electric power supply and demand, obtained by the above-described supply and demand status obtaining section, at the moment when the above-described electric power supplier/demander supplies electric power to the outside, the above-described available electric power correlation amount.

[Item 4] An electric power information management method including a supply information obtaining step to obtain supplied electric power correlation amount correlating with an externally-supplied electric power amount which is an electric power amount supplied by an electric power supplier/demander having at least one of a power generation equipment and a power storage equipment to the outside; a reception information obtaining step to obtain received electric power correlation amount correlating with an externally-received electric power amount which is the electric power amount received by the above-described electric power supplier/demander from the outside; an available amount determining step to determine the available electric power correlation amount which is correlating with the electric power amount which can be used, monetized, or disposed by the above-described electric power supplier/demander, and which can be utilized by the above-described electric power supplier/demander, and the above-described available amount determining step includes a step to determine, based on (A) the above-described supplied electric power correlation amount, (B) the above-described received electric power correlation amount, and (C) the information related to an elapsed time period which is the period (i) from the moment at which the above-described electric power supplier/demander supplied the electric power to the outside or (ii) from the moment at which the difference between the above-described supplied electric power correlation amount and the above-described received electric power correlation amount meets a predetermined first condition to a particular moment, the above-described available electric power correlation amount at the above-described particular moment.

[Item 5] An electric power information management server including a supply information obtaining section which obtains supplied electric power correlation amount correlating with an externally-supplied electric power amount which is an electric power amount supplied by an electric power supplier/demander including at least one of a power generation equipment and a power storage equipment to the outside; a reception information obtaining section which obtains received electric power correlation amount correlating with an externally-received electric power amount which is the electric power amount received by the above-described electric power supplier/demander from the outside; an available amount determining section which determines available electric power correlation amount which is correlating with the electric power amount which can be used, monetized, or disposed by the above-described electric power supplier/demander, and which can be utilized by the above-described electric power supplier/demander, and the above-described available amount determining section determines, based on (A) the above-described supplied electric power correlation amount, (B) the above-described received electric power correlation amount, and (C) the information related to an elapsed time period which is the period (i) from the moment at which the above-described electric power supplier/demander supplied the electric power to the outside or (ii) from the moment at which the difference between the above-described supplied electric power correlation amount and the above-described received electric power correlation amount meets a predetermined first condition to a particular moment, the above-described available electric power correlation amount at the above-described particular moment.

[Item 6] A communication terminal utilized by an electric power supplier/demander having at least one of a power generation equipment and a power storage equipment, including: a supply information obtaining section which obtains supplied electric power correlation amount correlating with an externally-supplied electric power amount which is an electric power amount supplied by the above-described electric power supplier/demander to the outside; a reception information obtaining section which obtains received electric power correlation amount correlating with an externally-received electric power amount which is the electric power amount received by the above-described electric power supplier/demander from the outside; an available amount determining section which determines available electric power correlation amount which is correlating with the electric power amount which can be used, monetized, or disposed by the above-described electric power supplier/demander, and which can be utilized by the above-described electric power supplier/demander, and the above-described available amount determining section determines, based on (A) the above-described supplied electric power correlation amount, (B) the above-described received electric power correlation amount, and (C) the information related to an elapsed time period which is the period (i) from the moment at which the above-described electric power supplier/demander supplied the electric power to the outside or (ii) from the moment at which the difference between the above-described supplied electric power correlation amount and the above-described received electric power correlation amount meets a predetermined first condition to a particular moment, the above-described available electric power correlation amount at the above-described particular moment.

EXPLANATION OF REFERENCES 12 system power grid
14 communication network
22 electric vehicle
24 storage battery
92 storage battery
94 fuel battery vehicle
96 hydrogen cylinder
100 energy management system
102 community
104 community
112 supplier/demander facility
114 supplier/demander facility
120 power transformation equipment
122 power transmission and distribution network
140 energy management equipment
160 hydrogen production equipment
180 wide area management server
210 electric power load
212 charge and discharge device
220 power supply equipment
222 power generation device
224 electric power storage device
230 power distribution equipment
240 controller
250 supplier/demander terminal
320 communication controlling section
332 supply and demand monitoring section
334 supply and demand predicting section
336 supply and demand adjusting section
350 request processing section
440 community management server
520 communication controlling section
530 data collecting section
540 energy managing section
552 supplier/demander facility controlling section
554 community equipment controlling section
560 storage section
620 request processing section
630 system control section
640 billing managing section
650 point managing section
652 history information obtaining section
654 point converting section
656 possessed amount managing section
720 supply and demand information obtaining section
730 possession period managing section
740 adjustment amount determining section
750 point accumulating section
760 possessed amount determining section
800 data table
812 community ID 814 supplier/demander ID
822 information
824 period ID
826 information
832 information
834 information
840 information
850 information
900 data table
922 community ID
924 supplier/demander ID
930 information
940 information
942 information
944 information
946 information
948 information
950 information
952 information
954 information
1000 data table
1022 community ID
1024 supplier/demander ID
1030 information
1040 information
1042 information
1044 information
1046 information
1048 information
1050 information
1052 information
1054 information
1102 hydrogen production history
1104 electric power transmission and reception history
1204 electric power transmission and reception history
1222 community ID
1224 supplier/demander ID
1232 information
1234 information
1240 information
1304 transaction history
1404 transaction history
1414 transaction history
1504 electric power transmission and reception history
1522 community ID
1524 supplier/demander ID
1532 information
1534 information
1540 information
1604 transaction history
1704 filling history
1722 community ID
1724 supplier/demander ID
1732 information
1734 information
1740 information
1804 transaction history
1922 connector
1924 power conversion device
1926 electric power storage device
1942 hydrogen generation device
1944 hydrogen storage tank
1946 filling nozzle
1960 controller

What is claimed is:

1. An energy system comprising:
an electric power controlling section which is configured to control transmission and reception of electric power between a power grid and an electric power storage device;
an energy source producing section which is configured to receive electric power supplied from the power grid and utilize the received electric power to produce an energy source;
an energy information obtaining section which is configured to obtain information indicating a first electric amount which is an electric power amount supplied by the electric power storage device to the power grid during a first period;
a corresponding amount determining section which is configured to determine a first corresponding amount which is an amount of the energy source which the energy source producing section produces by utilizing an amount of electric power corresponding to the first electric amount; and
a first suppliable amount determining section which is configured to determine, based on the first corresponding amount determined by the corresponding amount determining section, a first suppliable amount indicating a maximum value of an electric power amount which can be supplied from the power grid to the electric power storage device under a first economical condition.

2. The energy system according to claim 1, wherein
the energy information obtaining section is configured to further obtain:
information indicating a supplying location which is a location where the electric power storage device supplies electric power to the power grid during the first period; and
information indicating a receiving location which is a location where the electric power storage device receives electric power from the power grid during a second period which is temporally after the first period; and
the first suppliable amount determining section is configured to determine the first suppliable amount so that the first suppliable amount is higher in a case where the supplying location and the receiving location meet a first geographic condition than in a case where the supplying location and the receiving location does not meet the first geographic condition.

3. The energy system according to claim 1, wherein
the first suppliable amount determining section is configured:
to add the first corresponding amount to a last one of the first suppliable amount, in a case where the electric power storage device supplies electric power to the power grid; and
to subtract a charge amount which is an amount corresponding to an electric power amount received by the electric power storage device from the last one of the first suppliable amount, within a range of the last one of the first suppliable amount, in a case where the electric power storage device receives the electric power from the power grid.

4. The energy system according to claim 3, wherein
the energy information obtaining section is configured to further obtain:

information indicating a supplying location which is a location where the electric power storage device supplies electric power to the power grid during the first period; and information indicating a receiving location which is a location where the electric power storage device receives electric power from the power grid during a second period which is temporally after the first period, and the first suppliable amount determining section is configured to determine the charge amount so that a ratio of the charge amount to an electric power amount received by the electric power storage device is lower in a case where the supplying location and the receiving location meet a first geographic condition than in a case where the supplying location and the receiving location do not meet the first geographic condition.

5. The energy system according to claim 1, further comprising a storage section which is configured to store information indicating the first corresponding amount determined by the corresponding amount determining section.

6. The energy system according to claim 1, further comprising:

a charge and discharge device which is configured to utilize electric power supplied from the power grid to charge the electric power storage device and supply, to the power grid, electric power output from the electric power storage device, wherein the electric power storage device is an electric power storage device disposed in a movable object or a building, or a transportable electric power storage device, and the electric power controlling section is configured to control transmission and reception of electric power between the power grid and the electric power storage device electrically connected to the charge and discharge device.

7. The energy system according to claim 1, further comprising a power generating section which is configured to utilize the energy source produced by the energy source producing section to generate electricity, and supply electric power which is generated to at least one of the power grid and the electric power storage device.

8. The energy system according to claim 1, wherein the energy source is hydrogen.

9. The energy system according to claim 1, wherein the first corresponding amount is an amount of the energy source which the energy source producing section produces by utilizing an amount of electric power corresponding to the first electric amount during the first period.

10. The energy system according to claim 1, wherein the corresponding amount determining section is configured to determine an amount of electronic value given to a user of the electric power storage device based on the first corresponding amount.

11. The energy system according to claim 10, wherein the corresponding amount determining section is configured to determine an amount of the electronic value based on the first corresponding amount and at least a part of electric power loss as a result of at least one of an electric power transmission and distribution and electric power transformation.

12. The energy system according to claim 11, wherein the corresponding amount determining section is configured to determine an amount of the electronic value given to a user of the electric power storage device based on a conversion rate between an amount of the energy source and an amount of the electronic value.

13. An energy system comprising:

an electric power controlling section which is configured to control transmission and reception of electric power between a power grid and an electric power storage device;

an energy source producing section which is configured to utilize electric power supplied from the power grid to produce an energy source;

an energy information obtaining section which is configured to obtain information indicating a first electric amount which is an electric power amount supplied by the electric power storage device to the power grid during a first period;

a corresponding amount determining section which is configured to determine a first corresponding amount which is an amount of the energy source which the energy source producing section produces by utilizing an amount of electric power corresponding to the first electric amount; and a suppliable amount determining section which is configured to determine, based on the first corresponding amount determined by the corresponding amount determining section, a suppliable amount indicating a maximum value of an amount of the energy source which can be transported from (i) a first storage container which stores the energy source produced by the energy source producing section to (ii) a second storage container which is mounted to a movable object and is configured to store the energy source supplied from the first storage container under an economical condition.

14. The energy system according to claim 13, wherein the energy information obtaining section is configured to further obtain:

information indicating a supplying location which is a location where the electric power storage device supplies electric power to the power grid during the first period; and information indicating a transport location which is a location where the energy source is transported from the first storage container to the second storage container during a second period which is temporally after the first period, and the suppliable amount determining section is configured to determine the suppliable amount so that the suppliable amount is higher in a case where the supplying location and the transport location meet a geographic condition than in a case where the supplying location and the transport location does not meet the geographic condition.

15. An energy system comprising:

an electric power controlling section which is configured to control transmission and reception of an electric power between a power grid and an electric power storage device;

an energy source producing section which is configured to utilize electric power supplied from the power grid to produce an energy source;

an energy information obtaining section which is configured to obtain information indicating a first electric amount which is an electric power amount supplied by the electric power storage device to the power grid during a first period; and a corresponding amount determining section which is configured to determine a first corresponding amount which is an amount of the energy source which the energy source producing section produces by utilizing an amount of electric power corresponding to the first electric amount, wherein the energy source producing section is configured to utilize electric power supplied from the power grid and the electric power storage device to produce the energy source, the first corresponding amount is an amount of the energy source which the energy source producing section produces by utilizing an amount of electric power corresponding to the first electric amount during the first period, the energy information obtaining section is configured to further obtain information indicating a second electric amount which is an electric power amount directly supplied by the electric power storage device to the energy source producing section during the first period, and the corresponding amount determining section is configured:

to determine a second corresponding amount which is an amount of the energy source which the energy source producing section produces by utilizing an amount of electric power corresponding to the second electric amount during the first period; and to output information indicating a total of the first corresponding amount and the second corresponding amount as an amount of an energy source which the energy source producing section produces by utilizing electric power supplied from the electric power storage device during the first period.

16. An energy system comprising:

an energy source producing section which is configured to receive electric power supplied from an electric power storage device and utilize the received electric power to produce an energy source;

an energy information obtaining section which is configured to obtain information indicating a first electric power amount which is an electric power amount supplied by the electric power storage device to the energy source producing section during a first period;

a corresponding amount determining section which is configured to determine a corresponding amount which is an amount of the energy source which the energy source producing section produces by utilizing an amount of electric power corresponding to the first electric power amount; and a first suppliable amount determining section which is configured to determine, based on the corresponding amount determined by the corresponding amount determining section, a first suppliable amount indicating a maximum value of electric power amount which can be supplied from a power grid to the electric power storage device under a first economical condition.

17. An energy management server comprising:

an energy information obtaining section which is configured to obtain information indicating a first electric amount which is an electric power amount supplied by an electric power storage device to a power grid during a first period;

a corresponding amount determining section which is configured to determine a first corresponding amount which is an amount of an energy source which an energy source production device, configured to receive electric power supplied from the power grid and utilize the received electric power to produce the energy source, produces by utilizing an amount of electric power corresponding to the first electric amount; and a first suppliable amount determining section which is configured to determine a first suppliable amount indicating a maximum value of an electric power amount which can be supplied from the power grid to the electric power storage device under a first economical condition based on the first corresponding amount determined by the corresponding amount determining section.

18. An energy management method comprising steps of:

controlling transmission and reception of electric power between a power grid and an electric power storage device;

obtaining information indicating a first electric amount which is an electric power amount supplied by the electric power storage device to the power grid during a first period;

producing an energy source by controlling an energy source production device which is configured to receive electric power supplied from the power grid and utilize the received electric power to produce the energy source;

determining a first corresponding amount which is an amount of the energy source produced by utilizing an amount of electric power corresponding to the first electric amount; and determining a first suppliable amount indicating a maximum value of an electric power amount supplied from the power grid to the electric power storage device under a first economical condition based on the first corresponding amount determined in the corresponding amount determining step.

19. A non-transitory computer readable medium storing thereon a program which causes a computer to perform steps of:

obtaining information indicating a first electric amount which is an electric power amount supplied by an electric power storage device to a power grid during a first period;

determining a first corresponding amount which is an amount of an energy source which the energy source production device, configured to receive electric power supplied from the power grid and utilize the received electric power to produce the energy source, produces by utilizing an amount of electric power corresponding to the first electric amount; and determining a first suppliable amount indicating a maximum value of an electric power amount which can be supplied from the power grid to the electric power storage device under a first economical condition based on the first corresponding amount determined in the determining of the corresponding amount.

* * * * *